(12) United States Patent
Hiyoshi

(10) Patent No.: US 7,038,706 B1
(45) Date of Patent: *May 2, 2006

(54) OPTICAL WRITE APPARATUS INCLUDING A PLURALITY OF SUBSTRATES

(75) Inventor: Takayuki Hiyoshi, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,289

(22) Filed: Apr. 6, 2000

(30) Foreign Application Priority Data

| Apr. 7, 1999 | (JP) | ................................. 11-100177 |
| Jul. 14, 1999 | (JP) | ................................. 11-200079 |
| Mar. 15, 2000 | (JP) | ............................. 2000-072372 |

(51) Int. Cl.
*B41J 2/45* (2006.01)
*B41J 2/385* (2006.01)

(52) U.S. Cl. ...................................... 347/238; 347/130

(58) Field of Classification Search ........ 347/129–130, 347/236, 241–242, 256–257, 134, 238; 257/82, 257/88–89; 362/611–614
See application file for complete search history.

(56) References Cited

U.S. PATENT DOCUMENTS

| 4,376,282 A | 3/1983 | Kotani et al. ................ 347/244 |
| 5,870,128 A * | 2/1999 | Yazawa et al. ............. 347/130 |
| 6,121,993 A * | 9/2000 | Maekawara et al. ........ 347/236 |
| 6,456,313 B1* | 9/2002 | Hiyoshi ....................... 347/238 |

FOREIGN PATENT DOCUMENTS

| DE | 30 31 295 A1 | | 3/1981 |
| JP | 57-102577 | | 6/1982 |
| JP | 61-94775 | | 5/1986 |
| JP | 63-112172 | | 5/1988 |
| JP | 64-16342 | | 1/1989 |
| JP | 7-61035 | | 3/1995 |
| JP | 08118722 | | 5/1996 |
| JP | 10226100 | | 8/1998 |
| JP | 11058812 A | * | 3/1999 |
| JP | 2000015864 A | * | 1/2000 |

OTHER PUBLICATIONS

U.S. Appl. No. 09/544,289, filed Apr. 6, 2000, pending.
U.S. Appl. No. 09/661,386, filed Sep. 13, 2000, U.S. Pat. No. 6,456,313.
U.S. Appl. No. 09/544,289, filed Apr. 6, 2000, pending.
U.S. Appl. No. 09/983,304, filed Oct. 24, 2001, Now U.S. Pat. No. 6,538,679.

* cited by examiner

*Primary Examiner*—Hai Pham
(74) *Attorney, Agent, or Firm*—Oblon, Spivak, McClelland, Maier & Neustadt, P.C.

(57) ABSTRACT

An optical write apparatus includes a plurality of substrates each having a large number of light emitting diodes aligned in one direction. Every two adjacent substrates are shifted from each other in the aligning direction of the light emitting diodes, and are fixed to each other directly or via a connecting member.

31 Claims, 34 Drawing Sheets

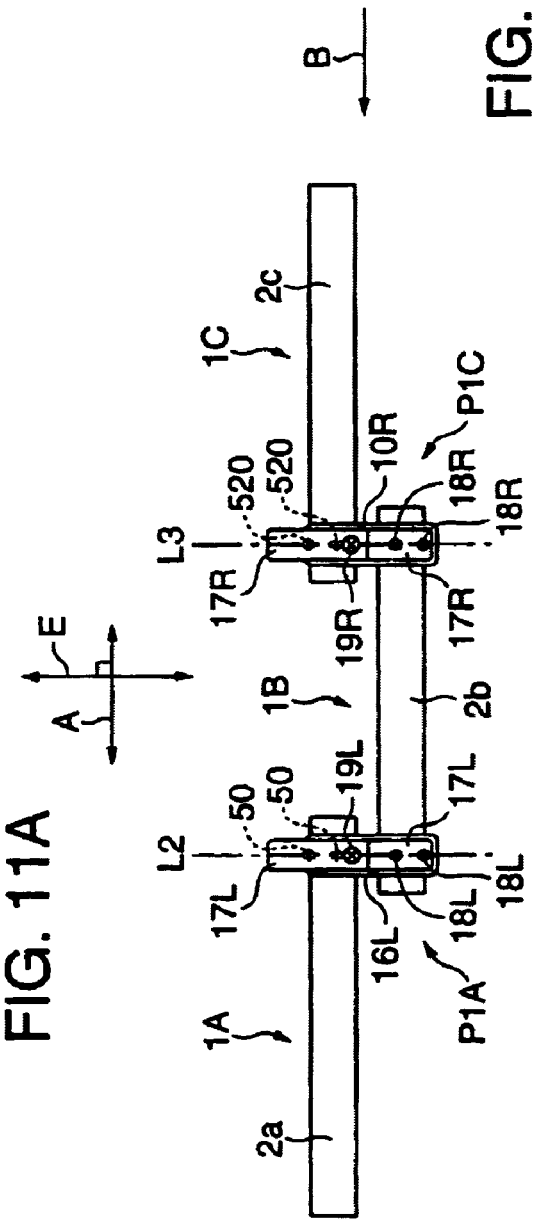
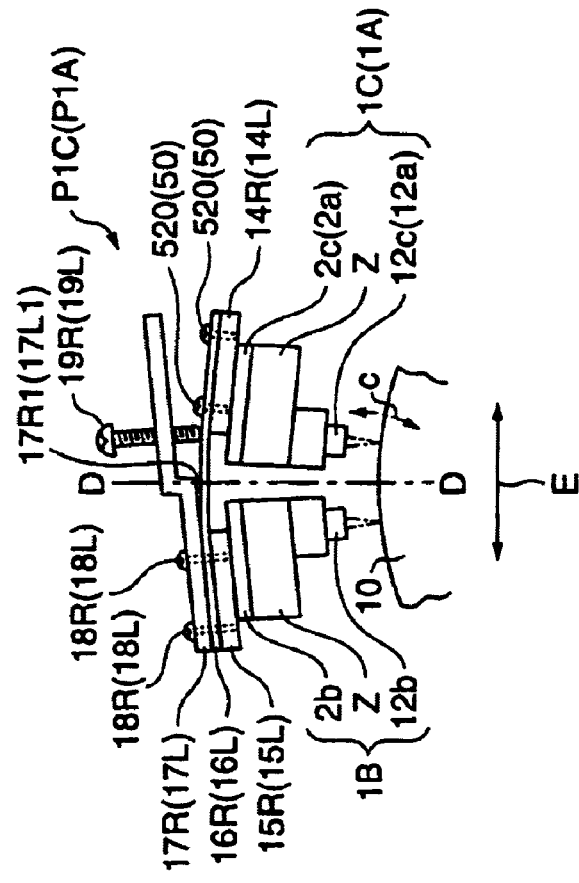
FIG. 11A
FIG. 11B

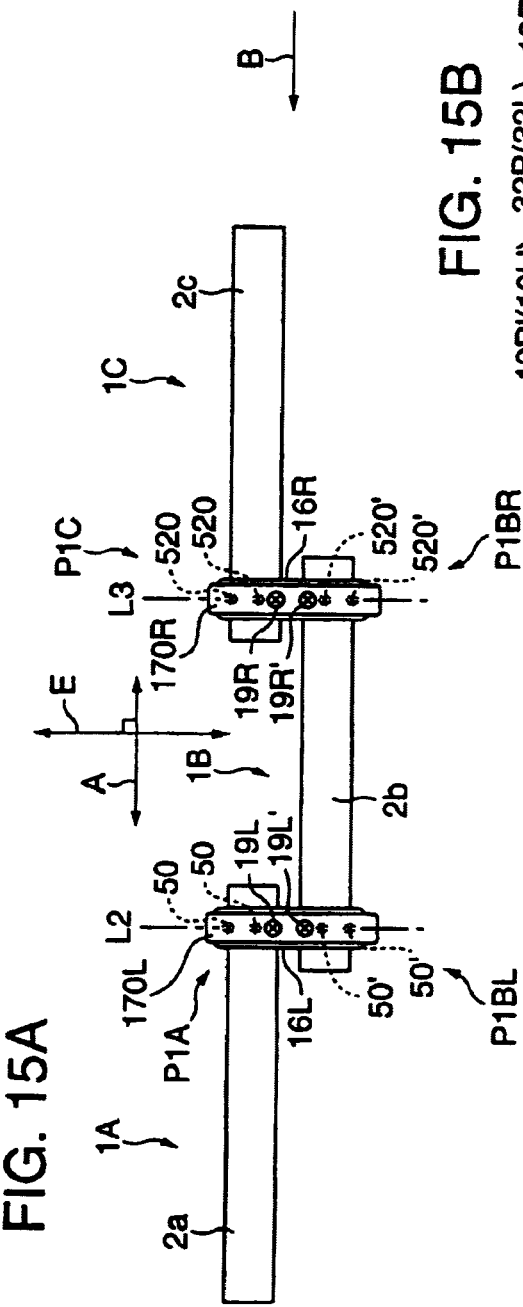
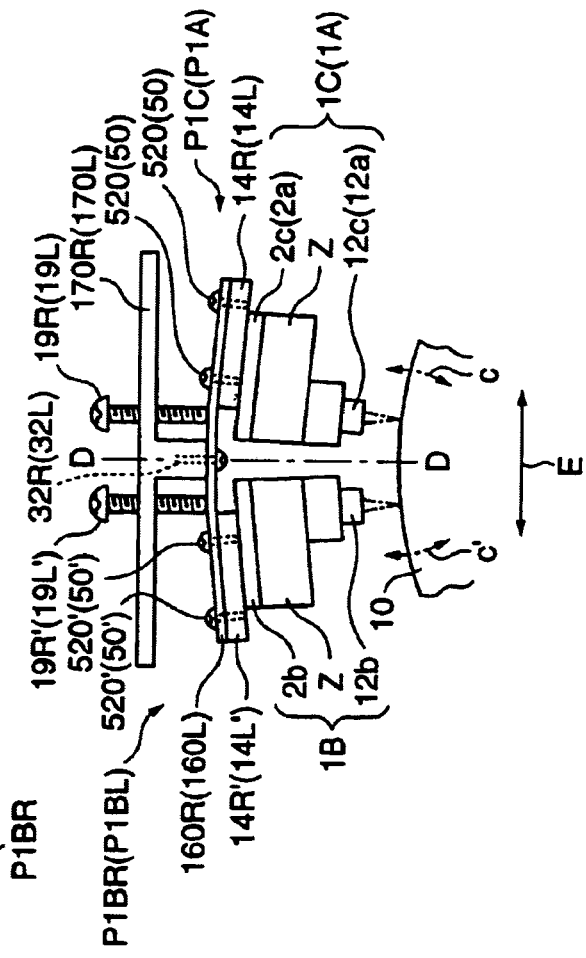

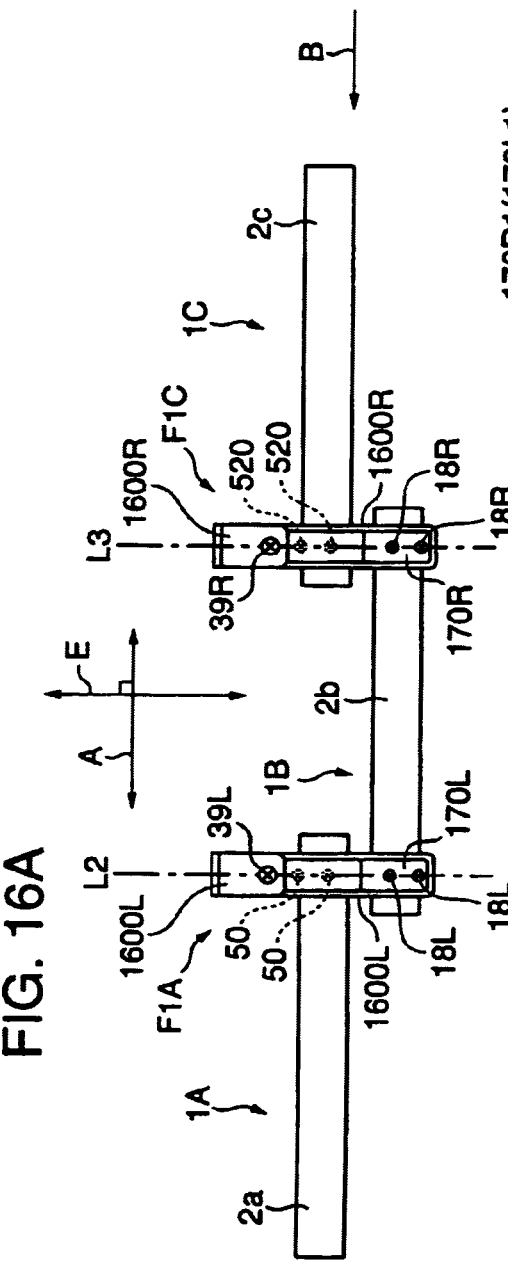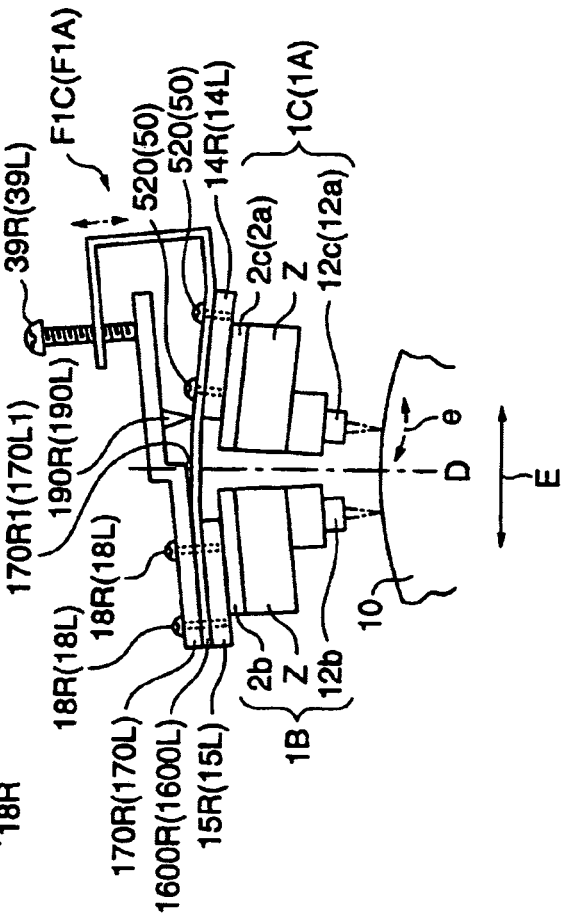

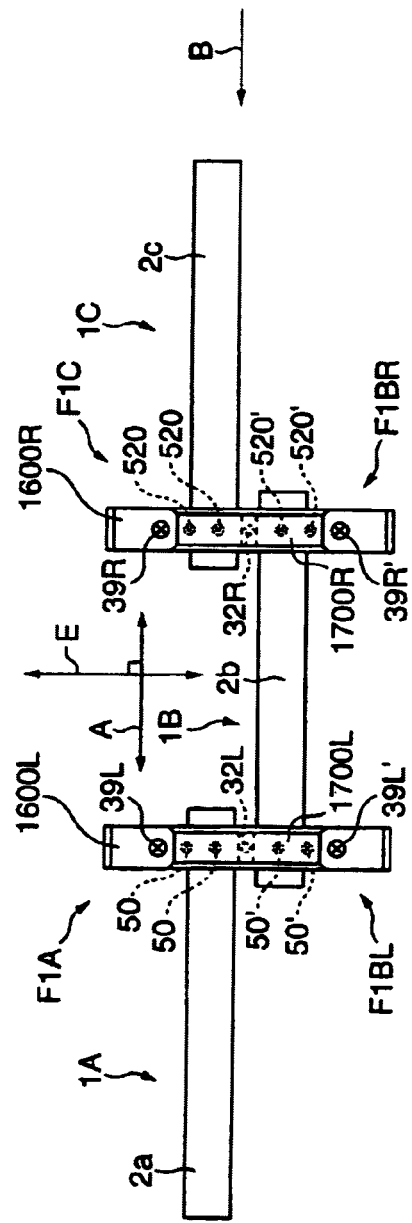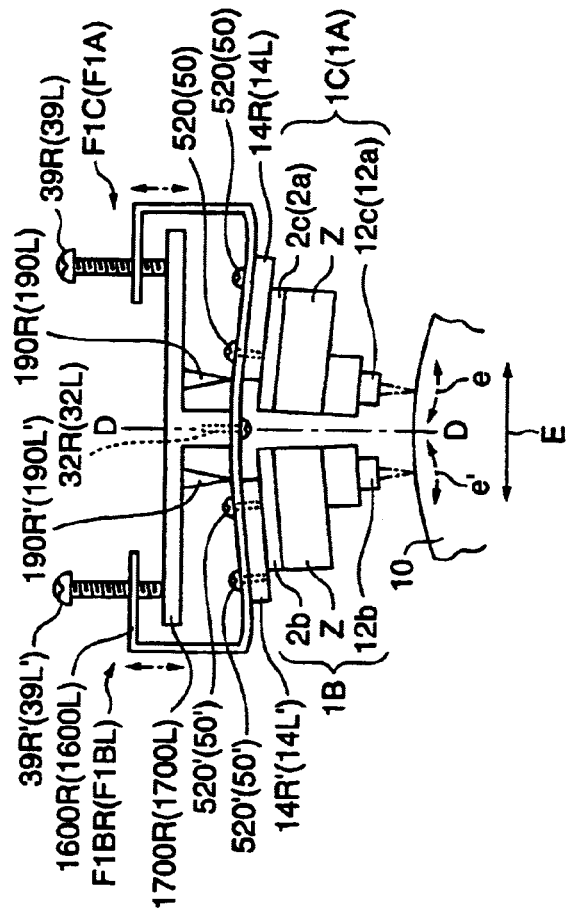
FIG. 17A
FIG. 17B

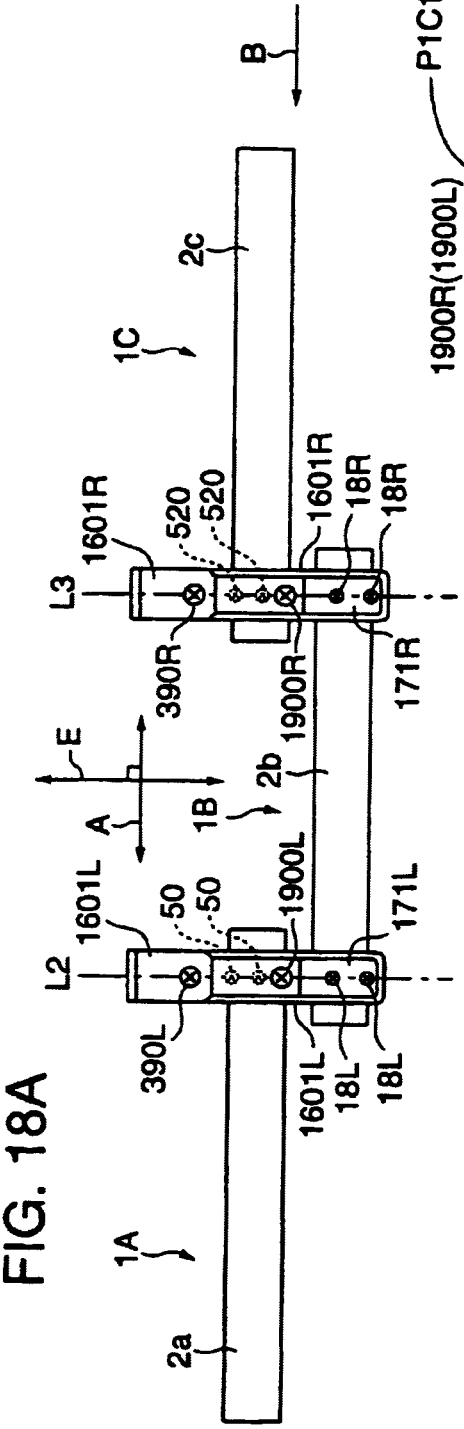
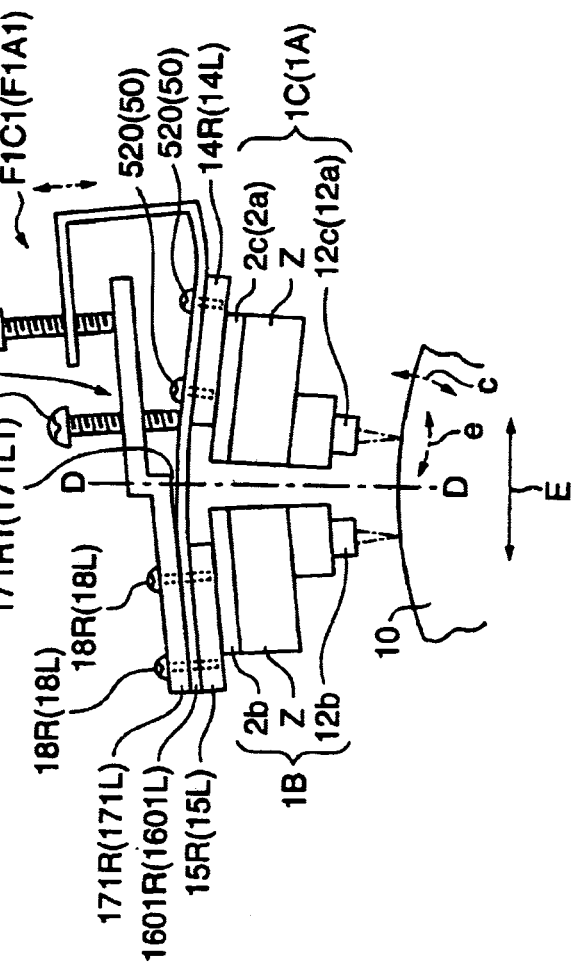
FIG. 18A
FIG. 18B

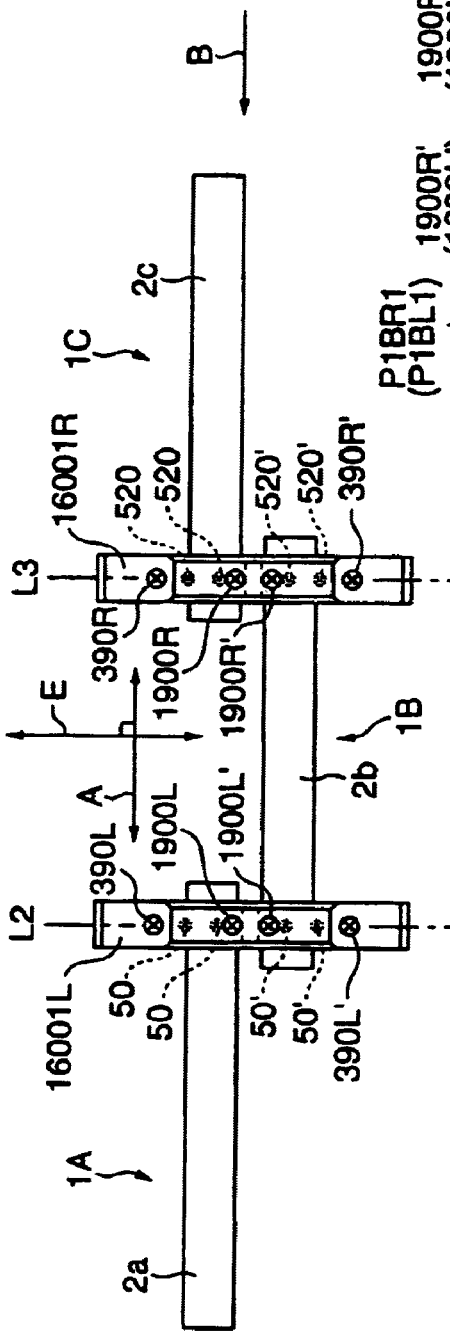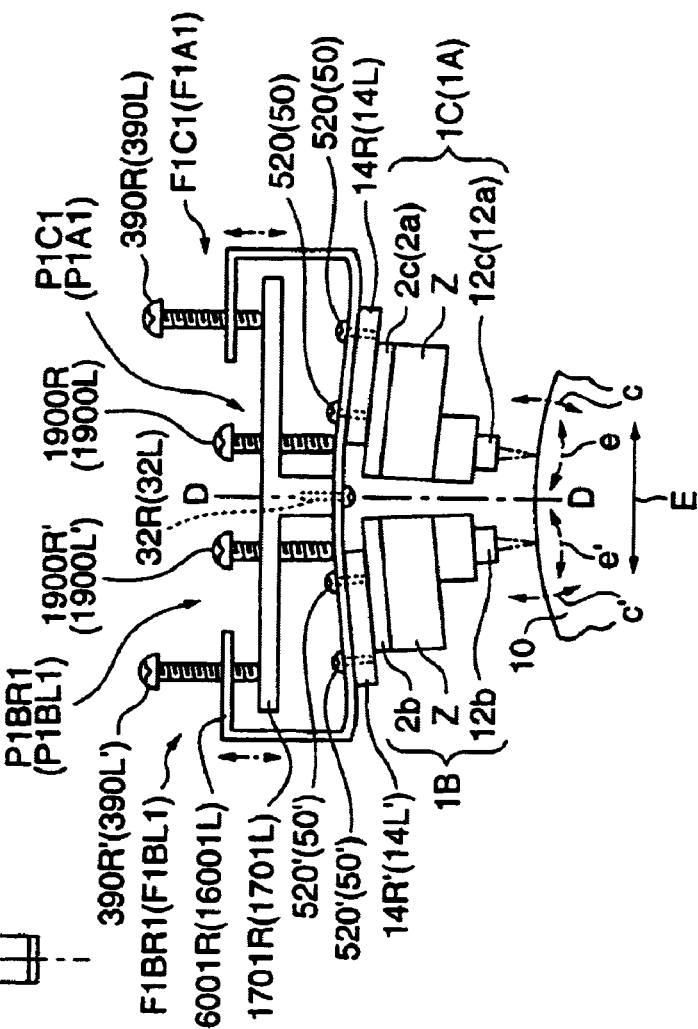
FIG. 27A
FIG. 27B

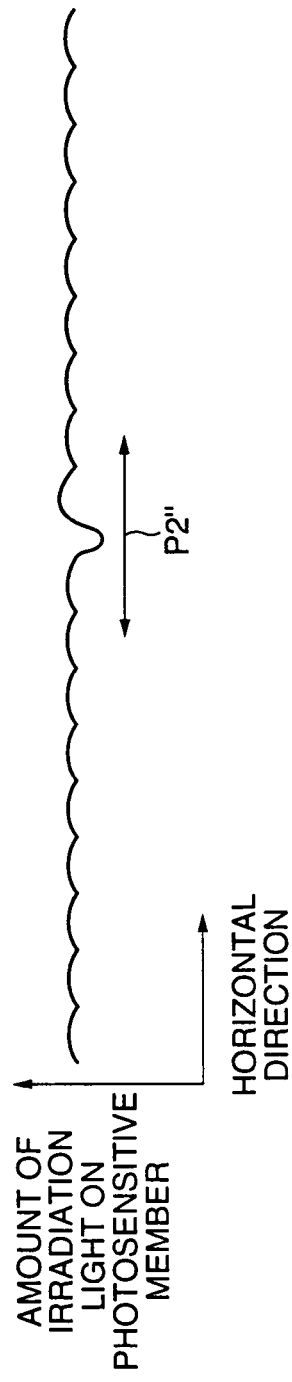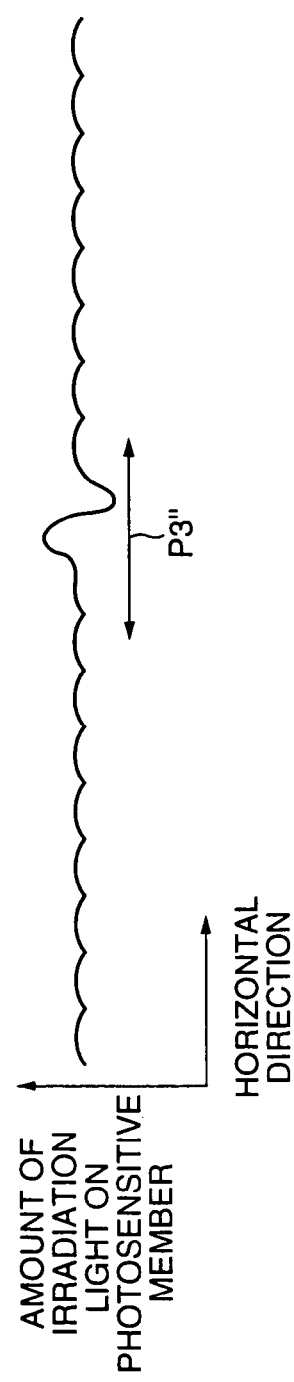

OPTICAL WRITE APPARATUS INCLUDING A PLURALITY OF SUBSTRATES

BACKGROUND OF THE INVENTION

1. Field of the Invention

The present invention relates to an optical write apparatus, a method of adjusting the position of the optical write apparatus, a method of controlling the light emitting condition of the optical write apparatus, and an image forming apparatus.

2. Description of the Related Art

Japanese Laid-Open Patent Application No. 7-61035 (A) and Japanese Patent Publication No. 64-16342 (B) disclose optical write apparatuses comprising a plurality of printed boards (hereinafter referred to simply as "substrates") each having a great number of light emitting diodes aligned in one direction. Those substrates are shifted from each other in the aligning direction of the light emitting diodes.

In the above prior art, light emitting diode array units include the substrates that are relatively small in length, having a length of A3 size paper (297×420 mm paper), for instance. The light emitting diode array units are arranged in the longitudinal direction of the light emitting diodes, thereby forming one long light emitting diode array unit. The integrated light emitting diode array units irradiate a photosensitive member with light to form a latent image. In doing so, the integrated light emitting diode array units have advantages as follows.

(a) With the above light emitting diode array units, it is possible to form a wide image, such as an A0 size image (841×1189 mm). To form such a wide image, a light emitting diode array unit using a substrate having a length of approximately 1 m can be used. However, it is costly to produce a 1 m long substrate using light emitting diodes aligned at 400 dpi (a dot pitch of 63.5 µm), because the accuracy needs to be maintained in the entire length of the light emitting diode array unit, the size of the apparatus becomes large, and the yield decreases. The integrated short light emitting diode array units disclosed in (A) and (B) can solve this problem.

(b) If one light emitting diode corresponding to 1 dot is broken in a light emitting diode array unit constituted by one substrate having a length of 1 m, the entire light emitting diode array unit needs to be replaced. In the integrated light emitting diode array units, on the other hand, only the substrate having the broken light emitting diode needs to be replaced.

Despite the above advantages, the optical write apparatus having a plurality of substrates shifted from each other in the aligning direction of the light emitting diodes has a problem in the dot switching positions at each seam between the adjacent substrates.

More specifically, as the dot pitch at 400 dpi is 63.5 µm, a dot pitch error needs to be restricted to less than 5 µm to avoid black and white lines appearing in an image.

At each seam portion, connecting the light emitting diode array units simply by connecting members, as in (A) and (B), is not sufficient to prevent the ambient temperature from varying and the light emitting diodes from generating heat. The inner temperature in an image forming apparatus employing the optical write apparatus including the light emitting diode array units rises to heat the seam portions between the substrates. As a result, the connecting members expand due to the heat, and the dot pitch at each seam portion is changed.

For example, if the distance between the seam portions of the connecting members connecting the light emitting diode array units is 20 mm, the material of the connecting members is iron having a linear expansion coefficient of 0.000012/deg, and the temperature rise is 30 degrees, a pitch shift of 7.2 µm will be caused by the temperature rise alone. Taking the accuracy in the initial positioning of the light emitting diode array units into account, the dot pitch error at the seam portions will become large enough to cause defects in an image.

SUMMARY OF THE INVENTION

An object of the present invention is to provide a plurality of short substrates that substantially constitute one substrate in an optical write apparatus. Another object of the present invention is to provide an optical write apparatus that can avoid image deterioration due to thermal expansion caused by ambient temperature fluctuation or heat generated by light emitting diodes. Yet another object of the present invention is to provide a method of adjusting the position of the above optical write apparatus, and an image forming apparatus that employs the same optical write apparatus.

A more specific object of the present invention is to provide an optical write apparatus in which the dot pitch at the seam portions between light emitting diode array units does not become large enough to cause image defects, even when the temperature of substrates or the temperature of connecting members that connect the light emitting diode array units or the substrates constituting the optical write apparatus fluctuates due to an ambient temperature fluctuation or heat generated from the light emitting diodes. Other specific objects of the present invention are to provide a method of adjusting the position of the above optical write apparatus and an image forming apparatus employing the same optical write apparatus.

The above objects of the present invention are achieved by an optical write apparatus comprising a plurality of substrates each having a large number of light emitting diodes aligned in one direction. The plurality of substrates are shifted from each other in the aligning direction of the light emitting diodes. Among the substrates, every two substrates adjacent to each other in the aligning direction of the light emitting diodes are fixed to each other.

The above objects of the present invention are also achieved by an optical write apparatus comprising: a plurality of light emitting diode array units arranged in a horizontal direction of a photosensitive member, each of the plurality of light emitting diode array units emitting light from light emitting diodes onto the photosensitive member to form a latent image thereon; and a light emission amount correction unit that corrects the amount of light emitted from a light emitting diode located at a seam portion between adjacent light emitting diode array units so that the amount of exposure light in the horizontal direction of the photosensitive member becomes uniform.

The above objects of the present invention are also achieved by an optical write apparatus comprising: a plurality of light emitting diode array units arranged in a horizontal direction of a photosensitive member, the plurality of light emitting diode array units each emitting light from light emitting diodes onto the photosensitive member to form a latent image thereon; and a write range shift unit that shifts a write range, in the horizontal direction, of at least one of adjacent light emitting diode array units connected at a seam portion therebetween.

The above objects of the present invention are also achieved by a method of positioning an optical write apparatus to be attached to an image forming apparatus, the optical write apparatus comprising a plurality of substrates each having a great number of light emitting diodes aligned in one direction, the substrates being shifted from one another in a horizontal direction. This method comprises the steps of: displacing the optical write apparatus from an image forming apparatus, so that one of two substrates adjacent to each other in the horizontal direction is positioned in a focusing direction that corresponds to the thickness direction of the substrate; and displacing the other one of the adjacent substrates from the optical write apparatus, so that the other one of the adjacent substrates is positioned in the focusing direction that corresponds to the thickness direction of the substrate.

The above objects of the present invention are also achieved by a method of adjusting a light emitting state of an optical write apparatus that adjusts the light emitting state of light emitting diodes located at each seam portion between light emitting diode array units so as to even the amount of exposure light applied to a photosensitive member at each seam portion when forming a latent image by exposing the photosensitive member to the light emitted from the light emitting diodes aligned on each of the light emitting diode array units arranged in a horizontal direction of the photosensitive member. This method comprises the steps of:

when there is a difference between a reference gap between the light emitting diodes and an actual gap between the light emitting diodes located at the ends of write ranges of the light emitting diodes array units connected at the seam portion, shifting the write range of at least one of light emitting diode array units connected at the seam portion by the light emitting diode, thereby narrowing the difference; and when there is a remaining difference, adjusting the amount of light emitted from the light emitting diode located at the end of at least one of the light emitting diode array units connected at the seam portion, so as to eliminate unevenness of the amount of exposure light caused by the remaining difference.

BRIEF DESCRIPTION OF THE DRAWINGS

Other objects and further features of the present invention will become more apparent from the following description taken in conjunction with the accompanying drawings.

FIG. 11A is a plan view of three light emitting diode array units connected by connecting members;

FIG. 11B shows the three light emitting diode array units seen from the direction of the arrow B of FIG. 11A;

FIG. 15A is a plan view of three light emitting diode array units connected by connecting members;

FIG. 15B shows the three light emitting diode array units seen from the direction of the arrow B of FIG. 15A;

FIG. 16A is a plan view of three light emitting diode array units connected by connecting members;

FIG. 16B shows the three light emitting diode array units seen from the direction of the arrow B of FIG. 16A;

FIG. 17A is a plan view of three light emitting diode array units connected by connecting members;

FIG. 17B shows the three light emitting diode array units seen from the direction of the arrow B of FIG. 17A;

FIG. 18A is a plan view of three light emitting diode array units connected by connecting members;

FIG. 18B shows the three light emitting diode array units seen from the direction of the arrow B of FIG. 18A;

FIG. 27A is a plan view of three light emitting diode array units connected by connecting members;

FIG. 27B shows the three light emitting diode array units seen in the direction of the arrow B of FIG. 27A;

FIGS. 30A and 30B are diagrams each showing the relationship between the amount of emitted light and a position in the horizontal direction of the photosensitive member corresponding to the seam between the light emitting diode array units of FIG. 5;

DESCRIPTION OF THE PREFERRED EMBODIMENTS

The following is a description of embodiments of the present invention, with reference to the accompanying drawings.

[1] First Embodiment

1-a: Example 1

Figure 1:
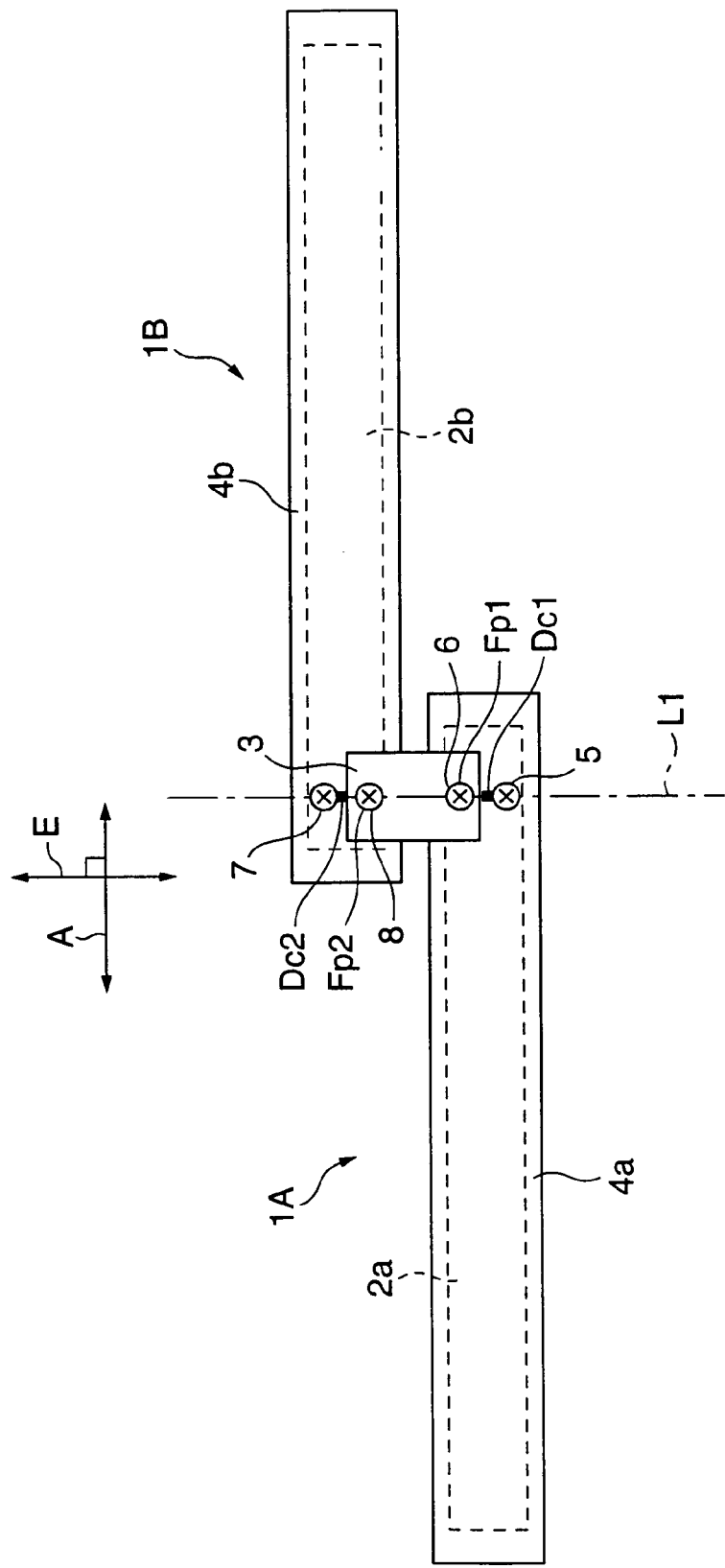
FIG. 1 is a plan view illustrating the relative positional relationship among a plurality of light emitting diode array units of an optical write apparatus in accordance with the present invention.
Figure 2:
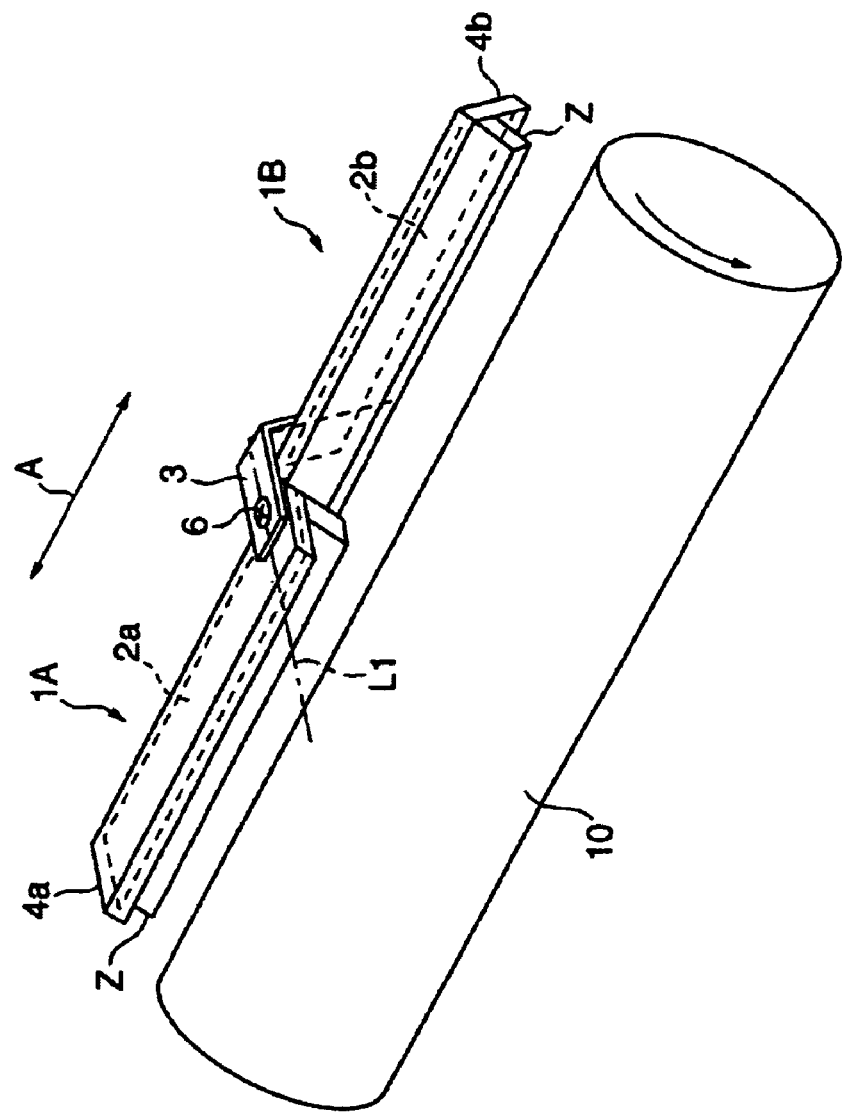
FIG. 2 is a perspective view of the optical write apparatus and a photosensitive drum.

FIG. 1 is a plan view illustrating the relative positional relationship among a plurality of light emitting diode array units of an optical write apparatus in accordance with the present invention. FIG. 2 is a perspective view of the optical write apparatus and a photosensitive drum in an image forming apparatus.

This optical write apparatus comprises two light emitting diode array units 1A and 1B having substrates 2a and 2b, respectively, on which a plurality of light emitting diodes (not shown) are arranged in the direction of the arrow A. The light emitting diode array units 1A and 1B are shifted from each other in the direction of the arrow A, and are connected by a connecting member 3, as shown in FIG. 1.

In this optical write apparatus, dot switching points Dc1 and Dc2 on the substrates of the respective light emitting diode array units 1A and 1B, a fixing point Fp1 for fixing the connecting member 3 to the light emitting diode array unit 1A, and a fixing point Fp2 for fixing the connecting member 3 to the light emitting diode array unit 1B are aligned in a line L1.

More specifically, the substrate 2a of the light emitting diode array unit 1A is fixed to a housing 4a by a screw 5 in the line L1, and the housing 4a is fixed to the connecting member 3 by a screw 6 at the fixing point Fp1. The substrate 2b of the light emitting diode array unit 1B fixed to a housing 4b by a screw 7 in the line L1, and the housing 4b is fixed to the connecting member 3 by a screw 8 at the fixing point Fp2.

In this example, the substrates 2a and 2b are thin plates made of synthetic resin, and have enough rigidity as auxiliary members. The housings 4a and 4b having a heat radiating function are arranged along the substrates 2a and 2b.

The substrates 2a and 2b are fixed to each other via the housings 4a and 4b, which also serve as auxiliary members, and the connecting member 3. By securing the substrates having the aligned light emitting diodes, the light emitting diode array units 1A and 1B substantially function as one light emitting diode array unit.

Besides the housings 4a and 4b and the connecting member 3, auxiliary members include a lens case provided with a lens array that forms images from light from the light emitting diodes. The lens case denoted by Z in FIG. 2 includes the housings 4a and 4b. The lens case is fixed to the housings 4a and 4b by adhesion. The substrates 2a and 2b fixed to each other are reinforced with those auxiliary members.

In this example, the screw 5, the fixing points Fp1 and Fp2, and the screw 7 are arranged in the line L1, so that the fixing point of the auxiliary members including the substrates 2a and 2b are arranged in the line L1, whether one or a plurality of auxiliary members are interposed between the substrates 2a and 2b.

In other words, the fixed path from the housing 4a to the housing 4b via the connecting member 3 is fixed in the line L1. Thus, any other member interposed between the substrates 2a and 2b cannot hinder the fixation between the substrates 2a and 2b, and thermal expansion or thermal contraction will have no influence with the substrates 2a and 2b.

The write dot switching points Dc1 and Dc2 on the substrates 2a and 2b are located in the line L1. The fixation between the substrate 2a and the housing 4a, the fixation between the housing 4a and the connecting member 3, the fixation between the substrate 2b and the housing 4b, and the fixation between the housing 4b and the connecting member 3 may be carried out by some other means, such as adhesion or caulking with rivets. The substrates 2a and 2b, the connecting member 3, and the housings 4a and 4b do not need to be made of a special material or a material having a certain linear expansion coefficient.

Figure 10:
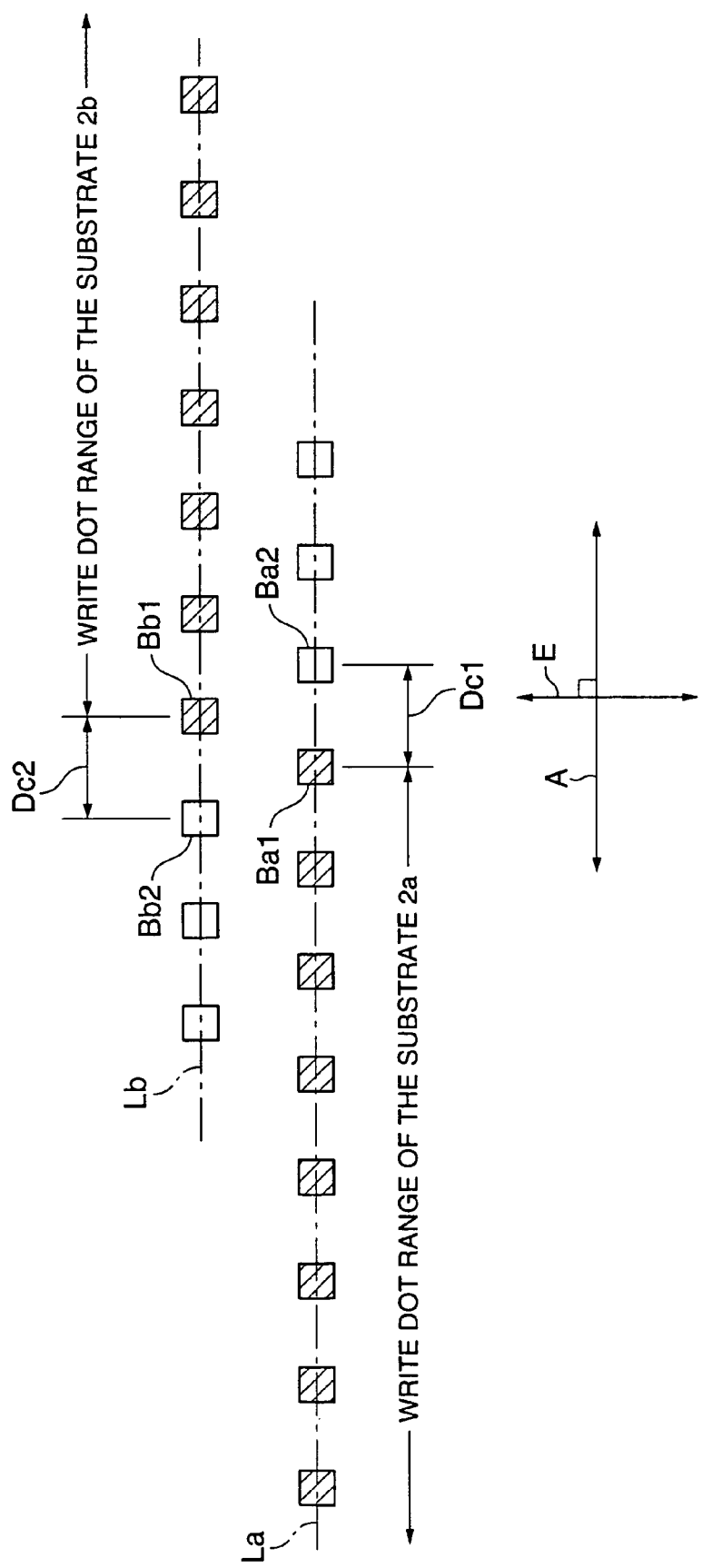
FIG. 10 is a schematic view of light emitting diodes aligned on a substrate.

Each of the write dot switching points Dc1 and Dc2 on the substrates 2a and 2b is not one dot, but has some extent when microscopically seen. In FIG. 10, each light emitting diode is indicated by a rectangle. The light emitting diodes on the substrate 2a are arranged in a line La at uniform intervals, and the light emitting diodes on the substrate 2b are arranged in a line Lb at uniform intervals. The rows of the light emitting diodes on the substrates 2a and 2b have an overlapping portion when seen from a vertical direction that is perpendicular to the rows of the light emitting diodes. For ease of explanation, the light emitting diodes that emit light for writing are shaded in FIG. 2. Accordingly, the shaded rectangles in FIG. 2 represent the write dot ranges on the substrates 2a and 2b.

When seen from the vertical direction perpendicular to the arrow A, the write dot range on the substrate 2a and the write dot range on the substrate 2b should never overlap with each other, and the gap between the write dot ranges should be shorter than an interval between two light emitting diodes. The write dot switching point Dc1 on the substrate 2a and the write dot switching point Dc2 on the substrate 2b are aligned in such positions that satisfy those conditions. Thus, the substrate 2a and 2b can function as one substrate.

The write dot switching point Dc1 on the substrate 2a is located between light emitting diodes Ba1 represented by shaded rectangles and light emitting diodes Ba2 represented by white rectangles. The write dot switching point Dc2 on the substrate 2b is located between light emitting diodes Bb1 represented by shaded rectangles and light emitting diodes Bb2 represented by white rectangles.

As shown in FIG. 2, each of the light emitting diodes aligned on the substrates 2a and 2b of the light emitting diode array units 1A and 1B faces a photosensitive drum 10. The light emitting diodes irradiate the photosensitive drum 10 so as to form a desired latent image on the photosensitive drum 10.

Figure 3:
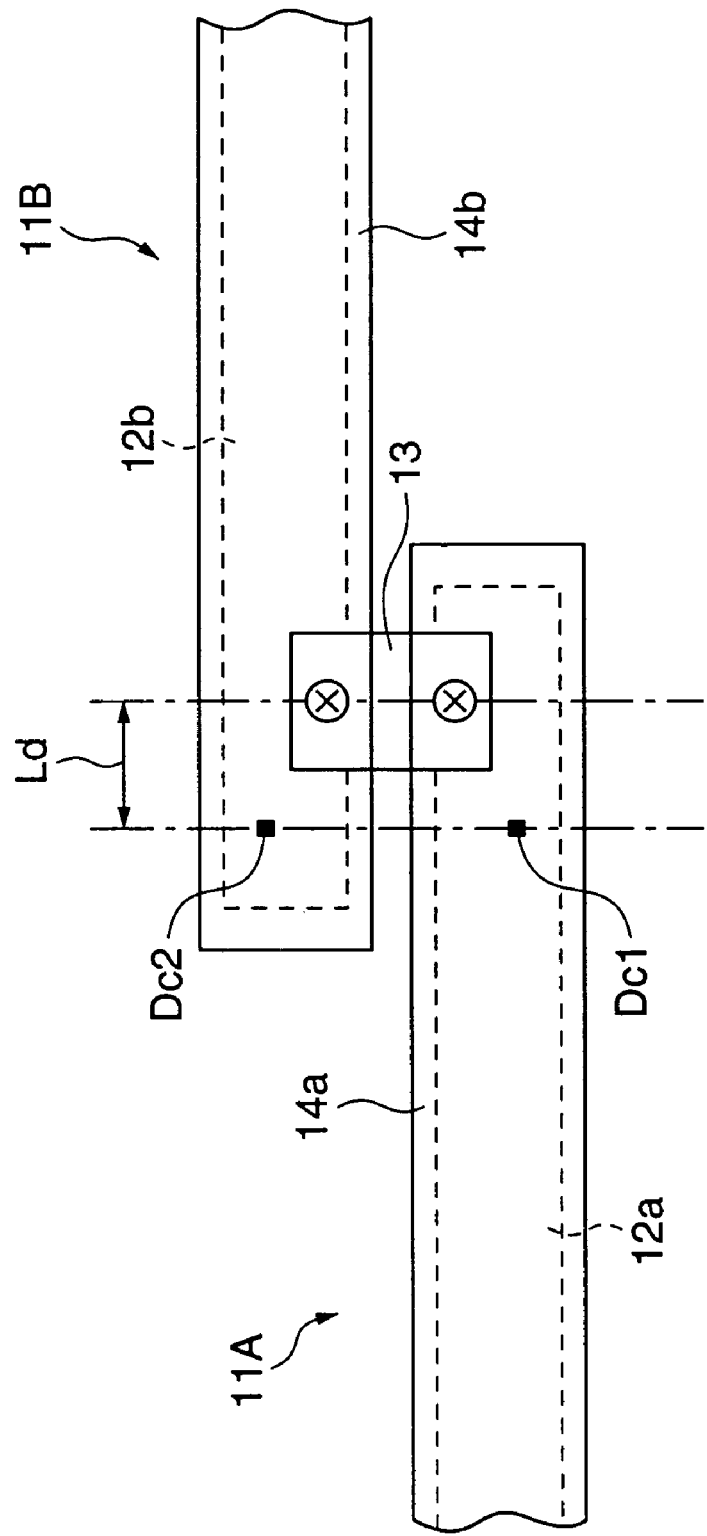
FIG. 3 illustrates a problem caused by a distance between the dot switching points and fixed points for fixing adjacent light emitting diode array units.

As described before, a conventional optical write apparatus having a plurality of light emitting diode array units that are simply connected has the problem that the dot intervals (the light emitting diode intervals) at the write dot switching points on the substrates vary with a temperature rise in the light emitting diode array units. Those varied dot intervals at the write dot switching points often result in a defective image. As shown in FIG. 3, for instance, where there is a distance Ld from the write dot switching points Dc1 and Dc2 to the fixing points of a connecting member 13 to housings 14a and 14b and the substrates 2a and 2b, the substrate 2a expands by a value determined by multiplying a predetermined linear expansion coefficient by the distance Ld and the temperature rise. As a result, the write dot switching point Dc1 shifts to the left in FIG. 3.

In this case, the substrate 2b also expands, and the write dot switching point Dc2 accordingly shifts to the left in FIG. 3. However, since linear expansion coefficients and temperature distributions vary among the components, the write dot switching points Dc1 and Dc2 relatively drift from the original locations.

For ease of explanation, the substrate 2a and the housing 14a are fixed to the connecting member 13 by a screw, and the substrate 2b and the housing 14b are screwed to the connecting member 13 by a screw in FIG. 3. However, where the connecting member 13 is fixed to the housing 14a by a screw while the housing 14a is fixed to the substrate 2b by a screw at another location, the relative drift of the write dot switching points Dc1 and Dc2 becomes even greater.

In reality, a track pitch error corresponding to the relative drift of the write dot switching points Dc1 and Dc2 becomes even greater due to the initial positioning accuracy of the light emitting diode array units 11A and 11B as well as the expansion of each component.

If the dot pitch error exceeds 5 μm, which will cause vertical black and white lines in an image, the image corresponding to the seam portion of the write dot switching points Dc1 and Dc2 becomes defective.

In this optical write apparatus, on the other hand, the image corresponding to the seam portion of the write dot switching points Dc1 and Dc2 does not become defective, because the write dot switching points Dc1 and Dc2, the fixing point Fp1 for fixing the housing 4a to the connecting member 3, the fixing point Fp2 for fixing the housing 4b to the connecting member 3, the position for fixing the substrate 2a to the housing 4a by the screw 5, and the position for fixing the substrate 2b to the housing 4b by the screw 7 are aligned in the line L1.

When the write dot switching points Dc1 and Dc2, the fixing point of the substrate 2a to the housing 4a, and the fixing point of the substrate 2b to the housing 4b are aligned in the line L1, the distance Ld from the write dot switching points Dc1 and Dc2 to the fixing points of the connecting member 13 to the housings 14a and 14b and the substrate 2a and 2b becomes zero. Accordingly, the dot pitch error corresponding to the relative drift of the write dot switching points Dc1 and Dc2 also becomes zero.

The dot pitch error is caused by expansion of the substrates 2a and 2b or the housings 4a and 4b due to a temperature rise. The expansion of the substrates 2a and 2b or the housings 4a and 4b can be calculated by multiplying the linear expansion coefficient by the distance Ld and the temperature rise.

In the optical write apparatus shown in FIGS. 1 and 2, the distance Ld is zero, because the write dot switching points Dc1 and Dc2 on the substrates 2a and 2b, the fixing point Fp1 for fixing the housing 4a to the connecting member 3, the fixing point Fp2 for fixing the housing 4b to the connecting member 3, the point for fixing the substrate 2a to the housing 4a by the screw 5, and the point for fixing the substrate 2b to the housing 4b by the screw 7 are aligned in the line L1.

Accordingly, the write dot switching points Dc1 and Dc2 on the substrates do not drift from the line L1 with a temperature rise, so that the relative positions of the write dot switching points Dc1 and Dc2 do not shift in the direction of the arrow A. Thus, a high-quality image can be obtained, and the two adjacent substrates can function as one substrate even if the ambient temperature changes or the light emitting diodes generate heat.

1-b: Example 2

Figure 4:
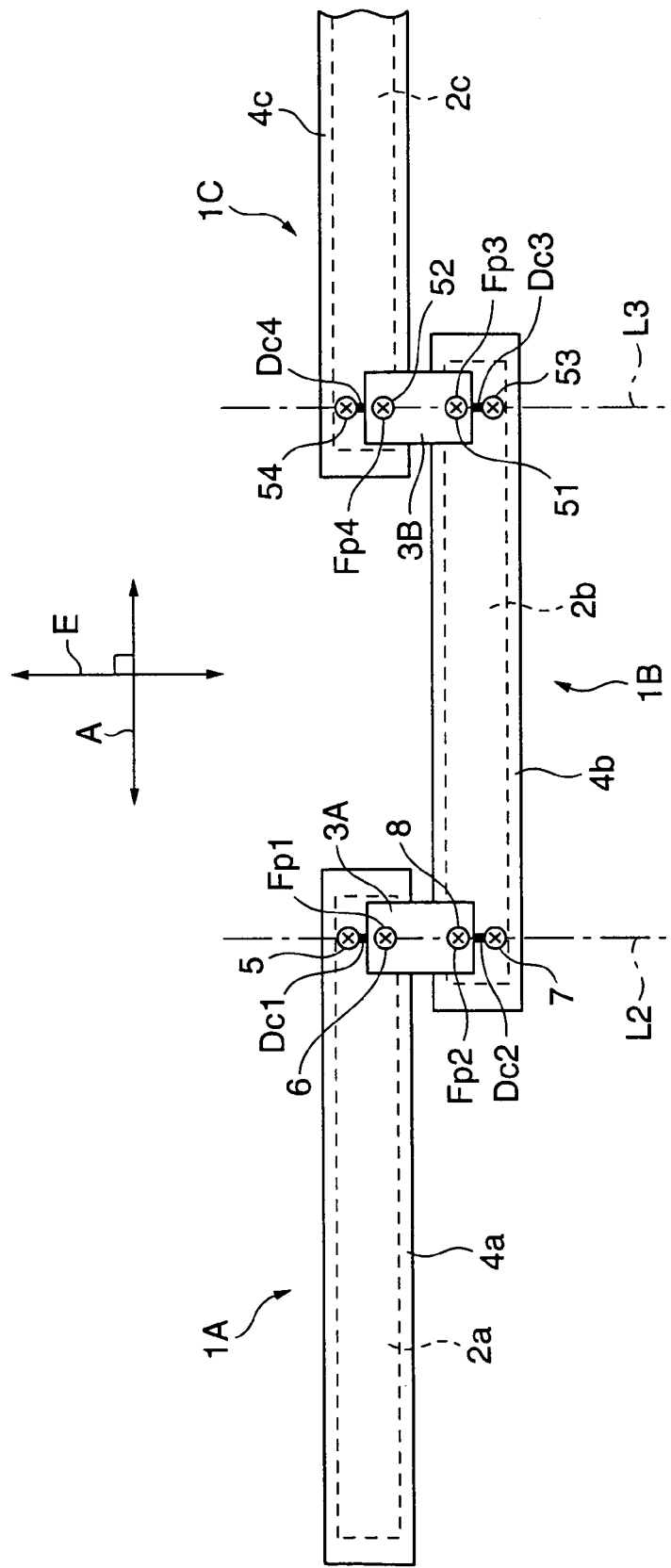
FIG. 4 is a plan view of an optical write apparatus comprising three light emitting diode array units.
Figure 5:
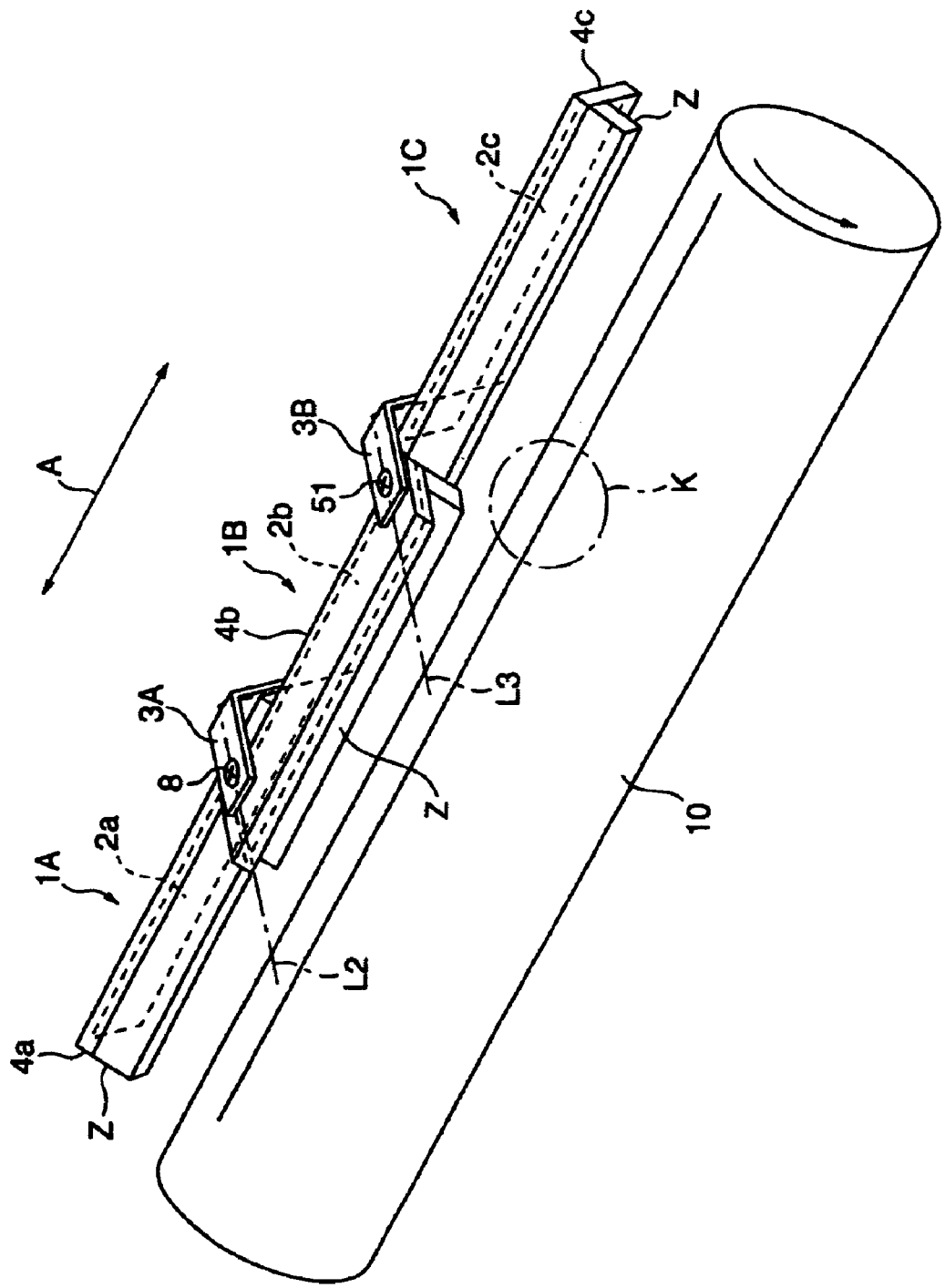
FIG. 5 is a perspective view of the optical write apparatus of FIG. 4 and a photosensitive drum.

FIG. 4 is a plan view of an optical write apparatus having three light emitting diode array units that are shifted from each other. FIG. 5 is a perspective view of the optical write apparatus of FIG. 4 and a photosensitive drum. In FIGS. 4 and 5, the same components as in FIGS. 1 and 2 are denoted by the same reference numerals.

As shown in FIG. 4, the optical write apparatus comprises three (or more) light emitting diode array units 1A, 1B, and 1C having substrates 2a, 2b, and 2c. The light emitting diode array units 1A, 1B, and 1C are shifted from each adjacent other, and connected by connecting members 3A and 3B.

In FIG. 4, the write dot switching points on the substrate of the light emitting diode array unit 1B adjacent to the light emitting diode array units 1A and 1C are denoted by Dc2 and Dc3, the write dot switching points on the respective substrates of the light emitting diode array units 1A and 1C both adjacent to the light emitting diode array unit 1B are denoted by D1 and D4, respectively, the fixing points for fixing the housings 4a and 4b of the light emitting diode array units 1A and 1B to the connecting member 3A are denoted by Fp1 and Fp2, and the fixing points for fixing the housings 4b and 4c to the connecting member 3B are denoted by Fp3 and Fp4. The fixing points Fp1 and Fp2 and the write dot switching points Dc1 and Dc2 are aligned in a line L2, while the fixing points Fp3 and Fp4 and the write dot switching points Dc3 and Dc4 are aligned in a line L3.

With this structure, the neighboring substrates can function as one substrate, even if the ambient temperature varies or the light emitting diodes generate heat. Although the optical write apparatus of this example comprising three light emitting diode array units is larger than the optical write apparatus of the first example, the alignment of the write dot switching points does not change in the aligning direction of the light emitting diode array units. Thus, an image having no black and white lines can be obtained.

More specifically, the housing 4a of the light emitting diode array unit 1A is fixed to the connecting member 3A by the screw 6 at the fixing point Fp1, while the connecting member 3A is fixed to the housing 4b of the light emitting diode array unit 1B by the screw 8 at the fixing point Fp2. The housing 4b of the light emitting diode array unit 1B is fixed to the connecting member 3B by a screw 51 at the fixing point Fp3, while the connecting member 3B is fixed to the housing 4c of the light emitting diode array unit 1C by a screw 52 at the fixing point Fp4.

The substrate 2a is fixed to the housing 4a of the light emitting diode array unit 1 by the screw 5, while both ends of the substrate 2b are fixed to the housing 4b of the light emitting diode array unit 1B by screws 7 and 53. Further, a substrate 2c is fixed to the housing 4c of the light emitting diode array unit 1C by a screw 54.

The centers of the screws 5, 6, 7, and 8, and the write dot switching points Dc1 and Dc2 are all aligned in the line L2.

The centers of the screws 51, 52, 53, and 54, and the write dot switching points Dc3 and Dc4 are all aligned in the line L3.

The fixation of the substrate 2a to the housing 4a, the fixation of the substrate 2b to the housing 4b, the fixation of the substrate 2c to the housing 4c, the fixation of the housings 4a and 4b to the connecting member 3A, and the fixation of the housings 4b and 4c to the connecting member 3B are not limited to the screw fixation, but adhesion fixation or caulking fixation with rivets can be employed, as long as the relative positions of those components can be fixed.

The substrates 2a, 2b, and 2c, the connecting members 3A and 3B, and the housings 4a, 4b, and 4c do not need to be made of a special material having a certain linear expansion coefficient. The fixed point between the substrate 2a and the housing 4a and the fixed point between the left end of the substrate 2b and the housing 4b may be aligned in a line other than the line L2. Likewise, the fixed point between the right end of the substrate 2b and the housing 4b and the fixed point between the substrate 2c and the housing 4c may be aligned in a line other than the line L3.

Figure 6:
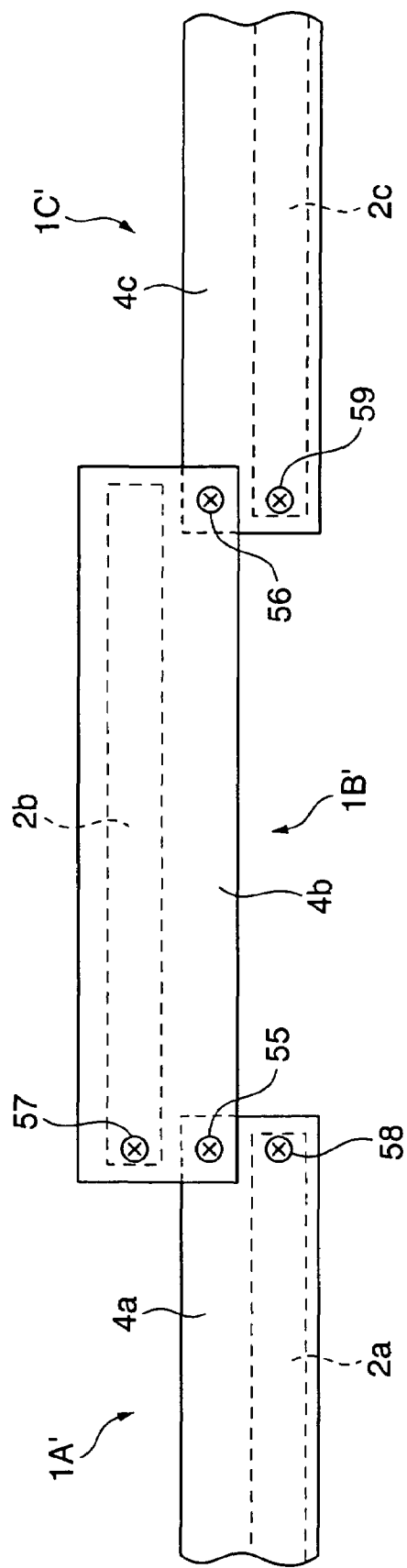
FIG. 6 illustrates a problem that the relative positions of the dot switching points of adjacent light emitting diode array units are shifted due to a temperature rise.

As shown in FIG. 6, the substrates 2a, 2b, 2c of light emitting diode array units 1A', 1B', and 1C' are made of a glass epoxy resin having a linear expansion coefficient of 0.000013/deg. The housings 4a, 4b, and 4c are made of an aluminum material having a linear expansion coefficient of 0.000024/deg. Taking the linear expansion coefficient differences into account, both ends of the housing 4b of the light emitting diode array unit 1B' are fixed directly (or via connecting members) to the housings 4a and 4c of the light emitting diode array units 1A' and 1C' by the screws 55 and 56. Here, the temperature rise is 30 degrees.

The substrate 2b and the housing 4b of the light emitting diode array unit 1B' are fixed to each other by a screw 57 at the left end of the light emitting diode array unit 1B'. The substrate 2a and the housing 4a of the light emitting diode array unit 1A' are fixed to each other by a screw 58 at one point, while the substrate 2c and the housing 4c of the light emitting diode array unit 1C' are fixed to each other by a screw 59 at one point.

In this case, the length of the light emitting diode array unit 1B' in the longitudinal direction is the same as the length of A3 size paper (approximately 300×420 mm paper). As a result, the rightmost end dot on the substrate 2b, furthest from the fixed point of the substrate 2b to the housing 4b, is drifted from the housing 4b by (0.000024−0.000013)×300 mm×30 deg=99 μm.

With such drifts of the dots, it is impossible to restrict the dot pitch error to less than 5 μm, which is the largest possible pitch error not to cause black and white vertical lines in an image. In reality, there are temperature distributions in the substrates 2a, 2b, and 2c, and the housings 4a, 4b, and 4c, and the drifts of the dots become even more complicated.

As described so far, even if the light emitting diode array units 1A, 1B, and 1C each having the width of A3 size paper constitute an optical write apparatus having the width of A0 size paper, the relative positions of the write dot switching points Dc1 and Dc2 on the respective substrates of the adjacent light emitting diode array units 1A and 1B, and the write dot switching points Dc3 and Dc4 on the respective substrates of the light emitting diode array units 1B and 1C do not drift in the aligning direction of the light emitting diodes (the direction of the arrow A of FIG. 4). Thus, an excellent image can be obtained.

1-c: Example 3

Figure 7:
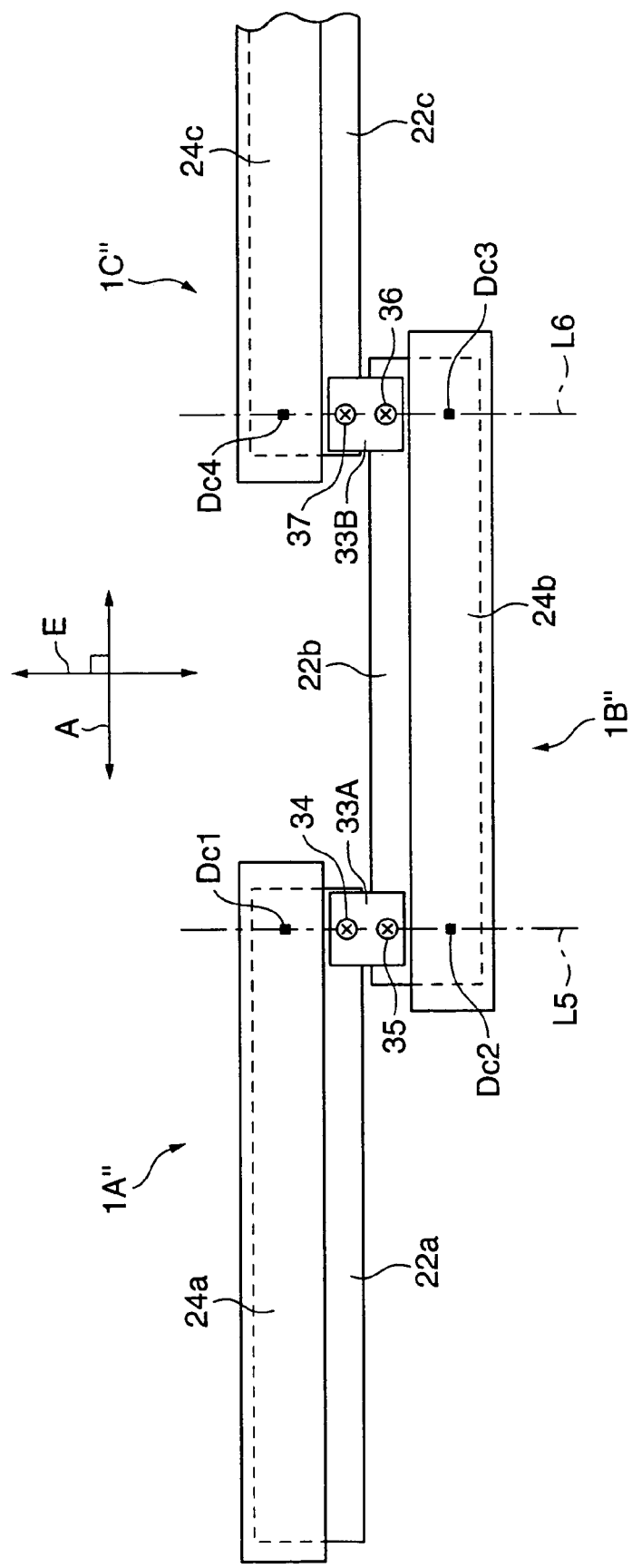
FIG. 7 is a plan view of an optical write apparatus in which each substrate partially protrudes from the housing.
Figure 8:
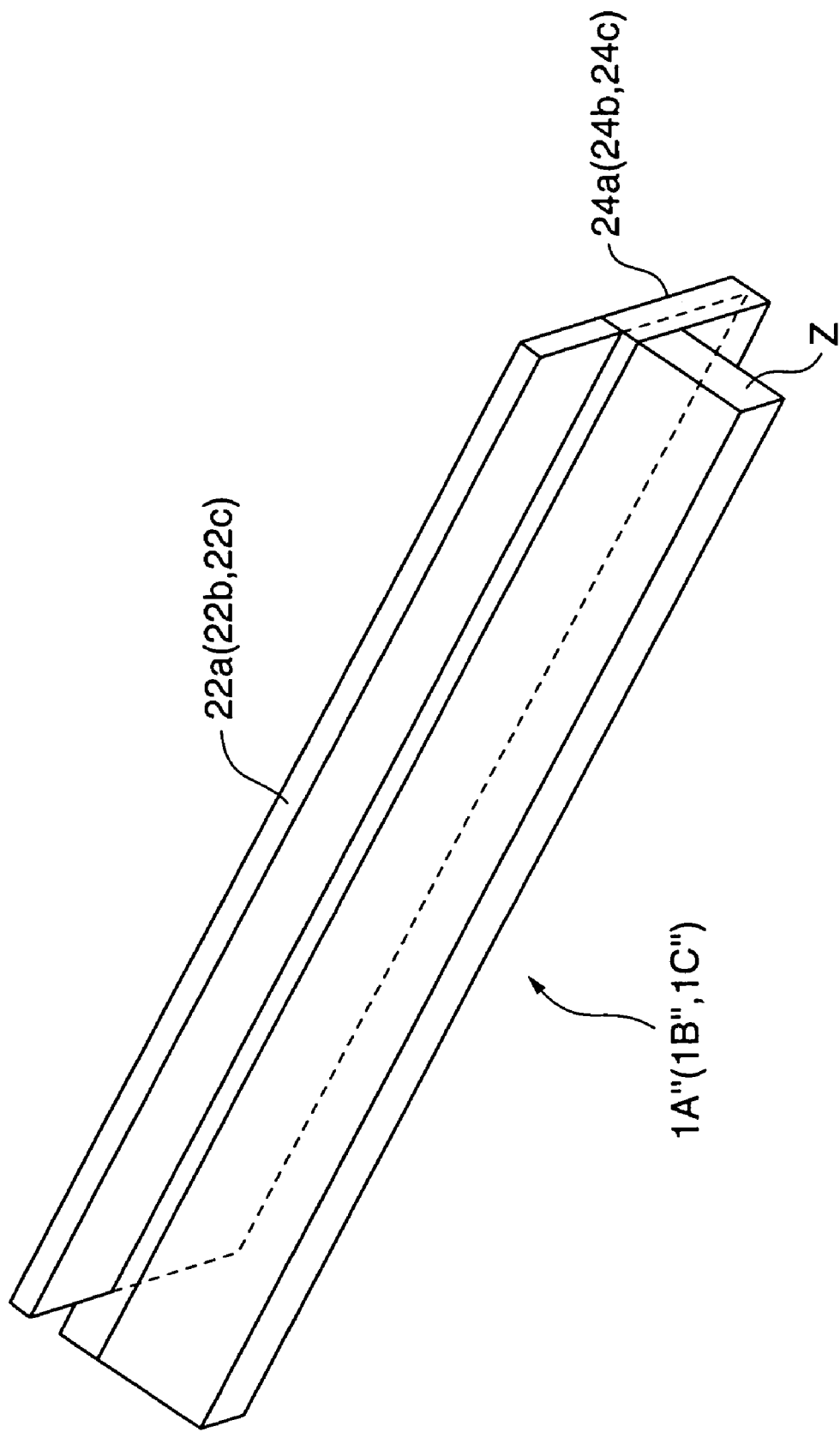
FIG. 8 is a perspective view of a light emitting diode array unit of the optical write apparatus of FIG. 7.

FIG. 7 is a plan view of an optical write apparatus having substrates protruding from the respective housings. FIG. 8 is a perspective view of one of the substrate of the optical write apparatus of FIG. 7. As shown in FIG. 7, the optical write apparatus of this example comprises three light emitting diode array units 1A", 1B", and 1C" (it may comprise two or more than three of light emitting diode array units). In the light emitting diode array units 1A", 1B", and 1C", substrates 22a, 22b, and 22c are fixed to housings 24a, 24b, and 24c in such a manner that a part of each of the substrates 22a, 22b, and 22c protrudes from each corresponding housing.

The protruding portions of the substrates 22a and 22b of the light emitting diode array units 1A" and 1B" are fixed to each other by the connecting member 33A with the screws 34 and 35.

Likewise, the protruding portions of the substrates 22b and 22c of the light emitting diode array units 1B" and 1C" are fixed to each other by the connecting member 33B with the screws 36 and 37.

The centers of the screws 34 and 35 and the write dot switching points Dc1 and Dc2 are aligned in a line L5 that is perpendicular to the aligning direction (indicated by the arrow A) of the light emitting diodes. The centers of the screws 36 and 37 and the write dot switching points Dc3 and Dc4 are aligned in a line L6 that is also perpendicular to the arrow A.

The fixation of the substrates 22a and 22b to the connecting member 33A and the fixation of the substrate 22b and 22c to the connecting member 33B are not limited to the screw fixation. Also, the substrates 22a, 22b, and 22c, and the connecting members 33A and 33B, and the housings 24a, 24b, and 24c do not need to be made of a special material having a certain linear expansion coefficient.

As described so far, even if the light emitting diode array units 1A", 1B", and 1C" arranged in the aligning direction of the light emitting diodes constitute an optical write apparatus, the relative positions of the write dot switching points Dc1 and Dc2 on the respective substrates 22a and 22b of the adjacent light emitting diode array units 1A" and 1B", and the relative positions of the write dot switching points Dc3 and Dc4 on the respective substrates 22b and 22c of the light emitting diode array units 1B" and 1C" do not drift in the aligning direction of the light emitting diodes (the direction of the arrow A of FIG. 7). Thus, an excellent image can be obtained.

Normally, if the linear expansion coefficient differences between the substrates 22a, 22b, and 22c, and the housings 24a, 24b, and 24c are large, or if the differences in temperature distribution are large, the substrates are bent due to the differences in expansion between the substrates and the housings. In this optical write apparatus, on the other hand, the substrates 22a, 22b, and 22c are not bent, because the substrate 22a and 22b of the light emitting diode array units 1A" and 1B" are fixed directly to the connecting member 33A while the substrates 22b and 22c of the light emitting diode array units 1B" and 1C" are directly fixed to the connecting member 33B. Here, the substrates 22a, 22b, and 22c are movably and partially fixed to the housings 24a, 24b, and 24c, respectively.

In this example, the fixed points of the screws 34, 35, 36, and 37 for fixing the substrates via the connecting members 33A and 33B replace the fixed points Fp1, Fp2, Fp3, and Fp4 of Example 2. The centers of the screws 34 and 35 and the dot switching points Dc1 and Dc2 are aligned in the line L5 that is perpendicular to the arrow A, while the centers of the screws 36 and 37 and the dot switching points Dc3 and Dc4 are aligned in the line L6 that is also perpendicular to the arrow A.

By directly connecting the substrates, the substrates can be prevented from being bent due to the difference in linear expansion coefficient between the substrates and the housings. Accordingly, an excellent image can be obtained, and the fixations between the substrates and the housings do not need to be great enough to overcome the expansion difference between the substrates and the housings. Also, the substrates of this example can be more easily and steadily integrated.

As for a further example of this embodiment, the substrates 22a and 22b are overlapped with each other while the substrates 22b and 22c are overlapped with each other without the connecting members 33A and 33B.

Since the substrates are fixed directly to each other or via only the connecting members 33A and 33B in this example, a plurality of short substrates can be easily integrated into one substrate. The write dot switching points Dc1, Dc2, Dc3, and Dc4 and the fixed points are aligned in the line L5 and the line L6, no black and white vertical lines occur in images corresponding to the seams between the substrates. Also, the substrates do not need to be fixed to each other by a force great enough to overcome the expansion difference between the substrates and the housings.

Since the relative position of the write dot switching points on the substrates of the plurality of light emitting diode array units do not drift in the aligning direction of the light emitting diodes, an excellent image with no black and white vertical lines can be obtained.

1-d: Example 4

Figure 9:
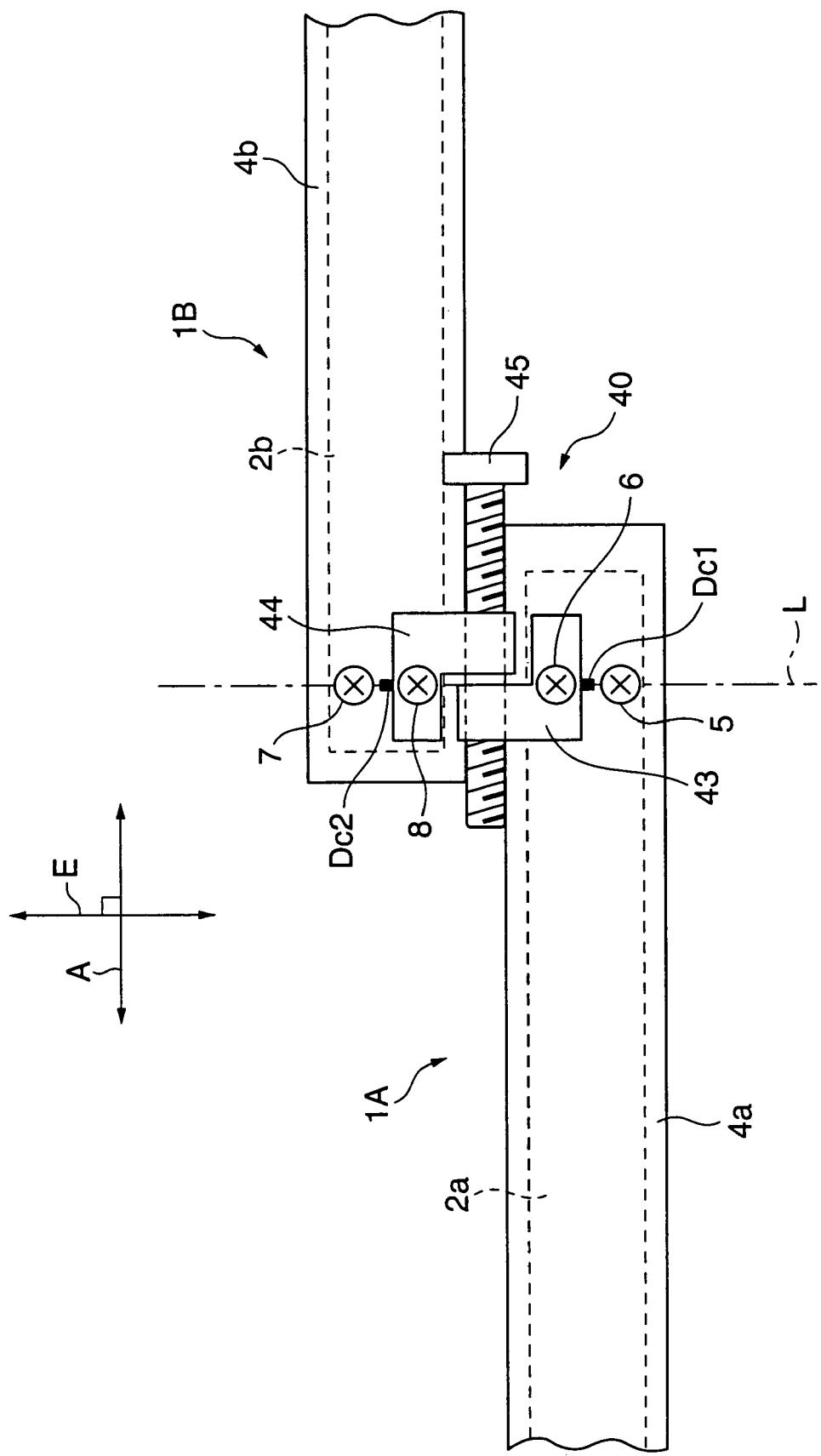
FIG. 9 is a plan view of an optical write apparatus provided with an array position adjusting unit.

FIG. 9 is a plan view of an optical write apparatus provided with an array position adjusting unit. In this figure, the same components as in FIG. 1 are denoted by the same reference numerals.

The optical write apparatus comprises two adjacent light emitting diode array units 1A and 1B having the substrates 2a and 2b, and an array position adjusting unit 40 that adjusts the relative positions of the substrates 2a and 2b in the aligning direction of the light emitting diodes (the direction of the arrow A).

The array position adjusting unit 40 comprises a pair of connecting members 43 and 44 separably connected by an adjusting screw 45. The connecting member 43 is fixed to the housing 4a of the light emitting diode array unit 1A by the screw 6, while the connecting member 44 is fixed to the housing 4b of the light emitting diode array unit 1B by the screw 8. The housing 4a and the substrate 2a are fixed to each other by the screw 5, while the housing 4b and the substrate 2b are fixed to each other by the screw 7.

The dot switching points Dc1 and Dc2 on the respective substrates of the two adjacent light emitting diode array units 1A and 1B, and the centers of the screws 5, 6, 7, and 8 are all aligned in a line L that is perpendicular to the aligning direction of the light emitting diodes.

Since the light emitting diode array units 1A and 1B can be brought into contact with each other or separated from each other by adjusting the rotation amount of the adjusting screw 45, the relative positions of the write dot switching points Dc1 and Dc2 can be adjusted as desired.

By adjusting the relative positions of the write dot switching positions of the adjacent light emitting diode array units, even a large-sized optical write apparatus comprising a plurality of light emitting diode array units can have a high accuracy.

With the adjusting screw 45 of the array position adjusting unit 40, the entire structure of the optical write apparatus can be made simpler. Furthermore, the relative positions of the write dot switching points of the adjacent light emitting diode array units can be easily adjusted by the adjusting screw 45.

Although the array position adjusting unit 40 provided with the adjusting screw 45 is shown in FIG. 9, any other structure can be employed as an array position adjusting unit as long as it can perform fine adjustment.

[2] Second Embodiment 2-a: Example 1

In the first embodiment of the present invention, neighboring substrates are directly fixed to each other, or if an auxiliary member is interposed between two substrates, the fixed positions of the auxiliary member and the substrates are aligned on one line that is perpendicular to the aligning direction of the light emitting diodes. The write dot switching points on the substrates are also located on the same line as the fixed positions.

In the above optical write apparatus shown in FIG. 1, the light emitting diode array units adjacent to one anther in the direction of the arrow A are fixed to each other via the connecting member 3 at the dot switching points on the substrates. Accordingly, the light from the substrate 2a and the light from the substrate 2b are positioned for writing by varying the write times.

More specifically, after a line is written by the light emitting diode array unit 1A shown in FIG. 2, the photosensitive drum 10 rotates for a predetermined period of time, and a line is written by the light emitting diode array unit 1B. In this manner, one horizontal scanning line is written.

In the first embodiment, even if the light emitting diode array units expand or contract due to a fluctuation in ambient temperature, fewer black and white lines occur because the substrates substantially constitute one substrate. Especially when the write dot switching points on the substrates are located on the same line as the fixed points, no black and white vertical lines occur due to a fluctuation in ambient temperature.

Originally, a mechanical attachment reference position and the gap between the focal points of light emitted from the light emitting diodes are varied depending on the variation of the focal distance of the self-focusing lens arrays and the precision of the components of the lens arrays. Also, it is necessary to focus the light emitting diode array units on the photosensitive member, because a positioning error is caused when the light emitting diode array units are mounted to a wide optical write apparatus.

In the foregoing embodiment, the entire optical write apparatus is moved to focus one of two adjacent light emitting diode array units connected to each other directly or via a connecting member. However, as the entire optical write apparatus is moved to focus one of the two adjacent light emitting diode array units, the other one of the two adjacent light emitting diode array units is unfocused.

It is possible to attach a link mechanism to the connecting member of the other one of the two adjacent light emitting diode array units. However, this only makes the structure even more complicated, and allows less freedom for design. Adding such a link mechanism is also costly, and might reduce the accuracy of positioning the write positions in the horizontal and vertical directions.

In the example shown in FIG. 5, if the left end of the light emitting diode array unit 1A or the right end of the light emitting diode array unit 1C is moved up and down against the photosensitive drum so as to perform a focusing operation, a great bending moment is applied to the light emitting diode array unit, because the other end of the light emitting diode array unit 1A or 1C is secured by the connecting member 3A or 3B. As a result, the connecting member 3A or 3B might be broken, or the light emitting diode array unit might be bent.

This embodiment is to solve the above problem. This embodiment can be applied to an optical write apparatus comprising two or more light emitting diode array units. In the following, an optical write apparatus comprising three light emitting diode array units as shown in FIG. 4 will be described. The same components as in FIG. 4 will be denoted by the same reference numerals.

As shown in FIG. 11A, the light emitting diode array units 1A, 1B, and 1C are shifted from each other in the aligning direction A of the light emitting diodes on each substrate, so that writing can be performed in a wide range. FIG. 11B shows the light emitting diode array units 1A, 1B, and 1C, seen from the direction of the arrow B.

In FIGS. 11A and 11B, light emitting diode array units 1A, 1B, and 1C comprise substrates 2a, 2b, and 2c, lens cases Z, and lens arrays 12a, 12b, and 12c formed by focusing light transmitting members. Although not shown in FIGS. 11A and 11B, housings are also provided for the substrates 2a, 2b, and 2c.

In FIG. 11B, the light emitting diode array units 1A and 1C are symmetrical to the light emitting diode array unit 1B with respect to the line D—D passing through the axis O of the photosensitive drum 10. The optical axis of the light emitted from each of the light emitting diode array units extends toward the shaft center of the photosensitive drum 10.

The light emitting diode array unit 1C is adhesively held by a rectangular spacer 14R on the side of the substrate 2c. The light emitting diode array unit 1A is adhesively held by a rectangular spacer 14L (not shown) on the side of the substrate 2a. The light emitting diode array unit 1B is adhesively held by a rectangular spacer 15R and a rectangular spacer 15L (not shown) on the side of the substrate 2b.

The spacer 14R is fixed to one end of a plate-like connecting member 16R by a screw 520. The other end of the connecting member 16R is sandwiched by the spacer 15R and an adjusting plate 17R, and is fixed to the spacer 15R and the adjusting plate 17R by screws 18R.

The spacer 14L is fixed to a plate-like connecting member 16L by a screw 50. The connecting member 16L is sandwiched by the spacer 15L and an adjusting plate 17L, and is fixed to the spacer 15L and the adjusting plate 17L by a screw 18L.

Either of the adjusting plates 17R and 17L (17R in this example) is fixed to a fixed frame (not shown) of the optical write apparatus. The end portions of the adjusting plate 17L, the light emitting diode array units 1A, and 1C are supported by the fixed frame of the optical write apparatus, so as not to put any restriction on displacement of components due to thermal expansion or thermal contraction.

The centers of the screws 520 and 18R are located on the line L3 that is perpendicular to the direction of the arrow A. The line L3 also passes through the write dot switching points of the substrates 2b and 2c.

Likewise, the centers of the screws 50 and 18L are located on the line L2 that is perpendicular to the direction of the arrow A. The line L2 also passes through the write dot switching points on the substrates 2a and 2b.

An adjusting screw 19R is screwed into the adjusting plate 17R on the line L3 above the lens array 12c, so that the top end of the adjusting screw 19R is brought into contact with the connecting member 16R.

Likewise, an adjusting screw 19L is screwed into the adjusting plate 17L on the line L2 above the lens array 12b, so that the top end of the adjusting screw 19L is brought into contact with the connecting member 16L.

As described before, the light emitted from the light emitting diode array unit 1B, i.e., the light emitting from the substrate 2b can be focused by moving up and down the optical write apparatus integrally constituted by the light emitting diode array units 1A, 1B, and 1C. However, even if the light emitted from the light emitting diode array unit 1B is focused, the light emitted from the light emitting diode array units 1A and 1C are not necessarily focused due to an error in lens array assembly, the accuracy of each component, or the inclination of the entire apparatus.

In this example, a focusing unit P1C that comprises the connecting member 16R, the adjusting plate 17R, and the adjusting screw 19R as a first external member, is employed to focus the light emitted from the light emitting diode array unit 1C including the substrate 2c. Also, a focusing unit P1A that comprises the connecting member 16L, the adjusting plate 17L, and the adjusting screw 19L as a first external member, is employed to focus the light emitted from the light emitting diode array unit 1A including the substrate 2a.

In the focusing units P1C and P1A, the adjusting screws 15R and 15L are rotated to focus the light emitted form the light emitting diode array units 1A and 1C. In FIGS. 11A and 11B, the adjusting screws 15R and 15L are tightened so that the end portions of the adjusting screws 15R and 15L push down the connecting members 16R and 16L. Accordingly, the light emitting diode array units 1A and 1C move downward in a focusing direction c.

The adjusting screws 15R and 15L are loosened so that the connecting members 16R and 16L return to the original positions by elasticity. The light emitting diode array units 1A and 1C moves upward in the focusing direction c. In this manner, by tightening and loosening the adjusting screws 15R and 15L, the connecting members 16R and 16L moves in the focus adjusting direction of the light emitting diode array units 1A and 1B, which is the thickness direction of the substrates 2a and 2c. Thus, the light from the substrates 2a and 2c can be focused. In this manner, the light from the two adjacent substrates can be easily focused in this example.

As described above and as shown in FIG. 11A, the focusing unit P1C for focusing the light emitted from the light emitting diode array unit 1C is disposed on the right side of the light emitting diode array unit 1B, while the focusing unit P1A for focusing the light emitted form the light emitting diode array unit 1A is disposed on the left side of the light emitting diode array unit 1B.

The focusing unit P1C comprises: the plate-like connecting member 16R fixed to the adjacent substrate 2c and 2b via the spacers 14R and 15R, respectively; the adjusting plate 17R facing the connecting member 16R and fixed to the connecting member 16R on the side of the substrate 2b and to a fixed member; and the adjusting screw 19R as the first external member that provides an external force for the connecting member 16R by varying the gap between the connecting member 16R and the adjusting plate 17R on the side of the substrate 2c. The external force (pressing force)

provided for the connecting member 16R by the adjusting screw 19R deforms and displaces the connecting member 16R with respect to a step 17R1 formed on the adjusting plate 17R, so that the substrate 2c is moved with respect to the substrate 2b in the focusing direction c. Thus, the light emitted from the light emitting diodes on the substrate 2c is focused.

Likewise, the focusing unit P1A comprises: the plate-like connecting member 16L fixed to the adjacent substrate 2a and 2b via the spacers 15L and 14L, respectively; the adjusting plate 17L facing the connecting member 16L and fixed to the connecting member 16L on the side of the substrate 2b and to a fixed member; and the adjusting screw 19L as the first external member that provides an external force for the connecting member 16L by varying the gap between the connecting member 16L and the adjusting plate 17L on the side of the substrate 2a. The external force (pressing force) provided for the connecting member 16L by the adjusting screw 19L deforms and displaces the connecting member 16L with respect to a step 17L1 formed on the adjusting plate 17L, so that the substrate 2a is moved with respect to the substrate 2b in the focusing direction c. Thus, the light emitted from the light emitting diodes on the substrate 2a is focused. As described so far, with the focusing units P1C and P1A, the light focusing can be easily carried out by simply tightening or loosening the adjusting screws 19R and 19L.

In the focusing unit P1C, the point where the adjusting screw 19R as the first external member provides an external force for the connecting member 16R is located in a position facing the substrate 2c to be adjusted. Accordingly, the movement of the adjusting screw 19R can be effectively transferred to the substrate 2c to be adjusted, thereby achieving high adjustment accuracy. Furthermore, since the lens array 12c exists on the line extended from the point on the connecting member 16R to which the adjusting screw 19R provides an external force, the adjusting screw 19R can further improve the adjustment accuracy. The focusing unit P1A has the same structure as the focusing unit P1C for the light emitting diode array unit 1C.

Figure 12:
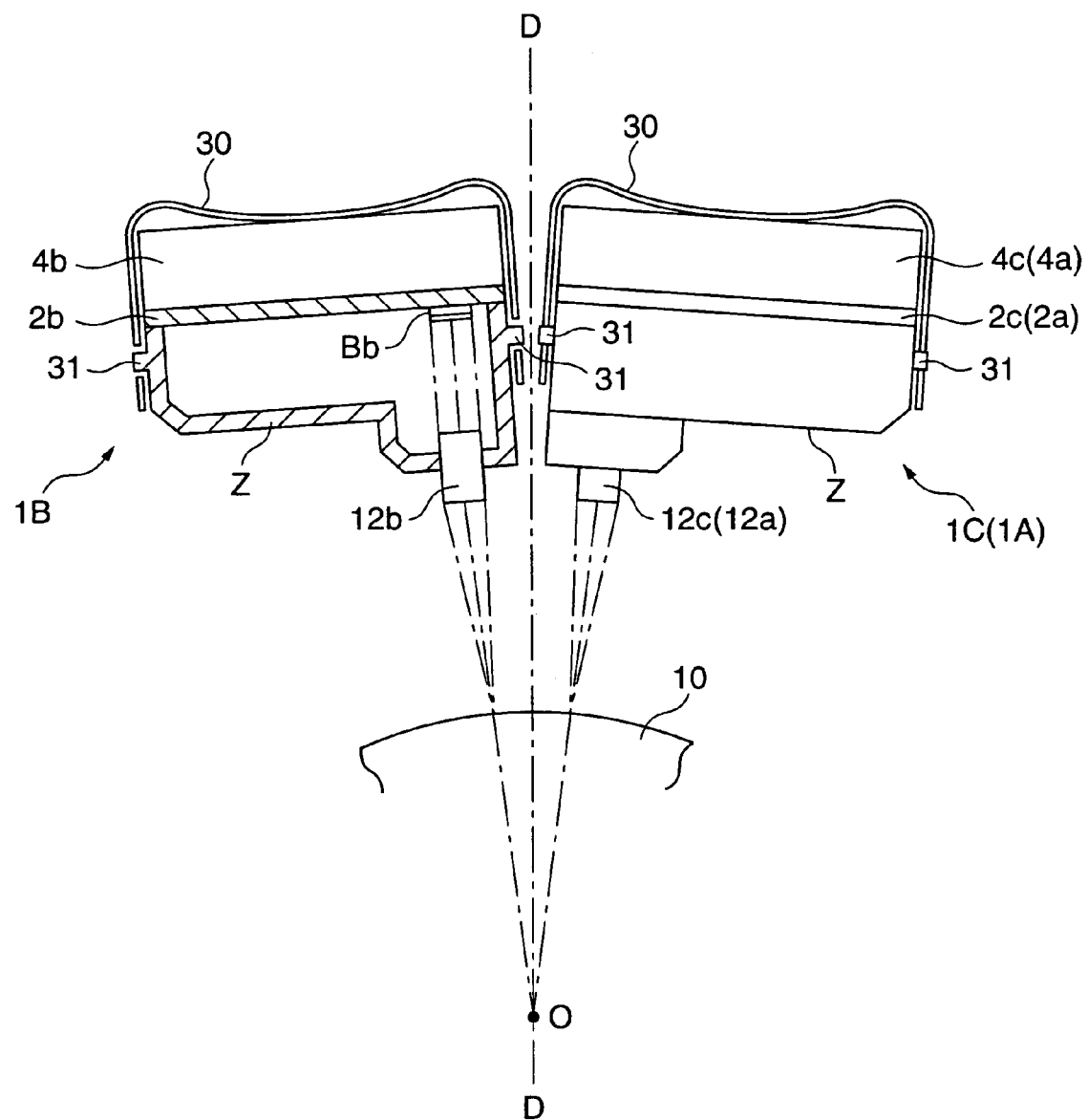
FIG. 12 is a sectional view of the light emitting diode array units of FIG. 11A and a light focusing point.
Figure 13:
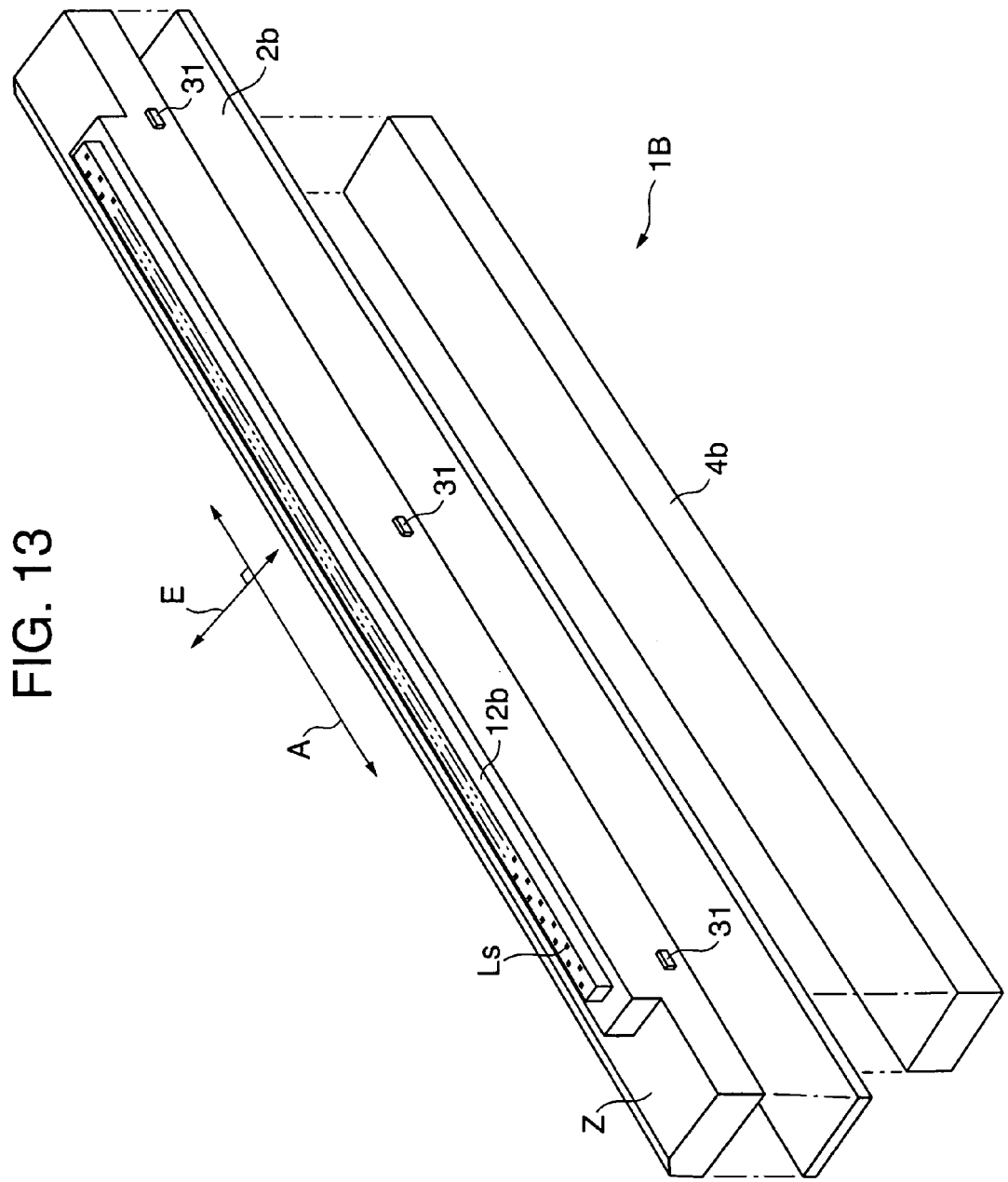
FIG. 13 is an exploded perspective view of one of the three light emitting diode array units.
Figure 14:
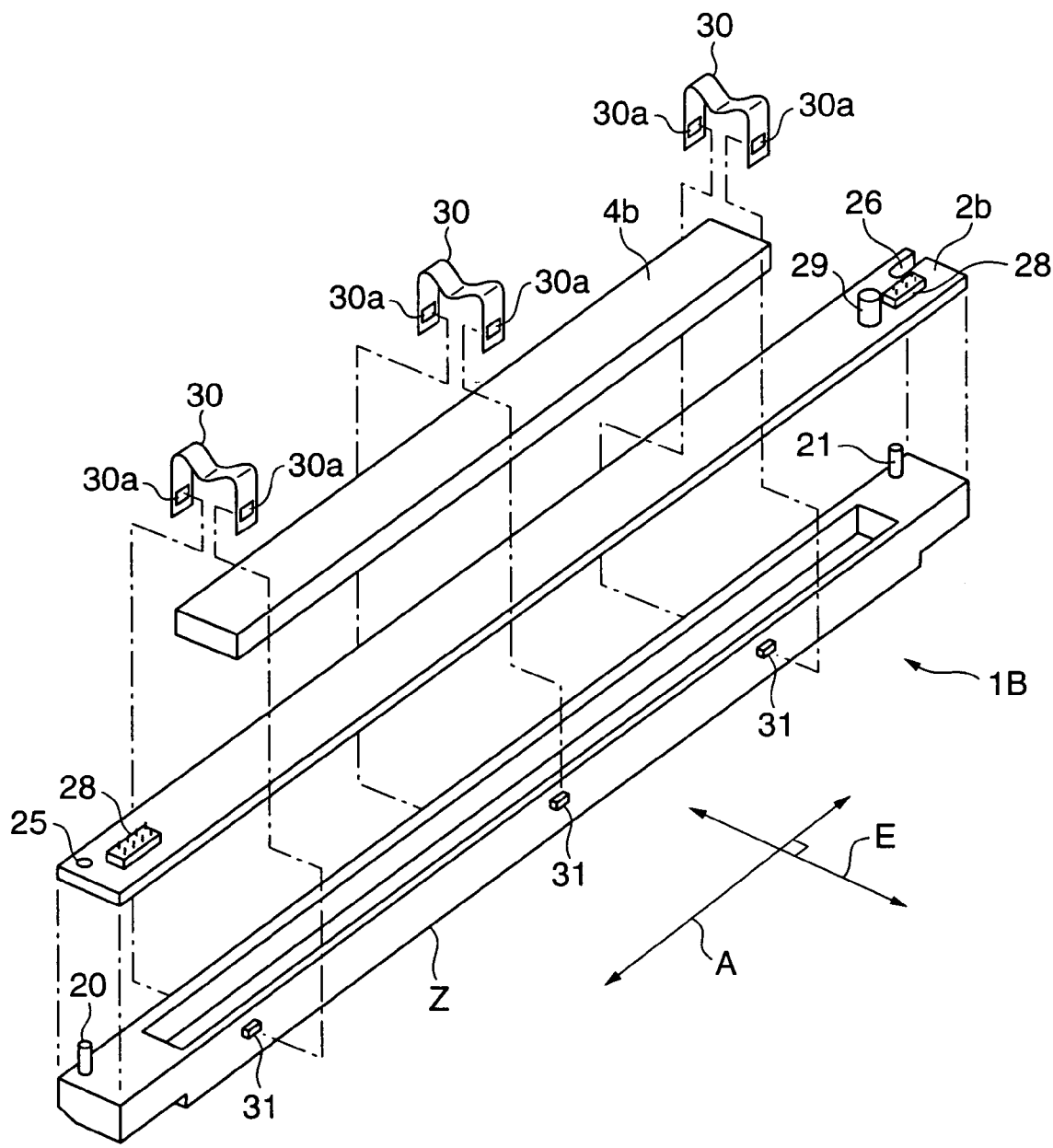
FIG. 14 is an exploded perspective view of one of the three light emitting diode array units.

Referring now to FIGS. 12, 13, and 14, the light emitting diode array units 1A, 1B, and 1C will be described in greater detail. It should be noted that, since all the three light emitting diode array units 1A, 1B, and 1C have the same structure, only the light emitting diode array unit 1B will be explained in the following description.

In FIGS. 12, 13, and 14, the lens array 12b is integrally formed with the lens case Z, or is firmly bonded to the lens case Z. The lens case Z has a box-like shape, with the upper portion being open. The substrate 2b is pushed downward so as to cover hermetically the open upper portion of the lens case Z.

The substrate 2b is only gently pushed so as to allow thermal displacement due to thermal expansion or thermal contraction between components. As shown in FIG. 14, pins 20 and 21 are disposed at both ends of the upper side of the lens case Z in the direction of the arrow A. A hole 25 to be engaged with the pin 20 is formed at one end of the substrate 2b, and a long hole 26 to be engaged with the pin 21 is formed at the other end of the substrate 2b. The long hole 26 extends in the direction of the arrow A, and the centers of the long hole 26 and the hole 25 are in a line perpendicular to the direction of the arrow E.

Since the pins 20 and 21 are engaged with the hole 25 and the long hole 26, respectively, thermal displacement between the lens case Z and the substrate 2b can be absorbed by the long hole 26. Thus, no unnatural force is applied to the components, and displacement occurs in the direction of the arrow A.

As shown in FIG. 12, a large number of light emitting diodes Bb are aligned on the surface of the substrate 2b that faces the lens array 12b. In FIG. 10, the light emitting diodes are indicated by Bb1 and Bb2. In FIG. 12, the light emitting diodes Bb face the lens array 12b, and light is formed into an image on the photosensitive member of the photosensitive drum 10 by the lenses of the lens array 12b.

As shown in FIGS. 13 and 14, the lens array 12b has the lenses Ls arranged in a zigzag pattern in the direction of the arrow A. Terminals 28 that supply power and control information for making the light emitting diodes Bb emit light are disposed on the substrate 2b.

The housing 4b having a function of releasing the heat from the substrate 2b is placed on the substrate 2b movably pushed toward the lens case Z, and the substrate 2b is sandwiched between the housing 4b and the lens case Z by plate springs 30.

The fixating of the housing 4b to the substrate 2b and the fixating of the substrate 2b to the lens case Z need to be only firm enough to maintain the hermetic condition. Accordingly, the substrate 2b is elastically sandwiched between the housing 4b and the lens case Z by engaging protruding portions 31 formed on the side surfaces of the lens case Z with holes 30a of the M-shaped plate springs 30.

As shown in FIGS. 13 and 14, the housing 4b is shorter than the substrate 2b, so that neither end of the substrate 2b in the direction of the arrow A is covered with the housing 4b. In FIGS. 11A and 11B, the spacer 15R (15L) is attached to the exposed portions of the substrate 2b, and the spacer 14R (14L) is attached to the exposed portions of the substrate 2a (2c).

2-b: Example 2

In the Example 1 (2-a) shown in FIGS. 11A and 11B, after the light emitted from the light emitting diode array unit 1B is focused by moving the entire optical write apparatus including the light emitting diode array units 1A, 1B, and 1C, the focusing units P1C and P1A can focus the light emitted from the light emitting diode array units 1A and 1C, respectively.

However, if the focusing for the light emitting diode array unit 1B is found to be incomplete after the light emitting diode array units 1A and 1C are focused, it is necessary to refocus the light emitting diode array unit 1B.

To solve this problem, the light emitting diode array unit 1B, as well as the light emitting diode array units 1A and 1C, can be independently focused in this example. As shown in FIG. 15B, a focusing unit having the same structure as in the Example 1 (2-a) is disposed on either end of the light emitting diode array unit 1B, with a line D—D passing through the center point between the substrates 2a and 2b being the axis of symmetry. In this manner, the focusing can be carried out for the substrates 2a and 2b at the same time, thereby simplifying the focusing operation.

In FIGS. 15A and 15B, the focusing unit P1C for focusing the light emitting diode array unit 1C and the focusing unit P1A for focusing the light emitting diode array unit 1A are substantially the same as in FIGS. 11A and 11B. Accordingly, the same components as in FIGS. 11A and 11B are denoted by the same reference numerals.

The focusing units P1C and P1A of this example differ from the focusing units P1C and P1A in that the adjusting plate 17R (17L) is replaced by T-shaped adjusting plate 170R (170L), and that a connecting member 160R (160L) is fixed to the adjusting plate by a screw 32R (32L) on the line D—D.

The focusing units for focusing the light emitting diode array unit 1B are formed on the right end and left end of the light emitting diode array unit 1B in the direction of the arrow A. The focusing unit P1BR disposed on the right end of the light emitting diode array unit 1B has screws 520' fixing the connecting member 160R to the substrate 2b via a spacer 14R'. Also, an adjusting screw 19R' is screwed into the adjusting plate 170R, so that the top end of the adjusting screw 19R' is brought into contact with the upper surface of the connecting member 160R at a location immediately above the lens array 12b and the substrate 2b.

With the focusing unit P1BR, the adjusting screw 19R' as a first external force unit is tightened and loosened to adjust the right end portion of the light emitting diode array unit 1B in a focusing direction c', which is the thickness direction of the substrate 2b.

The focusing unit P1BL disposed on the left end portion of the light emitting diode array unit 1B in the direction of the arrow A also has screws 50' fixing the connecting member 160L to the substrate 2b via a spacer 14L', as shown in FIGS. 15A and 15B. An adjusting screw 19L' is screwed into the adjusting plate 170L, so that the top end of the adjusting screw 19L' is brought into contact with the upper surface of the connecting member 160L at a location immediately above the lens array 12b and the substrate 2b. With this focusing unit, the adjusting screw 19R' is tightened and loosened to adjust the right end portion of the light emitting diode array unit 1B in the focusing direction c', which is the thickness direction of the substrate 2b.

[3] Third Embodiment 3-a: Example 1

In a structure shown in FIG. 3, for instance, after the light emitting diode array unit 1A or 1C draws a line, the photosensitive drum 10 rotates for a predetermined period of delay time, and the light emitting diode array unit 1B then draws a line. In this manner, one horizontal line is drawn.

The above delay time is normally fixed because of the structure of a write control device. In that case, the write dot distance on the photosensitive member between the light emitting diode array units needs to be accurately adjusted. In reality, however, the write dot distance varies greatly on the photosensitive member, due to an error in component size or assembling of the optical write apparatus. The variation of the write dot distance results in seams in the vertical write direction.

The delay time can be controlled, but a control device for controlling the delay time is complicated, and the controlling is carried out only by 1 dot (63.5 μm in 400 dpi) in the vertical direction, resulting in poor adjustment accuracy.

To solve the above problems, as shown in FIGS. 16A and 16B, the substrate 2b is rocked in a vertical direction e, with the substrate 2a being stabilized. The structure of this example comprises a vertical direction adjusting units F1C and F1A that are movable in the vertical direction in which the light emitted from the light emitting diodes on the substrate 2b moves toward or away from the light emitted from the light emitting diodes on the substrate 2a.

With those vertical direction adjusting units F1C and F1A, the write dot distance on the photosensitive member between substrates can be accurately adjusted.

The light emitting diode array unit 1C is adhesively held by the spacer 14R on the side of the substrate 2c. The light emitting diode array unit 1A is adhesively held by the spacer 14L (not shown) on the side of the substrate 2a. The light emitting diode array unit 1B is adhesively held by the rectangular plate-like spacer 15R and rectangular plate-like spacer 15L (not shown) on the side of the substrate 2b.

The spacer 14R is fixed to one end of a plate-like connecting member 1600R by the screw 520. The other end of the connecting member 1600R is sandwiched between the spacer 15R and the adjusting plate 170R, and is fixed to the spacer 15R and the adjusting plate 170R by the screws 18R.

Likewise, the spacer L is fixed to a plate-like connecting member 1600L by the screw 50. The connecting member 1600L is sandwiched between the spacer 15L and the adjusting plate 170L, and is fixed to the spacer 15L and the adjusting plate 170L by the screw 18L.

One of the adjusting plates 170R and 170L (170R in this example) is fixed to the stable frame (not shown) of the optical write apparatus. The end portions of the adjusting plate 170L and the light emitting diode array units 1A and 1C are supported by a suitable member (not shown) so that the frame of the optical write apparatus does not restrict displacement of the components caused by thermal expansion or thermal contraction.

The centers of the screws 520 and 18R are located on the line L3 that is perpendicular to the direction of the arrow A. The line L3 also passes through the write dot switching points on the substrates 2b and 2c.

Likewise, the centers of the screws 50 and 18L are located on the line L2 that is perpendicular to the direction of the arrow A. The line L2 also passes through the write dot switching points on the substrates 2b and 2a.

Unlike the connecting member 16R (16L) shown in FIG. 11B and the connecting member 160R (160L) shown in FIG. 15B, the connecting member 1600R (1600L) has a U-shaped portion extending upward from the fixed point with the spacer 14R (14L) to a location above the second adjusting plate 170R (170L).

An adjusting screw 39R (39L) is screwed into the U-shaped portion of the second connecting member 1600R (1600L) above the second adjusting plate 170R (170L), so that the top end of the adjusting screw 39R (39L) is brought into contact with the upper surface of the adjusting plate 170R (170L).

A wedge-like supporting member 190R (190L) that is in contact with the adjusting plate 170R (170L) and the connecting member 1600R (1600L) is formed integrally with the adjusting plate 170R (170L). The supporting member 190R (190L) is located at the mid point between the adjusting screw 39R (39L) and the fixed point of the adjusting plate 170R (170L) to the connecting member 1600R (1600L) by the screws 18R (18L).

As described above, the vertical direction adjusting unit F1C (F1A) comprises: the plate-like connecting member 1600R (1600L) fixed to the substrate 2c (2a) and the substrate 2b that are adjacent to each other in the aligning direction of the light emitting diodes, i.e., in the direction of the arrow A; the adjusting plate 170R (170L) fixed to the connecting member 1600R (1600L) at the fixed point of the substrate 2c (2a) to the connecting member 1600R (1600L) by the screws 18R (18L); the screw 39R (39L) as a second external force unit that narrows and widens the gap between the connecting member 1600R (1600L) and the adjusting plate 170R (170L) on the side of the substrate 2b; and the supporting member 190R (190L) in contact with the connecting member 1600R (1600L) and the adjusting plate 170R (170L) at the mid point between the screw 39R (39L) and a step portion 170R1 (170L1) that is a part of the fixed position of the substrate 2c (2a) to the connecting member 1600R (1600L) by the screws 18R (18L). The supporting member 190R (190L) is preferably located immediately above the lens array 12a (12b).

In this structure, the second connecting member 1600R (1600L) is displaced with respect to the supporting member 190R (190L) in accordance with the rotational direction of the screw 39R (39L). As the second connecting member 1600R (1600L) is displaced, the light emitting point of the light emitting diode array unit 1C (1A) attached to the connecting member 1600R (1600L) is also displaced in the vertical direction e. According to this example, fine adjustment can be performed using leverage and the screws.

3-b: Example 2

In the Example 1 (3-a) shown in FIGS. 16A and 16B, after the entire optical write apparatus including the light emitting diode array units 1A, 1B, and 1C is moved to adjust the write position of the light emitting diode array unit 1B in the vertical direction, the write positions in the vertical direction of the light emitting diode array units 1A and 1C are independently adjusted by the vertical direction adjusting units F1C and F1A.

However, if the adjustment of the light emitting diode array unit 1B is found to be incomplete after the write positions in the vertical direction of the light emitting diode array units 1A and 1C are adjusted, it is necessary to readjust the write position in the vertical direction of the light emitting diode array unit 1B.

To solve this problem, the write position in the vertical direction of the light emitting diode array unit 1B can be independently adjusted in this example.

As shown in FIG. 17B, a vertical direction adjusting unit having the same structure as the vertical direction adjusting unit of Example 1 (3-a) is disposed at each of the left and right end of the light emitting diode array unit 1B, with the line D—D passing through the center point between the substrate 2a and the substrate 2b being the symmetrical axis. With the vertical direction adjusting units on the left and right ends of the light emitting diode array unit 1B, the write points in the vertical direction of two substrates adjacent to each other in the aligning direction of the light emitting diodes can be adjusted independently of each other, thereby simplifying the adjustment operation.

In FIGS. 17A and 17B, the vertical direction adjusting unit F1C for adjusting the write position in the vertical direction of the light emitting diode array unit 1C and the vertical direction adjusting unit F1A for adjusting the write position in the vertical direction of the light emitting diode array unit 1A are substantially the same as those shown in FIGS. 16A and 16B. Accordingly, the same components as in FIGS. 16A and 16B are denoted by the same reference numerals.

The vertical direction adjusting units F1C and F1A of this example differ from those shown in FIGS. 16A and 16B in that a T-shaped adjusting plate 1700R (1700L) is employed instead of the adjusting plate 170R (170L), and that a connecting member 16000R (16000L) is fixed to the adjusting plate 1700R (1700L) by the screw 32R (32L) on the line D—D.

The vertical direction adjusting units for adjusting the write positions in the vertical direction of the light emitting diode array unit 1B are disposed at the left end and the right end of the light emitting diode array unit 1B. In the vertical direction adjusting unit F1BR disposed on the right end shown in FIGS. 17A and 17B, the substrate 2b is fixed to the spacer 14R', and the spacer 14R' is fixed to the connecting member 16000R by the screws 520'. The vertical direction adjusting unit F1BR comprises: the adjusting plate 1700R fixed to the connecting member 16000R by the screw 32R at the center; a screw 39R' as a second external force unit that narrows and widens the gap between the connecting member 16000R and the adjusting plate 1700R on the side of the substrate 2b; and a supporting member 190R' that is in contact with the connecting member 16000R and the adjusting plate 1700R at the mid point between the screw 32R' and the fixed position of the connecting member 16000R to the adjusting plate 1700R with the screw 32R.

Likewise, in the vertical direction adjusting unit F1BL disposed at the left end of the light emitting diode array unit 1B, the substrate 2b is fixed to the spacer 14L', and the spacer 14L' is fixed to the connecting member 16000L by the screws 50'. The vertical direction adjusting unit F1BL comprises: the adjusting plate 1700L fixed to the connecting member 16000L by the screw 32L at the center; a screw 39L' as a second external force unit that narrows and widens the gap between the connecting member 16000L and the adjusting plate 1700L on the side of the substrate 2b; and a supporting member 190L' that is in contact with the connecting member 16000L and the adjusting plate 1700L at the mid point between the screw 32L' and the fixed position of the connecting member 16000L to the adjusting plate 1700L with the screw 32L. One of the adjusting plates 16000R and 16000L is fixed to an unmovable member, and the other one is movably supported.

With the vertical direction adjusting unit F1C of this example, the screw 39R is tightened or loosened to deform the second connecting member 16000R so as to displace the light emitting diode array unit 1C including the substrate 2c. Thus, the write position in the vertical direction e of the light emitting diode array unit 1c can be adjusted. With the vertical direction adjusting unit F1A of this example, the screw 39L is tightened or loosened to deform the connecting member 16000L so as to displace the light emitting diode array unit 1A including the substrate 2a. Thus, the write position in the vertical direction e of the light emitting diode array unit 1A can be adjusted.

Likewise, with the vertical direction adjusting unit F1BR (F1BL) of this example, the screw 39R'(39L') is tightened or loosened to deform the connecting member 16000R (16000L) so as to displace the light emitting diode array unit 1B including the substrate 2b. Thus, the write position in the vertical direction e' of the light emitting diode array unit 1B can be adjusted. In the above manner, the write positions in the vertical direction of the light emitting diode array units 1A, 1B, and 1C can be adjusted independently of each other, thereby simplifying the write position adjusting operation.

3-c: Example 3

In Examples 1 and 2 (2-a and 2-b) of the second embodiment of the present invention, the light emitting diode array units including substrates can be focused, but the write positions in the vertical direction cannot be adjusted. In Examples 1 and 2 (3-a and 3-b) of the third embodiment of the present invention, the write positions in the vertical direction of the light emitting diode array units including substrates can be adjusted, but the light emitting diode array units cannot be focused.

In this example, the optical write apparatus is provided with focusing units P1C1 and P1A1, and vertical direction adjusting units F1C1 and F1A1, so that the light emitting diode array units including substrates can be focused, and the write positions in the vertical direction can be adjusted. Each of the focusing units P1C1 and P1A1 displaces one of two adjacent substrates, with respect to the other one of the two adjacent substrates, in the aligning direction of the light emitting diodes in a focusing direction that is equivalent to the thickness direction of the displaced substrate. Each of the vertical direction adjusting units F1C1 and F1A1 rocks one of two adjacent substrates in the vertical direction in which light emitted from the light emitting diodes on the rocked substrate moves toward and away from light emitted from the light emitting diodes on the other substrate.

The feature of this example resides in the integral formation of the focusing unit P1C1 (P1A1) and the vertical direction adjusting unit F1C1 (F1A1). Also, using the leverage mechanism with screws, the focusing in one direction and the adjusting of the write positions in the vertical direction can be easily performed.

As shown in FIGS. 18A and 18B, the focusing unit P1C1 comprises: a plate-like connecting member 1601R fixed to the substrates 2c and 2b, which are adjacent to each other in the aligning direction of the light emitting diodes (in the direction of the arrow A), via the spacers 14R and 15R, respectively; an adjusting plate 171R fixed to a fixed member and the connecting member 1601R by the screws 18R at the fixed point on the side of the substrate 2b; and an adjusting screw 1900R as a third external force unit that narrows and widens the gap between the connecting member 1601R and the adjusting plate 171R on the side of the substrate 2c. The vertical direction adjusting unit F1C1 includes a screw 390R as a fourth external force unit that applies an external force to the end portion of the connecting member 1601R on the side of the substrate 2c, with a part of the adjusting screw 1900R as the third external force unit being the supporting point, so as to narrow and widen the gap between the connecting member 1601R and the adjusting plate 171R.

Likewise, the focusing unit P1A1 comprises: a plate-like connecting member 1601L fixed to the substrates 2a and 2b, which are adjacent to each other in the aligning direction of the light emitting diodes (in the direction of the arrow A), via the spacers 14L and 15L, respectively; an adjusting plate 171L fixed to a fixed member and the connecting member 1601L by the screws 18L at the fixed point on the side of the substrate 2b; and an adjusting screw 1900L as a third external force unit that narrows and widens the gap between the connecting member 1601L and the adjusting plate 171L on the side of the substrate 2a. The vertical direction adjusting unit F1A1 includes a screw 390L as a fourth external force unit that applies an external force to the end portion of the connecting member 1601L on the side of the substrate 2a, with a part of the adjusting screw 1900L as the third external force unit being the supporting point, so as to narrow and widen the gap between the connecting member 1601L and the adjusting plate 171L.

Like the connecting member 1600R (1600L) shown in FIG. 17B, the connecting member 1601R (1601L) has a U-shaped portion extending upward from the fixed position with the spacer 14R (14L) and reaching a point above the adjusting plate 171R (171L). The screw 390R (390L) is screwed into the upper portion of the U-shaped portion, so that the top end of the screw 390R (390L) is brought into contact with the upper surface of the adjusting plate 171R (171L). The screw 390R (390L) is tightened and loosened to displace the connecting member 1601R (1601L), with the top end of the screw 1900R (1900L) being the supporting point, so as to adjust the light emitting diode array unit 1C (1A) in the vertical direction e.

The screw 1900R (1900L) is also tightened and loosened to rock the light emitting diode array unit 1C (1A) in the thickness direction of the substrate 2c (2a), with the fixed point with the adjusting plate 171R (171L) being the supporting point, so as to displace the light emitting diode array unit 1C (1A) in the focusing direction c. Since the screw 1900R (1900L) is located immediately above the lens array 12c, the screw force is directly applied to the light emitting diode array unit 1C (1A), thereby increasing the adjustment sensitivity. Also, accurate focusing can be achieved by the vertical direction adjustment.

The screws 390R, 390L, 1900R, and 1900L are located at substantially the same position, so that these screws can be handled in the same direction. Accordingly, the focusing of the light emitting diode array units including the substrates, and the write positions in the vertical direction can be performed at the same time. Thus, the adjusting operation can be simplified.

3-d: Example 4

In Example 3 (3-c) shown in FIGS. 18A and 18B, the structure shown in FIGS. 13 and 14 are employed. More specifically, the substrate 2b, the lens case Z, and the housing 4b are movably fixed by the plate springs 30. Because of the movable fixation, the components will not be prevented from being displaced when thermal expansion or contraction occurs. The auxiliary members for the substrates 2a and 2c are also movably fixed to the substrates 2a and 2c.

Figure 20:
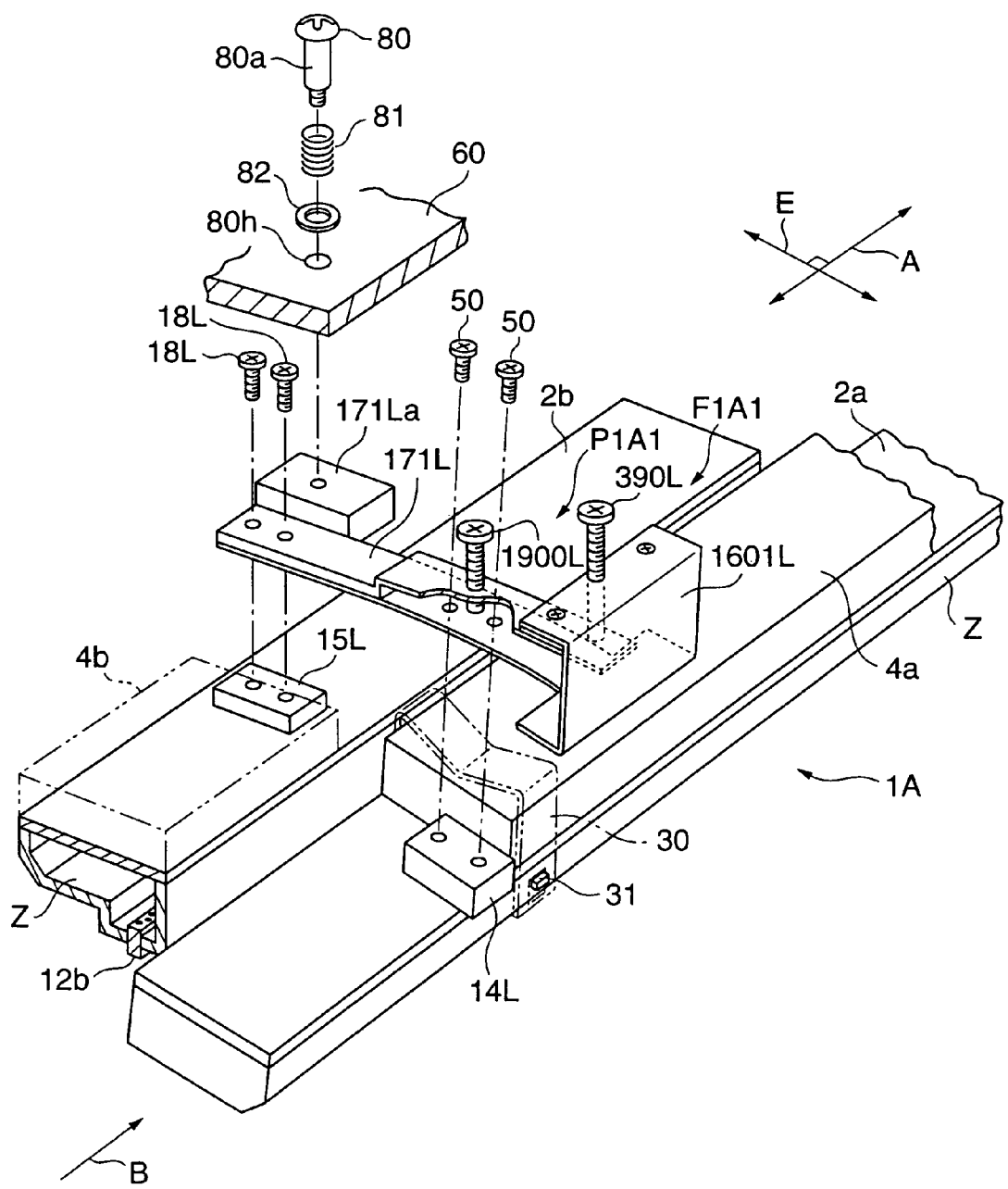
FIG. 20 is an enlarged perspective view of a circled portion I of FIG. 19.
Figure 21:
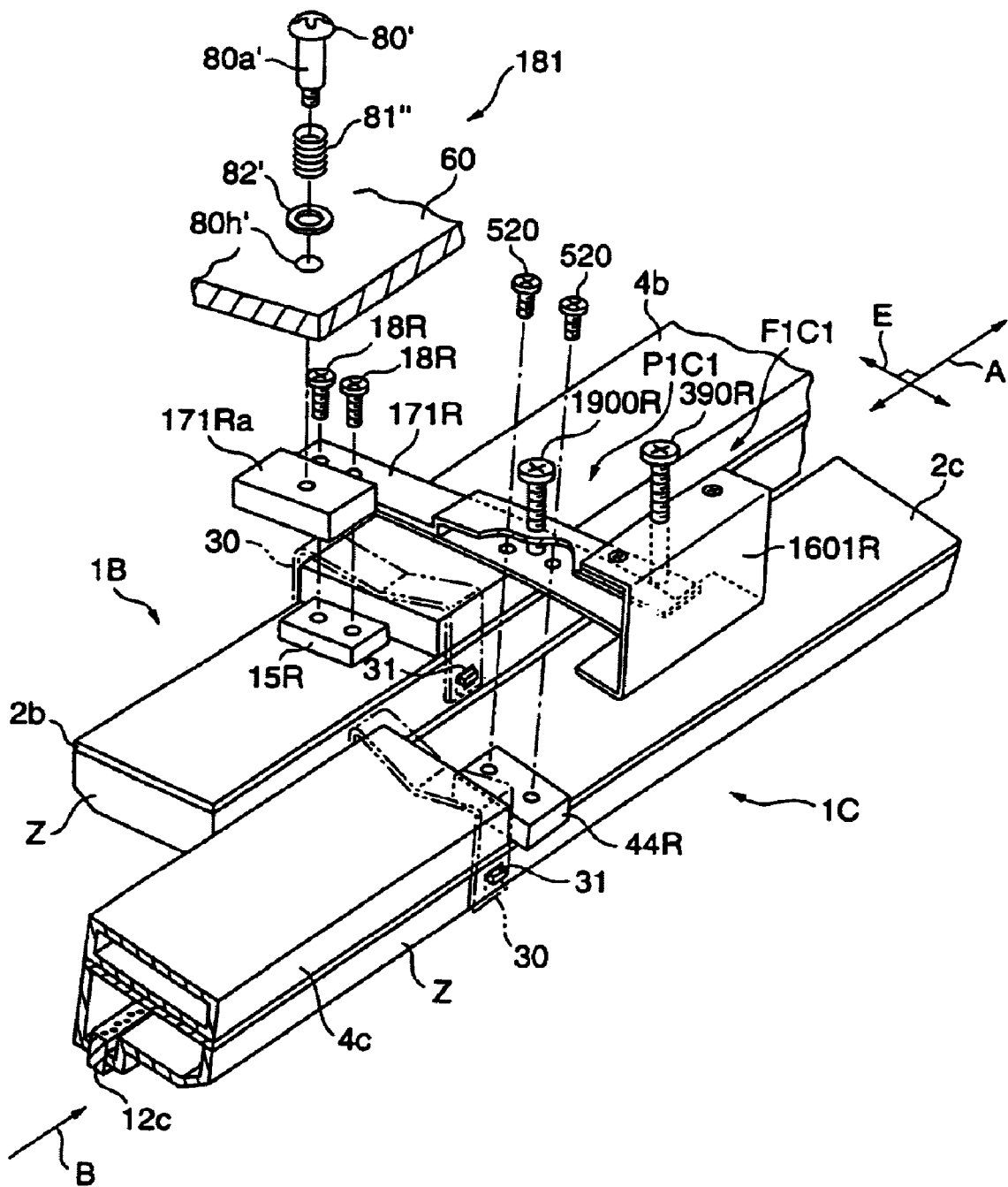
FIG. 21 is an enlarged perspective view of a circled portion II of FIG. 19.

In this example, the light emitting diode array units 1A, 1B, 1C are connected by the connecting members 1601R and 1601L as auxiliary members, and are attached to a frame 60 as a common supporting member integrally formed with the vertical direction adjusting units F1C1 and F1A1 and the focusing units P1C1 and P1A1, as shown in FIGS. 10, 20, and 21. These components including the frame 60 constitute an optical write apparatus 90.

In this example, only the spacers 14L and 15L, the connecting member 1601L, the spacers 14R and 15R, and the connecting member 1601R are interposed between the adjacent substrates 2a and 2b, and the substrates 2a and 2c. Here, the connecting members are fixed to the substrates, so that the substrates substantially form one component. However, in order to avoid adverse influence from thermal expansion and thermal contraction between the substrates, the auxiliary members other than the connecting members are movably attached to the substrates.

Likewise, in FIGS. 11, 15, 16, 17, and 27, only the spacers 14L, 14R, 15L, and 15R, and the connecting members 16L and 16R (160L and 160R, 1600L and 1600R, or 16000L and 16000R) are interposed between the substrates 2a and 2b, and the substrates 2b and 2c. Here, the connecting members are fixed to the substrates, so that the substrates substantially constitute one component. However, the auxiliary members other than the connecting members are movably attached to the substrates so as to avoid adverse influence from thermal expansion and thermal contraction.

Figure 19:
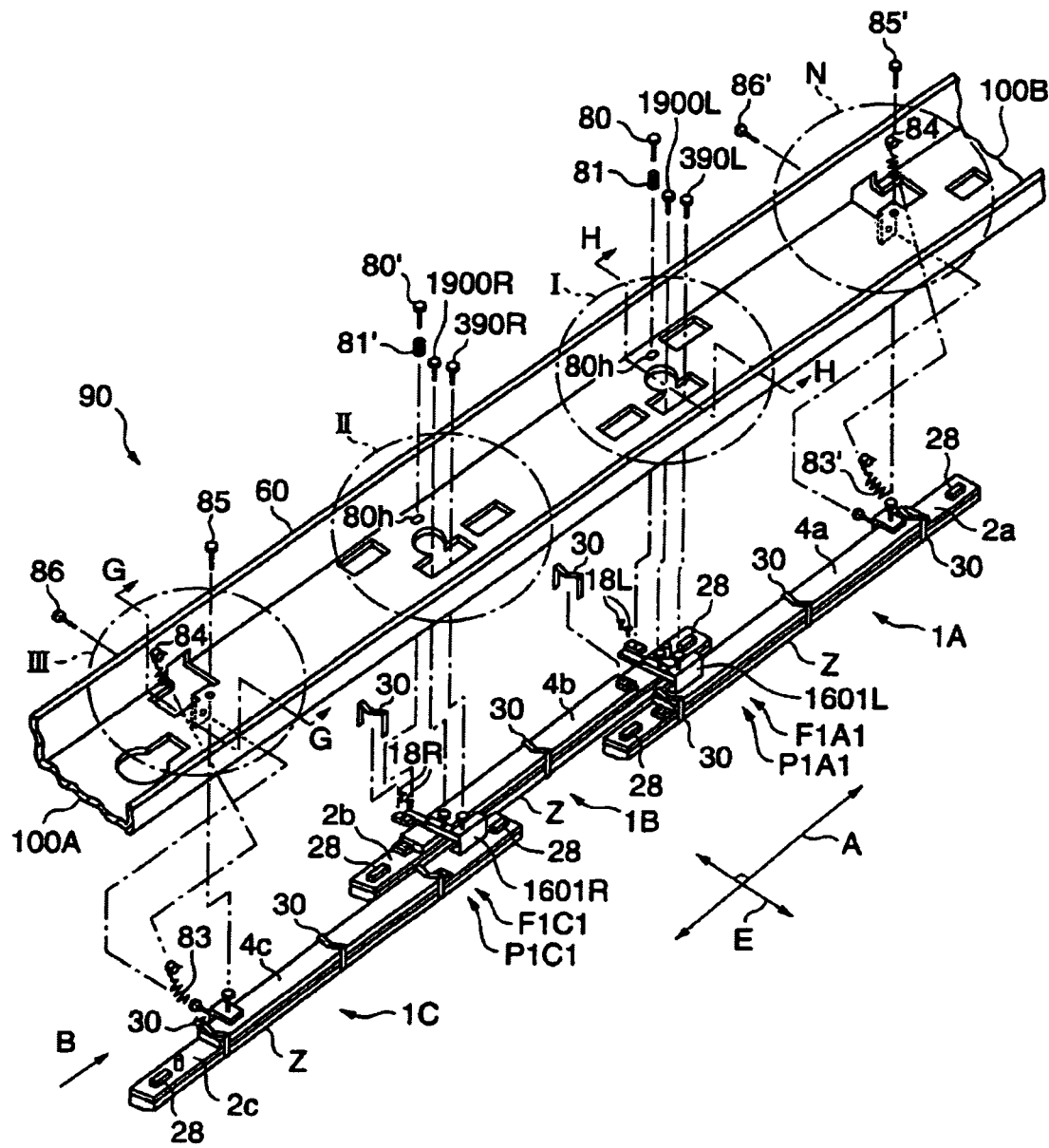
FIG. 19 is an exploded perspective view of an optical write apparatus in accordance with the present invention.

In FIG. 19, the light emitting diode array unit 1B comprising the substrate 2b, the lens case Z, the housing 4b, and the plate springs 30, is fixed to the light emitting diode array unit 1A comprising the substrate 2a, the lens case Z, the housing 4a, and the plate springs 30, via the connecting member 1601L. The light emitting diode array unit 1B is integrally structured with the vertical direction adjusting unit F1A1 and the focusing unit P1A1. The light emitting diode array unit 1B is also fixed to the light emitting diode array unit 1C comprising the substrate 2c, the lens case Z, the housing 4c, and the plate springs 30, via the connecting member 1601R. The light emitting diode array unit 1B is integrally structured with the vertical direction adjusting unit F1C1 and the focusing unit P1C1. Thus, the light emitting diode array units 1A, 1B, and 1C integrally constitute one component.

In the above integrated structure, only the adjusting plate 171L (shown in FIG. 18B) fixed to the connecting member 1601L is fixed to the frame 60 in this example.

FIG. 20 shows the structure in which only the adjusting plate 171L is fixed to the frame 60. FIG. 20 is an enlarged view of the part indicated by "I" in FIG. 19. The same components as in FIGS. 12, 13, 14, 18A, and 18B, are denoted by the same reference numerals, despite minor differences in shape. The main components shown in FIG. 20 basically correspond to those shown in FIGS. 18A and 18B.

As shown in FIG. 20, the adjusting plate 171L is provided with a rectangular bracket 171La which is attached to the bottom surface of the frame 60 by a stepped screw 80. The stepped screw 80 has a shaft portion 80a inserted into a circular hole 80h formed in the frame 60 via an extensible spring 81 and a washer 82. The top end of the stepped screw 80 is screwed into the bracket 171La. The bracket 171La is fixed to the frame 60 by virtue of the elasticity of the spring 81.

In each of the light emitting diode array units 1A, 1B, and 1C, the only fixed point to the frame 60 in the direction of the arrow A is the stepped screw 80. In FIG. 19, the light emitting diode array units 1A, 1B, and 1C are movably fixed, by auxiliary supporting units, to the frame 60 at the three points indicated by "II", "III", and "IV".

As described above, the entire structure that includes the light emitting diode array units 1A, 1B, and 1C, the auxiliary members, the vertical direction adjusting units, and the focusing units, is fixed to the frame 60 only at one point, so that the write accuracy of the light emitting diode array units can be prevented from being reduced due to thermal expansion and thermal contraction of the components. Thus, an optical write apparatus having high write accuracy can be obtained.

A first auxiliary supporting unit is disposed in the circled portion indicated by "II", in FIG. 19. The first auxiliary supporting unit is shown in FIG. 21. In FIG. 21, the same components as in FIGS. 12, 13, 14, 18A, and 18B are denoted by the same reference numerals, despite the minor differences in shape. The main components in FIG. 21 correspond to those shown in FIGS. 18A and 18B.

In FIG. 21, a rectangular bracket 171Ra is integrally attached to the adjusting plate 171R, and the bracket 171Ra is fixed to the bottom surface of the frame 60 by a stepped screw 80'. The stepped screw 80' has a shaft portion 80a' which is inserted into an extensible spring 81' and a washer 82', and is then engaged with a long hole 80h' formed in the frame 60 in parallel with the arrow A. The top end of the stepped screw 80' is screwed into the bracket 171Ra. The bracket 171Ra is fixed to the frame 60 by virtue of the elasticity of the spring, while remaining movable in the direction of the arrow A. The portion fixed to the frame 60 by the stepped screw 80' via the long hole 80h' forms a first auxiliary supporting unit 181.

With the auxiliary supporting unit 181, the light emitting diode array units 1A, 1B, and 1C are stably fixed to the frame 60, thereby stabilizing the write accuracy.

Figure 22:
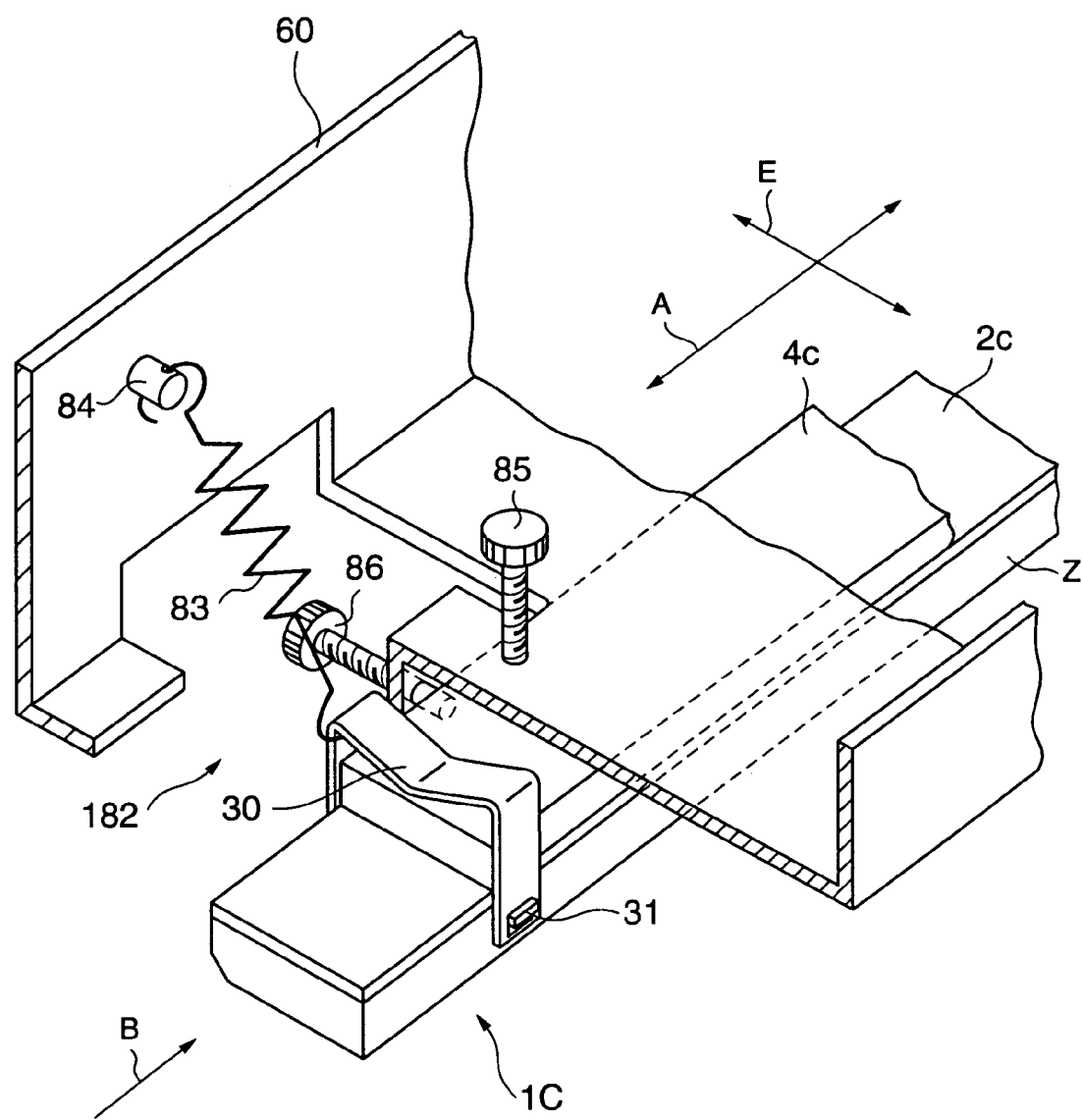
FIG. 22 is an enlarged perspective view of a second auxiliary supporting unit that corresponds to a circled portion III of FIG. 19.

A second auxiliary supporting unit 182 is disposed in the circled portion indicated by "III" in FIG. 19. FIG. 22 is an enlarged perspective view of the second auxiliary supporting unit 182 taken along the line G—G of FIG. 19. The same components as in FIGS. 12, 13, and 14 are denoted by the same reference numerals, despite the minor differences in shape.

In FIG. 22, the plate spring 30 holds the housing 4c and the substrate 2c at the end portion of the light emitting diode array unit 1C in the direction of the arrow A. One end of a spring 83 having tautness hooks the plate spring 31, while the other end of the spring 83 hooks a pin 84 planted in the wall of the frame 60.

In the vicinity of the plate spring 31 hooked by the spring 83, an adjusting screw 85 is screwed into a part of the frame 60 facing the upper surface of the housing 4c, so that the top end of the adjusting screw 85 is brought into contact with the upper surface of the housing 4c.

Also in the vicinity of the plate spring 31 hooked by the spring 83, a part of the frame 60 is cut and bent to face the side surface of the housing 4c. An adjusting screw 86 is screwed into the cut and bent portion of the frame 60, so that the top ends of the adjusting screws 85 and 86 are brought into contact with the side surface of the housing 4c.

Figure 23:
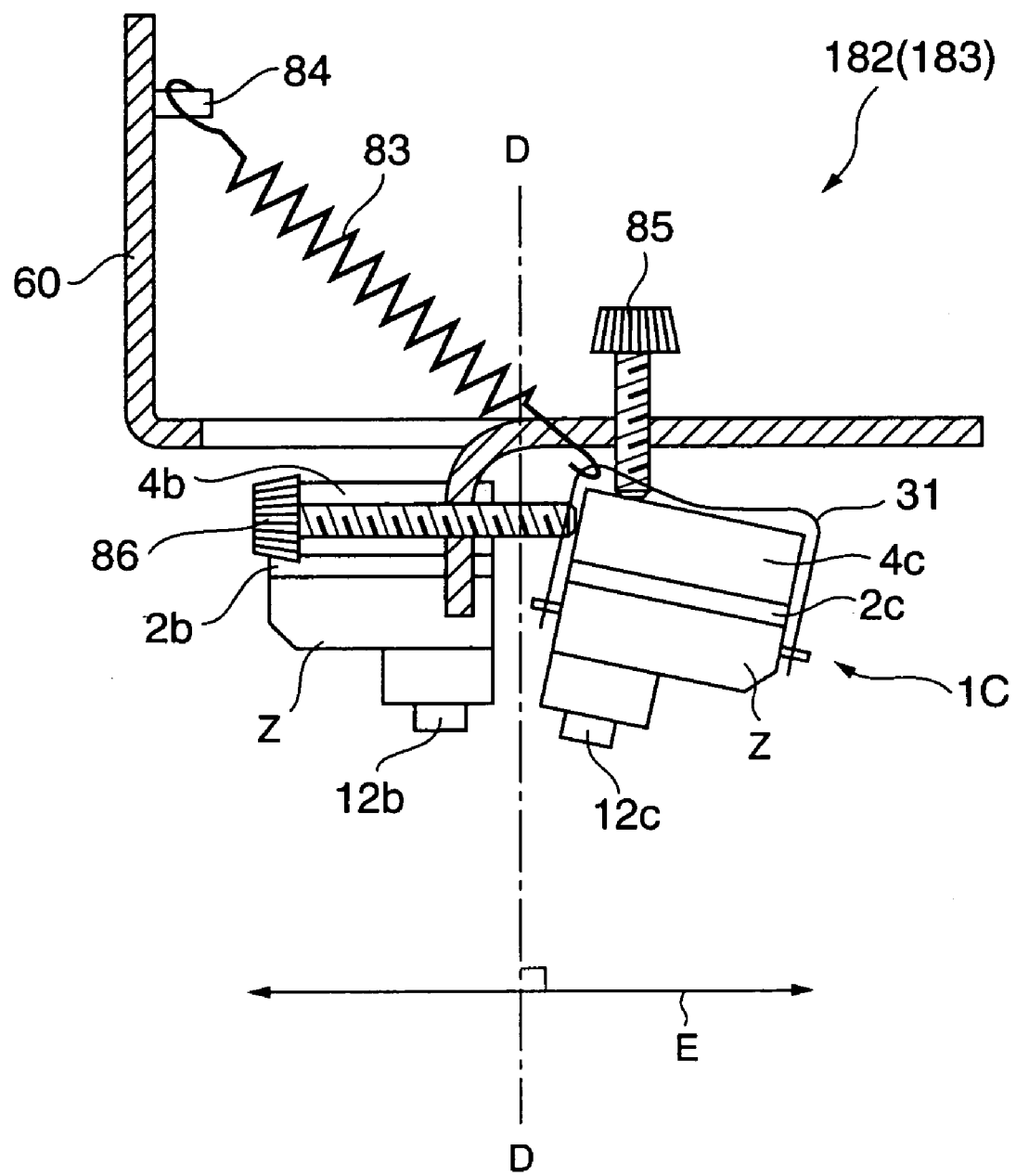
FIG. 23 shows the second auxiliary supporting unit seen from the direction of the arrow B of FIG. 22.

FIG. 23 shows the second auxiliary supporting unit 182 seen from the direction of the arrow B of FIG. 22. In FIG. 23, the adjusting screws 85 and 86 are subjected to the pulling force caused by the spring 83, thereby stably supporting the light emitting diode array unit 1C. By turning the adjusting screw 85, fine adjustment can be performed for one end of the light emitting diode array unit 1C in the focusing direction. By turning the adjusting screw 86, fine adjustment can be performed for one end of the light emitting diode array unit 1C in the vertical direction E. Since the upper surface of the frame 60 is unoccupied, it is easy to carry out the fine adjustment using the adjusting screw 85. Since the part of the frame 60 corresponding to the adjusting screw 86 is notched, it is easy to carry out the fine adjustment using the adjusting screw 86.

The adjustment using the adjusting screws 85 and 86 is performed in accordance with the adjustment performed by the vertical direction adjusting unit F1C1 and the adjusting unit P1C1. The spring 83 and the adjusting screws 85 and 86 constitute the main components of the second auxiliary supporting unit 182. In the second auxiliary supporting unit 182, the top ends of the adjusting screws 85 and 86 are subjected to the elastic force of the spring 83, thereby supporting the housing 4c. Accordingly, the light emitting diode array unit 1C is supported in a floated state, and does not hinder the movement of the substrate and the auxiliary members in the direction of the arrow A. Thus, no stress is caused even if the housing 4c is displaced in the direction of the arrow A due to thermal expansion or thermal contraction.

Figure 24:
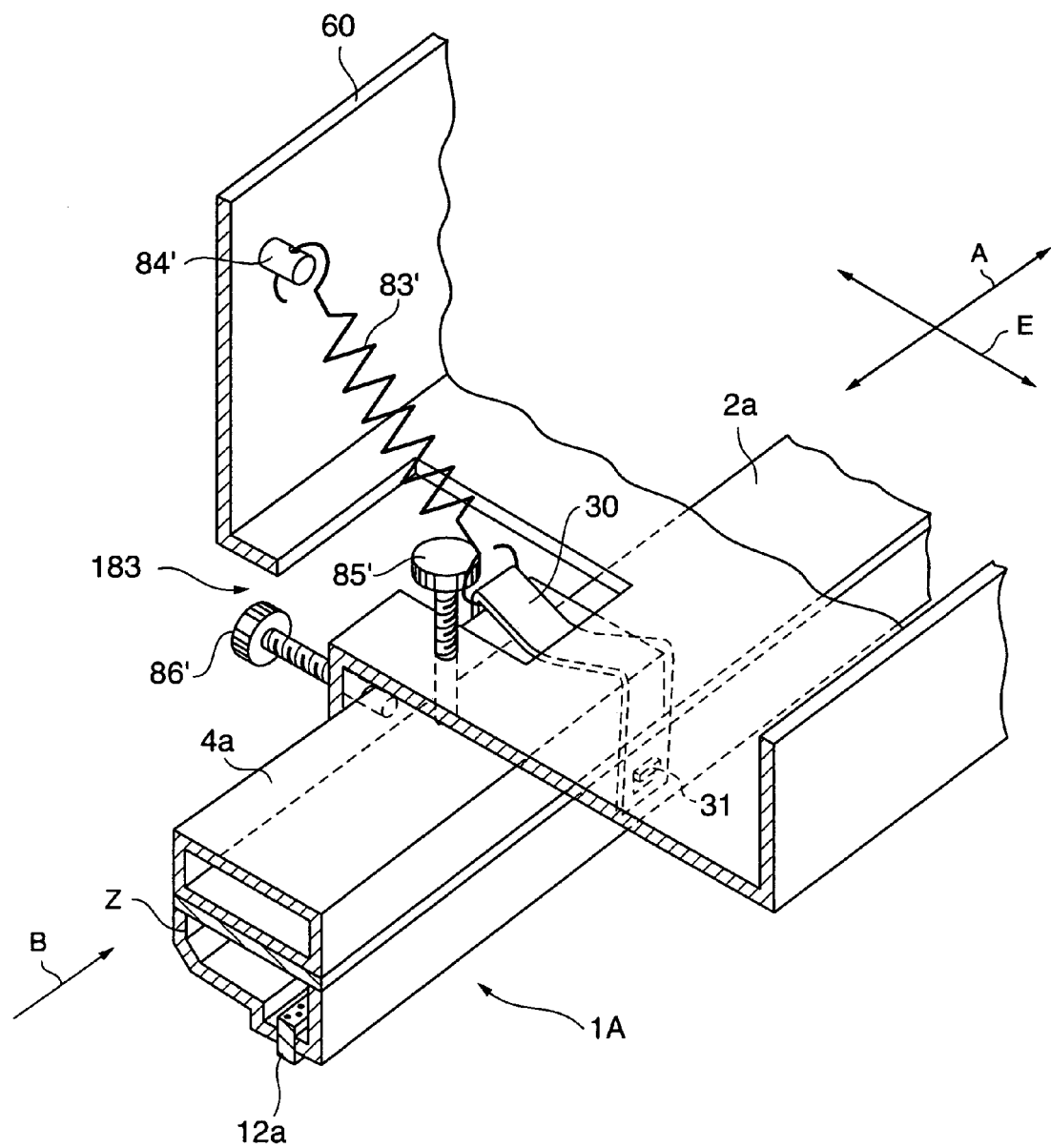
FIG. 24 is an enlarged perspective view of a third auxiliary supporting unit that corresponds to a circled portion IV of FIG. 19.

A third auxiliary supporting unit 183 is disposed in a portion indicated by "IV" in FIG. 19. FIG. 24 is an enlarged view of the third auxiliary supporting unit 183. In FIG. 24, components having the same functions as the corresponding components shown in FIG. 22 are denoted by the same reference numerals plus "'".

Each auxiliary supporting unit is movable in the direction of the arrow A and can be adjusted in the vertical direction. Accordingly, a decrease in write accuracy due to thermal expansion and contraction can be prevented, and write positions in the vertical direction can be adjusted by the vertical direction adjusting units.

As shown in FIG. 24, the plate spring 30 holds the housing 4a and the substrate 2a at an end portion of the light emitting diode array unit 1A in the direction of the arrow A. One end of a spring 83' having tautness hooks the plate spring 31, while the other end of the spring 83' hooks a pin 84' planted in the wall of the frame 60.

In the vicinity of the plate spring 31 hooked by the spring 83', an adjusting screw 85' is screwed into a part of the frame 60 facing the upper surface of the housing 4a, so that the top end of the adjusting screw 85' is brought into contact with the upper surface of the housing 4a.

Also in the vicinity of the plate spring 31 hooked by the spring 83', a part of the frame 60 is cut and bent to face a side surface of the housing 4a. The adjusting screws 85' and 86' are screwed into the cut and bent part of the frame 60, so that the top ends of the adjusting screws 85' and 86' are brought into contact with the side surface of the housing 4a.

The arrangement of the spring 83' and the adjusting screws 85' and 86' is exactly the same as the arrangement of the spring 83 and the adjusting screws 85 and 86 shown in FIG. 23. The adjustment using the adjusting screws 85' and 86' are performed in accordance with the adjustment by the vertical direction adjusting unit F1A1 and the focusing unit P1A1.

In the third auxiliary supporting unit 183, the top ends of the adjusting screws 85' and 86' are subjected to the elasticity of the spring 83'. Accordingly, the light emitting diode array unit 1A is supported in a floated state, and no unnatural stress is caused in the substrate and the auxiliary members even if the housing 4a is displaced in the direction of the arrow A due to thermal expansion or contraction.

Since the substrates are fixed to the common supporting member by the auxiliary supporting units as described above, the entire structure including the substrates, the auxiliary members, the focusing units, and the vertical direction adjusting units, is stably held by a fixed member, thereby stabilizing the write accuracy.

Figure 25:
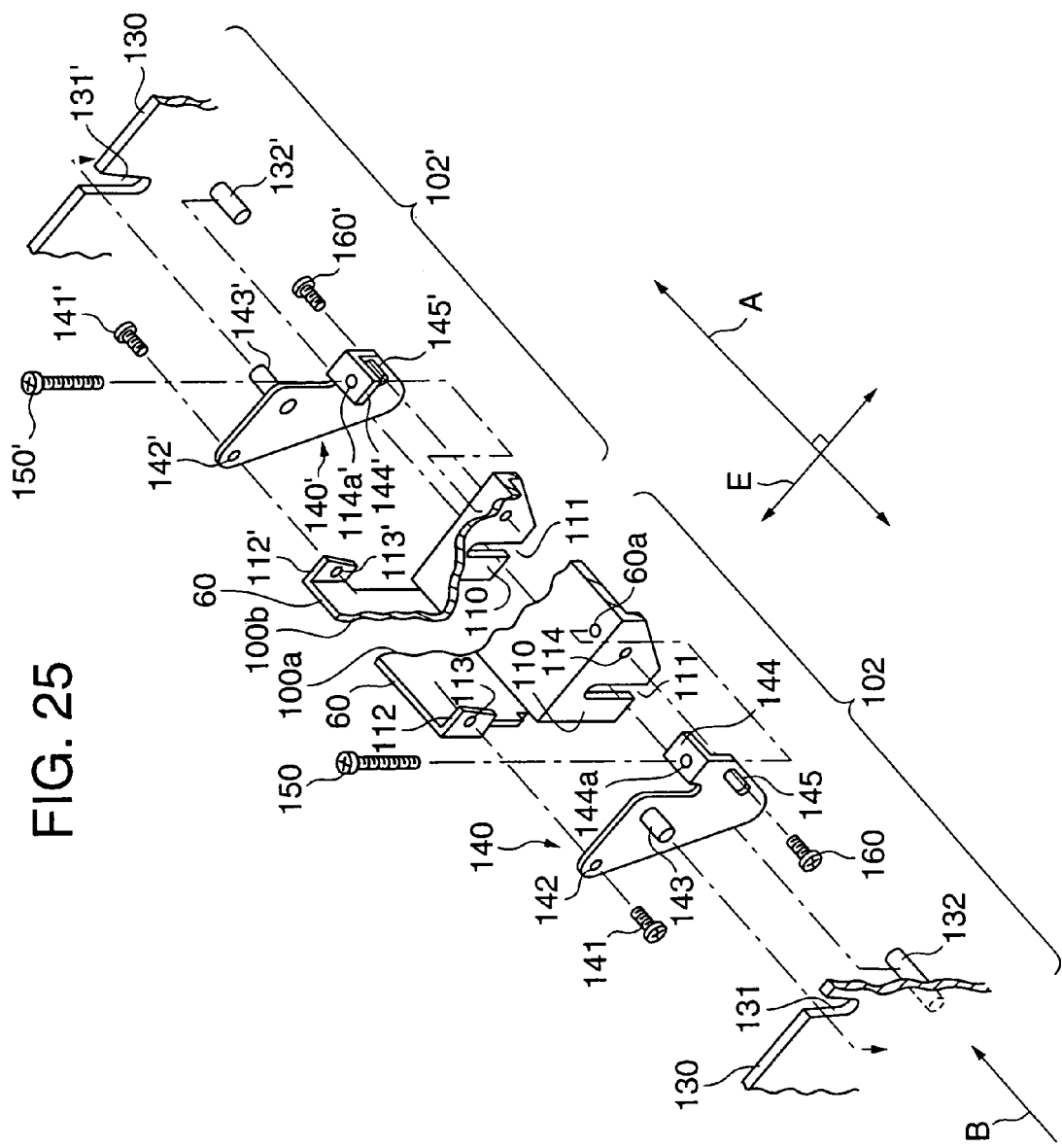
FIG. 25 is an exploded perspective view of attachment units of the optical write apparatus in accordance with the present invention.

Although one end of the frame 60 in the direction of the arrow A is not fully shown in FIG. 19, the section surface 100A extends to a section surface 100a shown in FIG. 25. The extension portion is a part of the frame 60, and the extension portion and an attaching member 130 for attaching the frame 60 constitute an attachment unit 102. The attachment unit 102 attaches one end of the frame 60 to the attaching member 130, and adjusts the movement of that end of the frame 60 in the focusing direction. The attaching member is formed by two side plates facing each other in an image forming apparatus.

In FIG. 25, the ends of the frame 60 on the side of the substrates 2a, 2b, and 2c, are bent outward to form a bent portion 110 having a reverse U-shaped groove 111 formed in the focusing direction.

The extended end portion of the wall having the planted pin 84 is bent at a right angle to form a bent portion 112. A bracket 140 is rotatively fixed to the bent portion 112 by a stepped screw 141 screwed into a screw hole 113 via a hole 142. In this rotatively fixed state, the bracket 140 is in contact with the bent portion 110.

A pin 143 is planted on the surface of the bracket 140 on the side of the attaching member 130. The pin 143 is engaged with a U-shaped groove 131 formed in the attaching member 130.

A pin 132 is planted on the surface of the attaching member 130 on the side of the bracket 140. The pin 132 is engaged with the reverse U-shaped groove 111 formed in the bent portion 110.

A bent portion 144 of the bracket 140 faces the flAt portion of the frame 60. A hole 144a having a larger diameter than the diameter of an adjusting screw 150 is formed in the bent portion 144, and a screw hole 60a is formed in the flAt portion of the frame 60 on the side of the hole 144a. The adjusting screw 150 is screwed into the screw hole 60a via the hole 144a.

An arcuate long hole 145 is also formed in the bracket 140, and the bracket 140 is fixed to the frame 60 by a lock screw 160 screwed into a screw hole 114 of the bent portion 110 via the long hole 145.

Although the other end of the frame 90 in the direction of the arrow A is not fully shown in FIG. 19, the section surface 100B extends to a section surface 100b shown in FIG. 25. The extension portion is a part of the frame 60. The extension portion and the attaching member 130 for attaching the frame 60 constitute an attachment unit 102'. The attachment unit 102' fixes the other end of the frame 60 to the attaching member 130, and adjusts the movement of the other end of the frame 60 in the focusing direction. The structure of the attachment unit 102' is symmetrical to the structure of the attachment unit 102. Accordingly, the components of the attachment unit 102' having the same functions as those of the attachment unit 102 are denoted by the same reference numerals plus "'".

Figure 26:
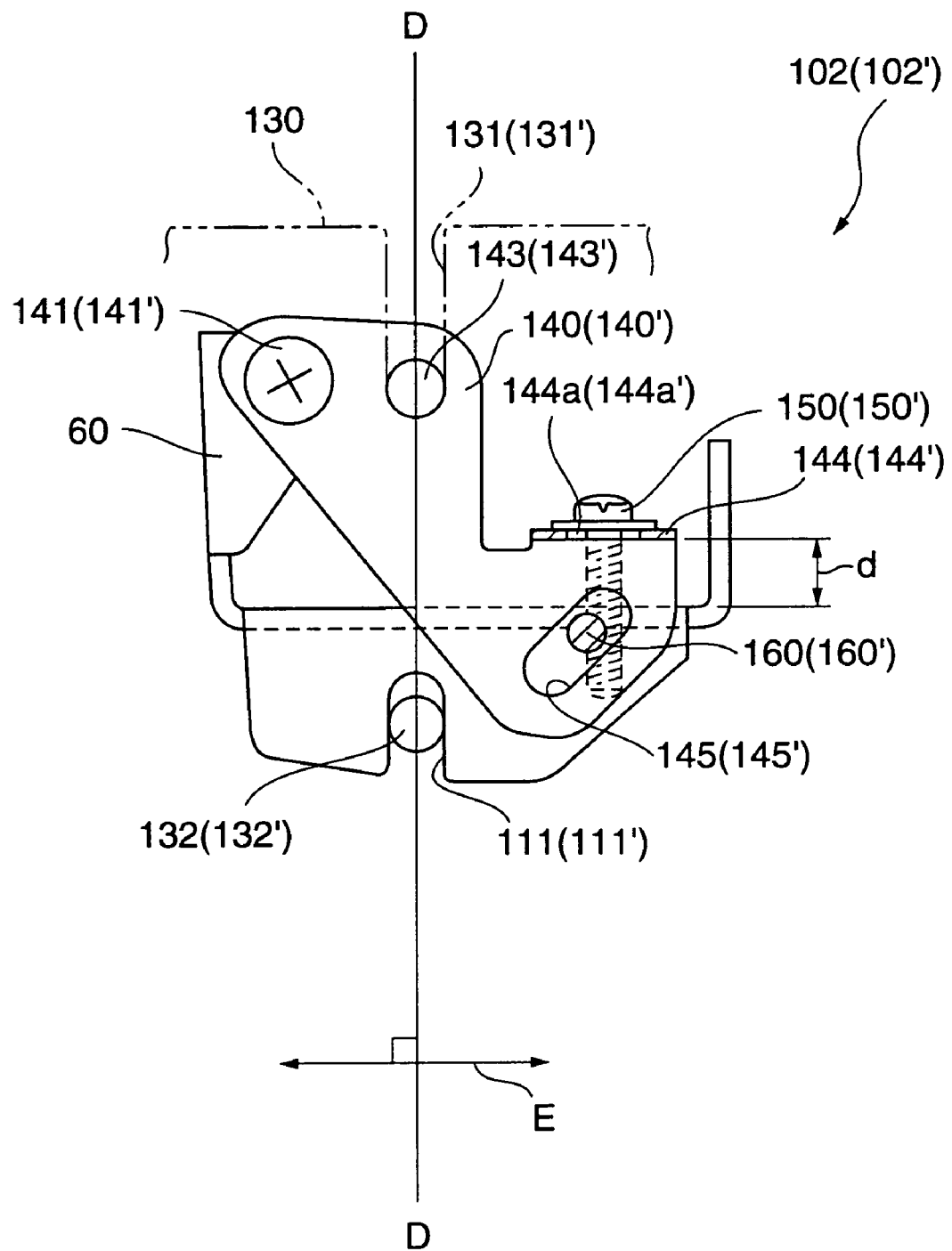
FIG. 26 is a front view of the attachment units of FIG. 25.

FIG. 26 shows the attachment unit 102 (102') shown in the direction of the arrow B of FIG. 25. The line between the center of the U-shaped groove 131 (131') and the center of the pin 132 (132') is located on the line D—D passing through the axis line of the photosensitive drum 10. The frame 60 is heavy because it supports the light emitting diode array units 1A, 1B, and 1C. The weight of the frame 60 is supported by the bracket 140 (140') connected to the frame 60 by the screw 141 (141') and the adjusting screw 150 (150'). The pin 143 (143') is in contact with the bottom of the U-shaped groove 131 (131'), so that the frame 60 is supported via the bracket 140 (140').

The lock screw 160 (160') is loosened, and the adjusting screw 150 (150') is tightened, so that the bracket 140 (140') rotates clockwise around the pin 143 (143'), and that the frame 60 (or the optical write apparatus 90) rotates counterclockwise around the screw 141 (141'). Here, the frame 60 ascends along the reverse U-shaped groove 111 (111'), thereby reducing a distance d. If the adjusting screw 150 (150') is loosened, on the other hand, the frame 60 descends along the reverse U-shaped groove 111 (111').

In the above manner, one end of the frame 60 (the optical write apparatus 90) can be adjusted in the focusing direction by screwing the adjusting screw 150, while the other end of the frame 60 (the optical write apparatus 90) can be adjusted in the focusing direction by screwing the adjusting screw 150'.

In this example, the light emitting diode array unit 1B is adjusted in the focusing direction. After the adjustment, the light emitting diode array unit 1B is fixed by the lock screw 160 (160') to maintain the adjusted state. The light emitting diode array units 1A and 1C are then positioned in the focusing direction by the focusing units P1C1 and P1A1.

In the above manner, an optical write apparatus having light emitting diode array units having short substrates constituting one substrate as a light source can be positioned in the focusing direction in an image forming apparatus.

When focusing, the frame 60 shifts from the vertical direction. Therefore, the light emitting diode array units 1A and 1C should be adjusted by the vertical direction adjusting units F1C1 and F1A1 so that the light emitting diode array units 1A and 1C are in parallel with the write line of the light emitting diode array unit 1B.

The attachment units of this example can be applied to an optical write apparatus including the light emitting diode array units of any other example in this specification.

As described so far, the attachment units 102 and 102' adjust both ends of the common supporting member 60 in the focusing direction, so that the optical write apparatus 90 can be attached to an image forming apparatus. Also, the write positions of all the substrates can be easily adjusted in the focusing direction and the vertical direction.

3-e: Example 5

In Examples 2 and 3 (3-b and 3-c), the entire optical write apparatus including the light emitting diode array units 1A, 1B, and 1C is moved so that the light emitting diode array unit 1B is adjusted in the focusing and vertical directions. The light emitting diode array units 1A and 1C are then adjusted in the vertical direction and in the focusing direction independently by the vertical direction adjusting units F1C1 and F1A1, and the focusing units P1C1 and P1A1, respectively.

However, if the adjustment of light emitting diode array unit 1B is found to be incomplete after the adjustment operations by the vertical direction adjusting units F1C1 and F1A1, it is necessary to readjust the write position of the light emitting diode array unit 1B in the vertical direction.

To avoid that problem, this example enables independent adjustment of the light emitting diode array unit in the vertical direction and the focusing direction, as well as independent adjustment of the light emitting diode array units 1A and 1C.

As shown in FIG. 27B, a focusing unit and a vertical direction adjusting unit having the same structure as those in Examples 2 and 3 (3-b and 3-c) are disposed at either end of the light emitting diode array unit 1B, with the line D—D passing through the center point between the substrates 2a and 2b being a symmetrical axis.

Referring to FIGS. 27A and 27B, the vertical direction adjusting unit F1C1 that adjusts the write position in the vertical direction of the light emitting diode array unit 1C and the vertical direction adjusting unit F1A1 that adjusts the write position in the vertical direction of the light emitting diode array unit 1A are substantially the same as those shown in FIGS. 18A and 18B. Accordingly, the same components as in FIGS. 18A and 18B are denoted by the same reference numerals.

This example differs from the example shown in FIGS. 18A and 18B in that a T-shaped adjusting plate 1701R (1701L) is employed instead of the adjusting plate 171R (171L), and that a connecting member 16001R (16001L) is fixed to the adjusting plate 1701R (1701L) by the screw 32R (32L) on the line D—D.

The focusing units of the light emitting diode array unit 1B are disposed on the right end and the left end in the direction of the arrow A. In the focusing unit P1BR1 disposed on the right end shown in FIGS. 27A and 27B, the spacer 14R' is fixed to the substrate 2b, and the spacer 14R' is also fixed to the connecting member 16001R by the screws 520'. The focusing unit P1BR1 comprises a screw 1900R' as a third external force unit that narrows and widens the gap between the connecting member 16001R and the adjusting plate 1701R on the side of the substrate 2b. In the focusing unit P1BL1 disposed on the left end shown in FIGS. 27A and 27B, the spacer 14L' is fixed to the substrate 2b, and the spacer 14L' is also fixed to the connecting member 16001L by the screws 50'. The focusing unit P1BL1 comprises a screw 1900L' as a third external force unit that narrows and widens the gap between the connecting member 16001L and the adjusting plate 1701L on the side of the substrate 2b.

The vertical direction adjusting units of the light emitting diode array unit 1B are disposed on the right end and the left end in the direction of the arrow A. The vertical direction adjusting unit F1BR1 on the right end comprises a screw 390R' as a fourth external force unit that narrows and widens the gap between the connecting member 16001R and the adjusting plate 1701R by applying an external force to the end portion of the connecting member 16001R on the side of the substrate 2b, with a part (the top end) of the screw 1900R' as the third external force unit being a supporting point. The vertical direction adjusting unit F1BL1 comprises a screw 390L' as a fourth external force unit that narrows and widens the gap between the connecting member 16001L and the adjusting plate 1701L by applying an external force to the end portion of the connecting member 16001L on the side of the substrate 2b, with a part (the top end) of the screw 1900L' as the third external force unit being a supporting point. One of the adjusting plates 16001R and 16001L is fixed to a fixed member and the other one is movably supported.

As shown in FIGS. 27A and 27B, with the line D—D being the symmetrical axis, the combination of the focusing unit P1C1 and the vertical direction adjusting unit F1C1 is located on the right, and the combination of the focusing unit P1BR1 and the vertical direction adjusting unit F1BR1 is located on the left. Also, with the line D—D being the symmetrical axis, the combination of the focusing unit P1A1 and the vertical direction adjusting unit F1A1 is located on the right, and the focusing unit P1BR1 and the vertical direction adjusting unit F1BR1 is located on the left.

In this example, the write positions in the vertical direction of the substrates 2c and 2a adjacent to each other in the aligning direction of the light emitting diodes are adjusted by the vertical direction adjusting units F1C1 and F1A1, and the write position in the vertical direction of the substrate 2b is adjusted by the vertical direction adjusting units F1BR1 and FRBL1. Likewise, the focusing operations for the substrates 2c and 2a adjacent to each other in the aligning direction of the light emitting diodes are carried out by the focusing units P1C1 and P1A1, and the focusing operation for the substrate 2b is carried out by the focusing units P1BR1 and P1BL1.

As described above, the light emitting diode array units 1A, 1B, and 1C can be adjusted in the vertical direction and the focusing direction independently of each other. Thus, the write positions can be very easily adjusted.

3-f: Example 6

A screw unit can replace the following: the adjusting screw 19R (19L) as an external force unit that narrows and widens the gap between the connecting member 16R (16L) and the adjusting plate 17R (17L) shown in FIGS. 11A and 11B; the adjusting screws 19R (19L) and 19R' (19L') as an external force unit that narrows and widens the gap between the connecting member 160R (160L) and the adjusting plate 170R (170L) shown in FIGS. 15A and 15B; the adjusting screw 39R (39L) as an external force unit that narrows and widens the gap between the connecting member 1600R (1600L) and the adjusting plate 170R (170L) shown in FIGS. 16A and 16B; the adjusting screws 39R (39L) and 39R' (39L') as an external force unit that narrows and widens the gap between the connecting member 16000R (16000L) and the adjusting plate 1700R (1700L) shown in FIGS. 17A and 17B; the screws 390R (390L), 39R' (39L'), and 1900R (1900L) as an external force unit that narrows and widens the gap between the connecting member 1601R (1601L) and the adjusting plate 171R (171L) shown in FIGS. 18A and 18B; and the screws 390R (390L), 390R' (390L'), 1900R (1900L), and 1900R' (1900L') as an external force unit that narrows and widens the gap between the connecting member 16001R (16001L) and the adjusting plate 1701R (1701L) shown in FIGS. 27A and 27B. The screw unit slightly displaces the adjusting plates depending on the rotation, so that minute focusing and write position adjustment can be accurately performed.

[4] Fourth Embodiment

In the optical write apparatus of any of the above embodiments, the dot pitch of the irradiating light from the light emitting diodes of the light emitting diode array units is about 63.5 μm to form a latent image at a resolution of 40 dpi on a photosensitive member. In general, a dot pit error should be 5 μm or smaller. Otherwise, black and white lines in the vertical direction appear in an image on the photosensitive member, or line deviation occurs in an image. Therefore, the light emitting diode array units should be seamed so that the dot pitch error is 5 μm or smaller.

However, it is technically difficult to keep the dot pitch error under 5 μm at the seams between the light emitting diode array units. If a special adjustment mechanism is employed to keep the dot pitch error in the write range less than 5 μm, the production costs will increase.

In this embodiment, to solve the above problems, an optical write apparatus in which no black and white lines appear in an image formed on the photosensitive member and no line deviation occurs is provided without accurately positioning the light emitting diode array units in the horizontal direction of the photosensitive member or employing a costly mechanism for adjusting the dot pitch error of the light emitting diodes at the seams between the light emitting diode array units.

In view of this, the optical write apparatus of this embodiment comprises a control unit (not shown). The control unit is constituted by a microcomputer comprising a CPU, a ROM, a RAM, and others. The control unit performs light emission control on the light emitting diodes aligned on each light emitting diode array unit, and carries out a control process to form a latent image by exposing the photosensitive drum to light emitted from the light emitting diodes. Also, the control unit performs light emission amount correction and write range shift, and controls the amount of light emitted from the light emitting diodes located at the seams between the light emitting diode array units, and the light emitting range of the light emitting diodes.

In Case I, the control unit comprises a light emission amount correction unit that performs only light emission amount correction. In Case II, the control unit comprises a write range shift unit that controls the light emitting range of the light emitting diodes. In Case III, the control unit comprises both the light emission amount correction unit and the write range shift unit. Each of these cases will be described in the following description.

1. Case I

In this example, the control unit comprises the light emission amount correction unit that corrects the amount of light emitted from the light emitting diodes located at each seam between the light emitting diode array units. With the light emission amount correction unit, defects such as black and white lines and line shifting in an image formed on the photosensitive member can be prevented without accurately positioning the light emitting diode array units in the vertical direction of the photosensitive member or employing a costly mechanism for adjusting the dot pitch error of the light emitting diodes located at the seams between the light emitting diode array units.

The optical write apparatus, to which Case I can be applied, comprises the substrates 2a, 2b, and 2c each having aligned light emitting diodes that are parts of the light emitting diode array units 1A, 1B, and 1C, respectively, as shown in FIG. 5. The end portions of the substrates 2b and 2c are connected by the connecting member 3B. The end portions between the substrates 2a and 2b are connected by the connecting member 3A. The light emitting diode array units are arranged so that the arrow A direction, that corresponds to the aligning direction of the light emitting diodes on the substrates 2a, 2b, and 2c, is in parallel with the horizontal direction of the photosensitive drum 10.

Figures 28A, 28B:
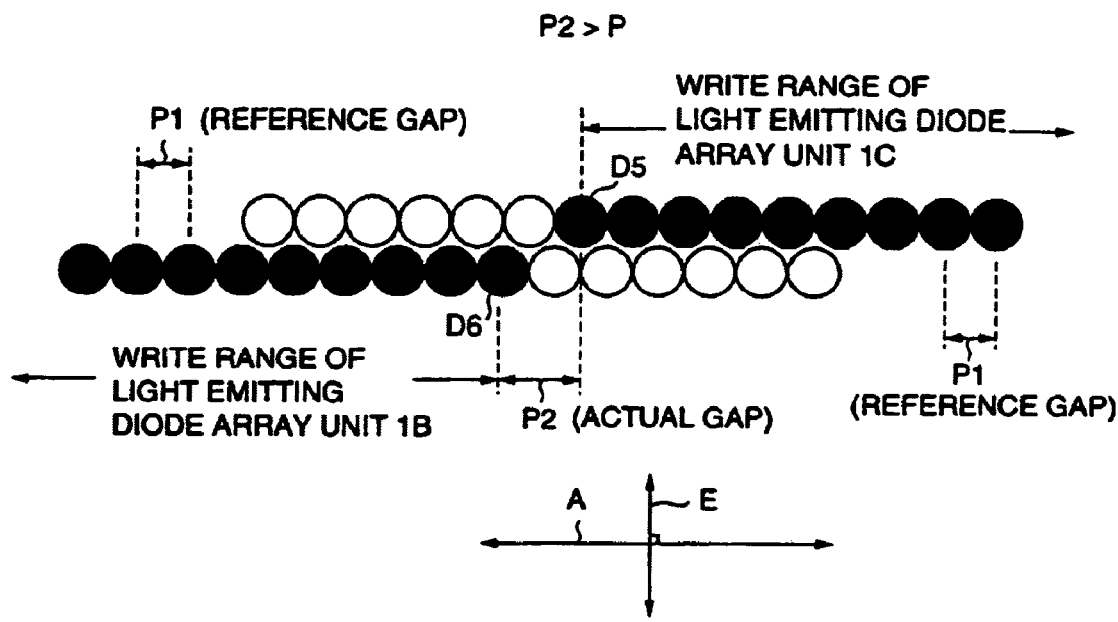
FIGS. 28A and 28B are enlarged schematic views of dot arrangements of light emitted from the light emitting diodes at the seam between the light emitting diode array units shown in FIG. 5.

FIGS. 28A and 28B show enlarged schematic arrangement of dots of light emitted from the seam between the light emitting diode array units 1B and 1C, i.e., from the seam between the substrates 2b and 2c, on the photosensitive drum 10 shown in FIG. 5 (the enlarged portion is circled in FIG. 5). In FIGS. 28A and 28B, the black circles indicate dots emitted onto the photosensitive member, while the white circles indicate dots not emitted onto the photosensitive member at this point.

The write apparatus has the light emitting diode arrays overlapping with each other at the seam between the substrates of the light emitting diode array units. If the write apparatus is produced at normal accuracy, a phase shift smaller than the pitch P1 between the light emitting diodes occurs at the seam overlapping portion due to a size error of the components such as the connecting members 3A and 3B, and the light emitting diode array units 1A, 1B, and 1C.

There are two possible types of phase shift. One is a case where the ends of the write ranges are separated from each other in the direction of the arrow A. The other one is a case where the ends of the write ranges overlap with each other in the direction of the arrow A. The light emission amount correction unit performs different operations for the two types of phase shift.

The end of each write range is the center line of the dot corresponding to the end of the seam in the dot arrangement. Accordingly, when the center lines of the dots corresponding to the ends of the write ranges overlap with each other or past each other, it is considered that the write ranges overlap with each other. When the outlines of dots overlap with each other, that does not mean that the write ranges overlap with each other. This applies to the following examples.

Case I-1

At the seam between the light emitting array units 1B and 1C (more strictly speaking, between the substrates 2b and 2c), the write ranges of the light emitting diode array units 1B and 1C are separated from each other in the direction of the arrow A, that is the horizontal direction.

As shown in FIG. 28A, at the write switching point on the photosensitive drum 10 onto which light is emitted from the light emitting diode located at the seam, the pitch P2 (i.e., the actual gap) between the dot D5 of the light emitted from the light emitting diode corresponding to the end of the write range of the light emitting diode array unit on the side of the seam and the dot D6 of light emitted from the light emitting diode corresponding to the end of the write range of the light emitting diode array unit on the side of the seam is larger than the dot pitch P1 (the reference gap) between the center points of lights emitted from two adjacent light emitting diodes of the light emitting diode array units 1B and 1C. Under this condition, the light emitting ranges of the light emitting diodes of the light emitting diode array units 1B and 1C do not overlap with each other at the seam.

If the light emitting diode array units 1B and 1C emit light to form a solid image or a half-tone image on the photosensitive drum 10 in the above condition, the photosensitive drum 10 lacks the amount of emitted light corresponding to the dot pitch P2 (the actual gap) shown in FIG. 28A.

Figure 29A:
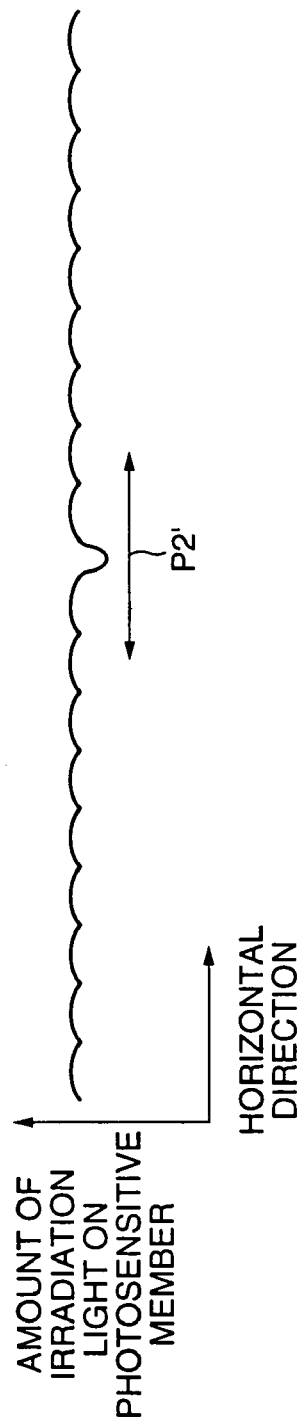
FIGS. 29A and 29B are diagrams each showing the relationship between the amount of emitted light and a position in the horizontal direction of the photosensitive member corresponding to the seam between the light emitting diode array units of FIG. 5.

FIG. 29A is a diagram showing the relationship between the amount of emitted light and the position in the horizontal direction corresponding to the seam between the light emitting diode array units 1B and 1C on the photosensitive drum 10. Like the above example, if the actual gap P2 is larger than the reference gap P1, the amount of light emitted onto the portion corresponding to the actual gap P2 on the photosensitive drum 10 greatly decreases as indicated by P2' in FIG. 29A, resulting in white lines in an image due to insufficient exposure at the portion.

In the optical write apparatus of this example, the control unit (not shown) is provided with the light emission amount correction unit to correct the amount of light emitted from the light emitting diodes located at the seam between the light emitting diode array units. More specifically, the light emitting diode array units 1A, 1B, and 1C are connected by the connecting members 3A and 3B, and then emit light to irradiate the photosensitive drum 10. The gaps between the light dots at the write switching points on the photosensitive drum 10 corresponding to the seam between the light emitting diode array units 1A, 1B, and 1C (strictly speaking, between the substrates 2a, 2b, and 2c) are measured, or an actual image is outputted. According to the result, the amount of light emitted from the light emitting diodes located at the seam between the light emitting diode array units corresponding to the write switching points.

Where the actual pitch P2 is larger than the reference pitch P1 on the photosensitive drum 10 as shown in FIG. 28A, the light emission amount correction unit of the control unit increases the amount of light emitted from the light emitting diode located at the furthermost end of the write range of the light emitting diode array unit 1C. By doing so, the photosensitive drum 10 receives a sufficient amount of light, and white lines will not appear in an image.

FIG. 30a is a diagram showing the relationship between the amount of emitted light and the position in the horizontal direction on the photosensitive drum 10 when the amount of light emitted from the light emitting diode corresponding to the furthermost end of the write range of the light emitting diode array unit 1C. By increasing the amount of light emitted onto the portion on the photosensitive drum 10 corresponding to the seam between the substrates 2b and 2c, the amount of emitted light in the vicinity of the write switching point becomes substantially equal to the amount of emitted light at other areas, thereby preventing white lines from appearing in an obtained image. In this example, by increasing the amount of light emitted from at least one of the light emitting diodes at the seam, sufficient correction can be performed to avoid white lines.

Case I-2

Figure 29B:
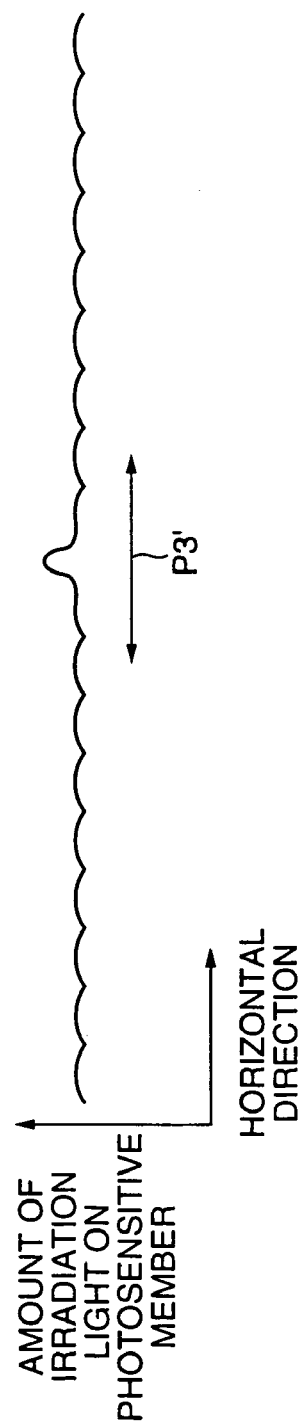

In this case, at the seam between the light emitting diode array units 1B and 1C (strictly speaking, between the substrates 2b and 2c), the write ranges of the light emitting diode array units 1B and 1C overlap with each other in the direction of the arrow A. As shown in FIG. 28B, at the write switching points on the photosensitive drum 10 onto which light is emitted from the light emitting diodes located at the seam, the gap P3 (an actual gap) between the center of the dot D5 of light emitted from the light emitting diode corresponding to the end of the seam of the write range of the light emitting diode array unit 1C and the center of the dot D6 of light emitting from the light emitting diode corresponding to the end of the seam of the write range of the light emitting diode array unit 1B is smaller than the gap P1 (the reference gap) between two adjacent light emitting diodes of the light emitting diode array units 1B and 1C.

Where the actual gap P3 is smaller than the gap P3 (the actual gap) as above, the amount of emitted light in the vicinity of a range P3' corresponding to the actual gap P3 is much larger, as shown in FIG. 29B.

If the light emitting diode array units 1B and 1C emit light onto the photosensitive drum 10 to form a solid image or a half-tone image under the above condition, the amount of emitted light corresponding to the actual gap P3 shown in FIG. 28B becomes an excessive amount, resulting in black lines due to overexposure.

In view of this, where the actual gap P3 is smaller than the reference gap P1, the light emission amount correction unit reduces the amount of light emitted from the light emitting diode D5 corresponding to the furthermost end of the seam portion of the write range of one of the light emitting diode array units 1B and 1B. By doing so, the amount of light emitted onto a dot position adjacent to the light increased dot position on the photosensitive drum 10 can be reduced as shown in FIG. 30B. Thus, a constant amount of emitted light can be obtained in the horizontal direction on the photosensitive drum 10, thereby preventing black lines from appearing in an obtained image.

Since the light emitting diodes are generally used at almost full power, the amount of light emitted from the light emitting diodes is normally reduced as in this example. The amount of emitted light can be reduced by simply reducing the power supply. Accordingly, reducing the amount of emitted light is easier than increasing the amount of emitted light.

In the above cases I-1 and I-2, the amount of light emitted from the light emitting diode corresponding to the end of the write range of the light emitting diode array unit 1C is adjusted. However, the amount of light emitted from the light emitting diode corresponding to the dot D6 at the end of the write range of the light emitting diode array 1B can be adjusted, or the amount of light emitted from the light emitting diodes corresponding to the dots D5 and D6 at the ends of the respective write ranges of the light emitting diode array units 1B and 1C can be adjusted. In this example, effective correction can be easily performed by simply adjusting the amount of light emitted from at least one of the light emitting diodes at the seam between two adjacent light emitting diode array units, thereby avoiding white lines and black lines in an obtained image.

With the light emission amount correction unit, it is not necessary to produce the light emitting diode array units 1A, 1B, and 1C, and the connection members 3A and 3B at high accuracy. Also, it is not necessary to employ a complicated adjustment mechanism. Still, it is possible to form an excellent image on the photosensitive drum 10, without white lines, black lines, and line shift.

As described above, it is possible to form an image having neither black and white lines nor line shift on the photosensitive member, without arranging the light emitting diode array units at high positioning accuracy in the horizontal direction of the photosensitive member, and without employing a costly mechanism for adjusting the dot pitch error of the light emitting diodes at each seam between the light emitting diode array units. In this example, the amount of light emitted from the light emitting diode of at least one of two adjacent light emitting diode array units is simply reduced to perform effective correction and avoid black lines in an image.

2. Case II

Case II-1

If the connecting accuracy at the seam portions between the light emitting diode array units 1A, 1B, and 1C is lower than in Case I, and if the actual gap between the centers of dots of light emitted from the light emitting diodes corresponding to the ends of the write emitting ranges of the light emitting diode array units 1B and 1C or the light emitting diode array units 1B and 1A is larger than twice the reference gap between two adjacent light emitting diodes, or the write ranges of the light emitting diodes array units overlap with each other in the aligning direction of the light emitting diode arrays, it is difficult to prevent white lines, black lines, and line shift on the photosensitive drum 10.

Figure 31:
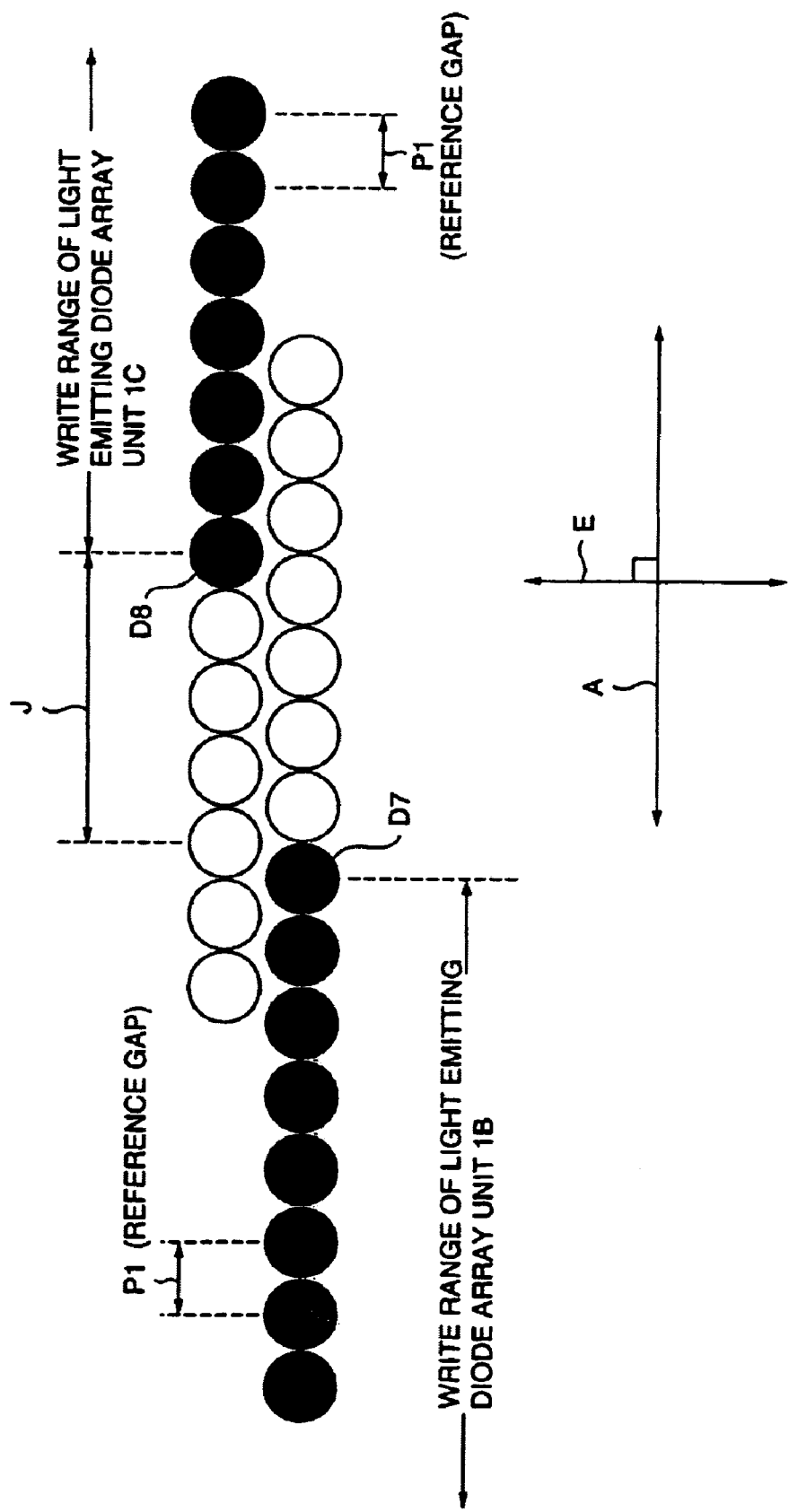
FIG. 31 is an enlarged view of an example dot arrangement on the photosensitive member corresponding to the seam between the light emitting diode array units of FIG. 5.

As shown in FIG. 31, the write range of the light emitting diode array unit 1B is separated from the write range of the light emitting diode array unit 1C, and the actual gap J between the center of the dot D7 at the end of the write range of the light emitting diode array unit 1B and the center of the dot D8 at the end of the write range of the light emitting diode array unit 1C is larger than twice the reference gap P1. There is a gap equivalent to 3 or 4 dots between the two write ranges. In this case, image formation cannot be performed in the actual gap J, and a thick white line appears in an image formed on the photosensitive drum. If the actual gap J is even larger, defects such as line shift are caused.

In this example, the write range shift unit of the control unit (not shown) increases the number of light emitting diodes to emit light at the end of the seam portion of the write range of the light emitting diode array unit 1C by 3, for instance, so that the write range of the light emitting diode array unit 1B shifts toward the light emitting diode array unit 1C by 3 dots. Accordingly, the actual gap J becomes smaller than twice the reference gap P1. The above process of shifting the range of light emitting diodes to emit light is performed by the write range shift unit.

Case II-2

Figure 32:
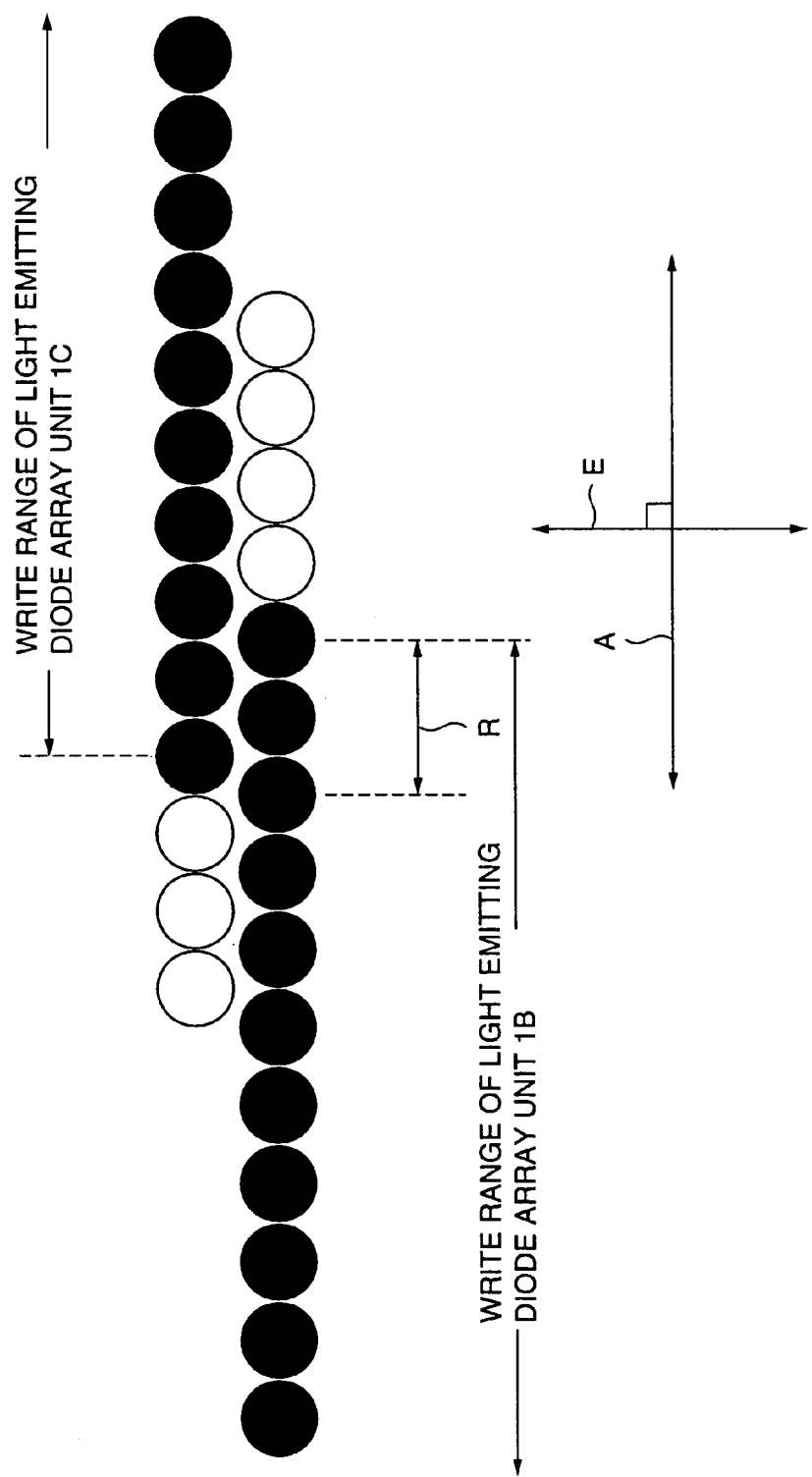
FIG. 32 is an enlarged view of another example dot arrangement on the photosensitive member corresponding to the seam between the light emitting diode array units of FIG. 5.

As shown in FIG. 32, on the other hand, the write ranges of the light emitting diode array units 1B and 1C overlap with each other in a range R by a length equivalent to 2 or 3 dots. In this case, two different parts of an image on the photosensitive drum 10 overlap with each other in a range corresponding to the range R, resulting in a thick black line. If the overlapping portion is even larger, defects such as line shift will occur.

To avoid that, the write range shift unit provided to the control unit (not shown) reduces the number of light emitting diodes to emit light at the end of the light emitting diode array unit 1B by a length equivalent to 3 dots, for instance, so that the write range of the light emitting diode array unit 1B shifts from the light emitting diode array unit 1C by 3 dots.

3. Case III

After the shifting operation by the write range shift unit of Case II, there might be a phase shift between the light emitting diodes of the light emitting diode array units. Also, there might be a remaining deviation due to an error in the manufacturing process.

If there is a difference between the reference gap of the light emitting diodes and the actual gap between the light emitting diodes located at the ends of the write ranges of two adjacent light emitting diodes array units connected at the seam portion, the write range shift unit reduces the difference by shifting the write range of at least one of the two adjacent light emitting diode array units by the light emitting diode. If there is still a remaining deviation after the shifting operation, the light emission amount correction unit adjusts the amount of light emitted from the light emitting diodes located at the end of at least one of the light emitting diodes array units connected at the seam portion, so that uneven exposure on the photosensitive member due to the remaining deviation can be prevented.

Accordingly, the control unit of this example comprises both the write range shift unit and the light emission amount correction unit.

Referring to Table 1 and FIG. 33, this example will be described below in greater detail.

Figure 33:
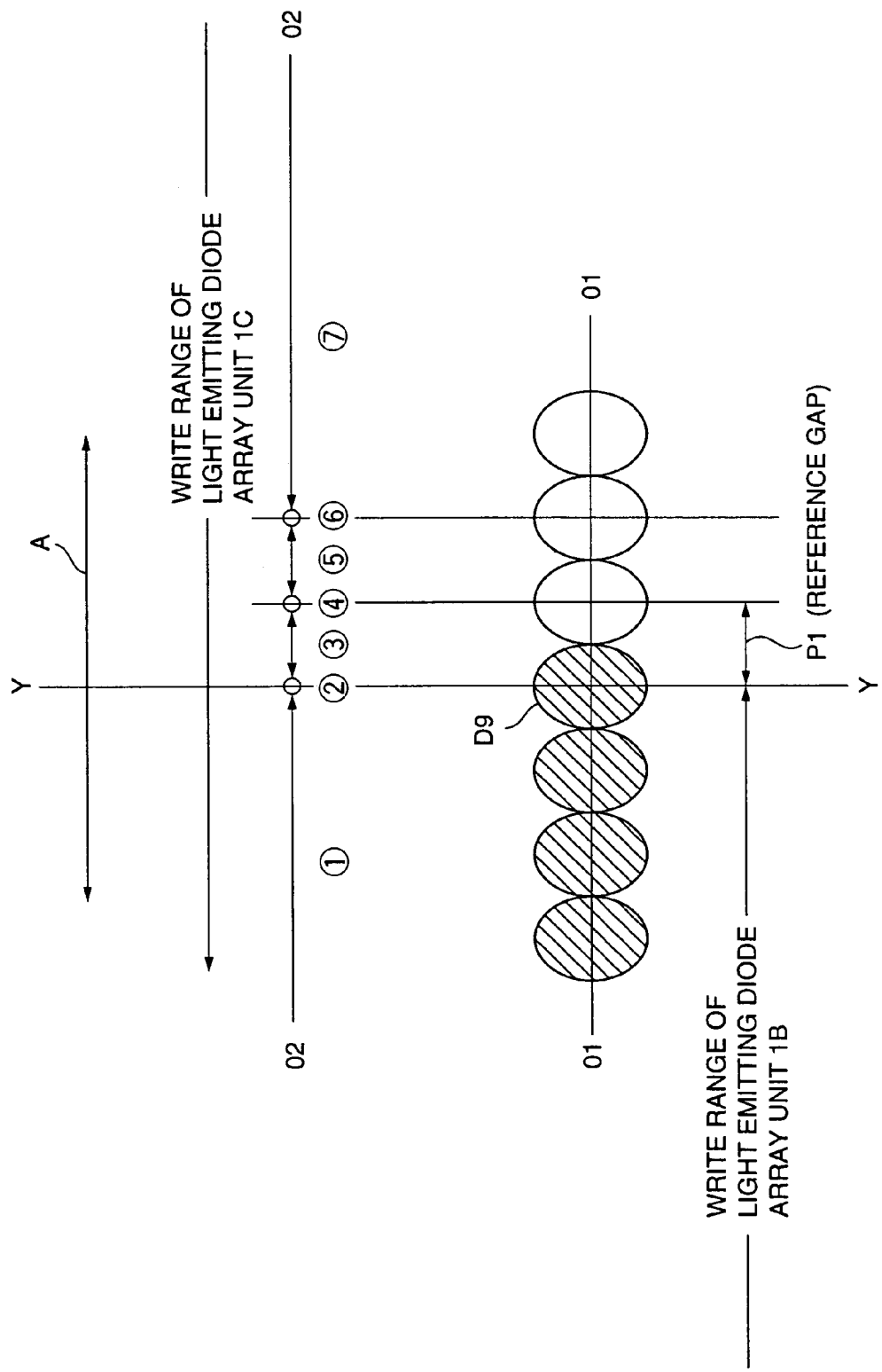
FIG. 33 is a schematic view of a dot arrangement on the photosensitive member corresponding to the seam between the light emitting diode array units of FIG. 5.

FIG. 33 is a schematic view of the dot arrangement of FIGS. 28, 31, and 32. In FIG. 33, shaded circles indicate the write range of the light emitting diode array unit 1B, and a number of dots are aligned on a scanning line O1—O1 in parallel with the aligning direction A of the light emitting diodes (i.e., the horizontal direction) at the pitch of the reference gap P1. A dot D9 is located at the end (the right end) of the write range on the side of the seam portion, and will not be shifted.

As for the light emitting diode array unit 1C, dots indicating the write range are not shown to avoid complexity of the drawing, and a possible write range is indicated by ① through ⑦ on a scanning line O2—O2 of the light emitting diode array unit 1C. This write range extends toward the right in FIG. 33.

A line Y—Y that passes through the center of the dot D9 and is perpendicular to the horizontal direction A corresponds to the seam portion, and the point where the line Y—Y and the scanning line O2—O2 cross is defined as a position ②. On the scanning line O2—O2, the region on the left side of the position ② is defined as a position ②. A point that is separated from the position ② to the right by the reference gap is defined as a point ④, and a point that is separated from the position ④ to the right by the reference gap is defined as a point ⑥. The region on the right side of the position ⑥ is defined as a position ⑦. The region between the positions ② and ④ is defined as a position ③, and the region between the positions ④ and ⑥ is defined as a position ⑤.

As for the light emitting diode array unit 1C, the end of the write range on the side of the seam portion is invariably the center of a dot. If the end of the write range is located at the position ④, the actual gap properly matches the reference gap, and no density unevenness occurs in an image formed on the photosensitive member. On the other hand, where the write ranges of the light emitting diode array units 1B and 1C overlap with each other, the center of the dot located at the end of the write range of the light emitting diode array unit 1B is situated in a region including the positions ① and ②.

Where the write ranges of the light emitting diode array units 1B and 1C are separated from each other, the center of the dot located at the end of the write range of the light emitting diode array unit 1B is situated in a region including the positions ③, ④, ⑤, ⑥, and ⑦.

TABLE 1

| CASE | CORRESPONDING CLAIM | TYPE OF CORRECTION | CURRENT STATE | TARGET CORRECTION RANGE BY A SHIFTING OPERATION | | CORRECTING OPERATION |
|---|---|---|---|---|---|---|
| I-1 | 27 | LIGHT EMISSION AMOUNT CORRECTION ONLY | WRITE RANGES: SEPARATED AND ACTUAL GAP > REFERENCE GAP | ⑤ | | * ONLY INCREASING THE AMOUNT OF LIGHT |
| I-2 | 28 | | WRITE RANGES: SEPARATED AND ACTUAL GAP < REFERENCE GAP | ③ | | * ONLY REDUCING THE AMOUNT OF LIGHT |
| II-1 | 30 | SHIFTING ONLY | WRITE RANGES: SEPARATED AND ACTUAL GAP ≧ REFERENCE GAP × 2 | ⑥ ~⑦ | WRITE RANGES: SEPARATED AND ACTUAL GAP < REFERENCE GAP × 2 | ③ ~⑤ SHIFTING *④ →UNCHANGED (ACCURATE) *③ ⑤ →UNCHANGED |
| II-2 | 31 | | WRITE RANGES: OVERLAPPING | ① ~② | WRITE RANGES: SEPARATED AND ACTUAL GAP < REFERENCE GAP × 2 | ③ ~⑤ SHIFTING *④ →UNCHANGED (ACCURATE) *③ ⑤ →UNCHANGED |
| III-1 | 33 | SHIFTING + LIGHT EMISSION AMOUNT CORRECTION | ACTUAL GAP > REFERENCE GAP AND WRITE RANGES: OVERLAPPING | ⑤ ~⑦ OR ① ~② | WRITE RANGES: SEPARATED AND ACTUAL GAP ≦ REFERENCE GAP | ③ ~④ *④ →UNCHANGED (ACCURATE) *③ →REDUCING THE AMOUNT OF LIGHT |
| III-2 | 34 | SHIFTING + LIGHT EMISSION AMOUNT CORRECTION | ACTUAL GAP ≧ REFERENCE GAP × 2 OR WRITE RANGES: OVERLAPPING OR ACTUAL GAP < REFERENCE GAP | ⑥ ~⑦ OR ① ~② OR ③ | REFERENCE GAP × 2 ≦ ACTUAL GAP > REFERENCE GAP | ⑤ ~⑥ *④ →UNCHANGED (ACCURATE) *③ ~⑥ →INCREASING THE AMOUNT OF LIGHT |
| III-3 | 35 | SHIFTING + LIGHT EMISSION AMOUNT CORRECTION | ACTUAL GAP ≧ REFERENCE GAP × 2 OR WRITE RANGES: OVERLAPPING | ① ~② OR ⑥ ~⑦ | WRITE RANGES: SEPARATED AND ACTUAL GAP < REFERENCE GAP × 2 | ③ ~⑤ SHIFTING *[ACTUAL GAP < REFERENCE GAP]→ REDUCING THE AMOUNT OF LIGHT *④ →UNCHANGED (ACCURATE) *[ACTUAL GAP > REFERENCE GAP]→ INCREASING THE AMOUNT OF LIGHT |

In Table 1, "current state" means the condition prior to the correction, and "target correction range" means the target range when the write range is shifted by the write range shift unit.

In Case I-1, the control unit comprising the light emission amount correction unit should be adequate to perform the correction. If the current state is that the write ranges are separated from each other in the horizontal direction and the end of the write range of the light emitting diode is situated in a region including the positions ⑤ through ⑦, i.e., if the actual gap is larger than the reference gap, the light emission amount correction unit increases the amount of light emitted from the light emitting diode corresponding to the end or the dot D9. In reality, the shift is restricted to the vicinity of the position ⑤, the image density can be properly controlled by increasing the amount of emitted light.

In Case I-2, the control unit comprising the light emission amount correction unit should be adequate to perform correction. If the current state is that the write ranges are separated from each other in the horizontal direction, and the end of the write range of the light emitting diode array unit 1C is located at the position ③, i.e., if the actual gap is smaller than the reference gap, the light emission amount correction unit reduces the amount of light emitted from the light emitting diode corresponding to the end of the write range. Thus, the image density can be made uniform by reducing the amount of emitted light.

In Case II-1, the control unit comprising the write range shift unit should be adequate to perform correction. If the current state is that the write ranges are separated from each other and the end of the write region is situated in a region including the positions ⑥ and ⑦, i.e., if the actual gap is equal to or larger than the reference gap×2, light emission amount correction is not enough to perform proper correction. Therefore, the write range shift unit shifts the light emitting range of the light emitting diode array unit 1C, with a region including the positions ③ through ⑤ being a target region. Thus, image density is made uniform.

The end of the write range of the light emitting diode array unit 1B is located at the position ④ after the shifting operation, if the correction operation is properly performed. Even if the end of the write range is located at the position ③ or ⑤, the unevenness in image density is still within an allowable range.

In the above case, even if the write ranges are separated from each other by a distance that cannot be corrected by the light emission amount correction, the simple shifting operation by the write range shift unit should be adequate to perform proper correction.

In Case II-2, the control unit comprising the write range shift unit should be adequate to perform proper correction. If the current state is that the end of the write range of the light emitting diode array unit 1C overlaps with the end of the write range of the light emitting diode array unit 1B, i.e., if the end of the write range of the light emitting diode array unit 1C is situated in a region including the positions ① and ②, light emission amount correction might not be enough to perform proper correction. Therefore, the write range shift unit shifts the light emitting range of the light emitting diodes of the light emitting diode array unit 1C, with the range including the positions ③ through ⑤ being a target range, so that the write ranges are separated from each other, and that the actual gap is smaller than twice the reference gap. In the region including the positions ③ through ⑤, the unevenness in image density will be within an allowable range.

The end of the write range of the light emitting diode array unit 1C is located at the position ④ after the shifting operation, if the correction operation is properly performed. Even if the end of the write range is located at the position ③ or ⑤, the unevenness in image density is still within an allowable range.

In the above case, even if the write ranges are separated from each other by a distance that cannot be corrected by the light emission amount correction, the simple shifting operation by the write range shift unit should be adequate to complete proper correction.

However, there are cases where neither the light emission amount correction unit nor the write range shift unit is enough to perform proper correction. In view of this, if there is a remaining deviation after a shifting operation by the write range shift unit, the light emission amount correction unit performs light emission amount correction in this example.

In Case III-1, the control unit comprises both the write range shift unit and the light emission amount correction unit. In the current state, the end of the write rage of the light emitting diode array unit 1C overlaps with the end of the write range of the light emitting diode array unit 1B, or the actual gap is larger than the reference gap. More specifically, when the end of the write range of the light emitting diode array unit 1C is situated in a region including the positions ⑤ through ⑦, or the end of the write range of the light emitting diode array unit 1C is situated in a region including the positions ① and ②, the write range shift unit shifts the light emitting region of the light emitting diodes of the light emitting diode array unit 1C, with the region including the positions ③ and ④ being a target region, so that the write ranges are separated from each other in the horizontal direction and the actual gap becomes smaller than twice the reference gap.

The end of the write range of the light emitting diode array unit 1C is located at the position ④ after the shifting operation, if the correction operation is properly performed. Even if the end of the write range is located at the position ③ after the shifting operation by the write range shift unit, the light emission amount correction unit increases the amount of light emitted from the light emitting diode corresponding to the end of the light emitting diode array unit 1C, so that the image density becomes uniform.

In Case III-2, the control unit also comprises both the write range shift unit and the light emission amount correction unit. In the current state in this case, the actual gap is equal to or larger than twice the reference gap, the end of the write range of the light emitting diode array unit 1C overlaps with the end of the write range of the light emitting diode array unit 1B, or the actual gap is smaller than the reference gap. More specifically, when the end of the light emitting diode array unit 1B is situated in a region including the positions ⑥ and ⑦, a region including the positions ① and ②, or at the position ③, the write range shift unit performs a shifting operation so that the end of the write range of the light emitting diode array unit 1C is situated in a region including the positions ⑤ and ⑥, where the following relationship is satisfied: the reference gap×2≧the actual gap>the reference gap.

If the end of the write range of the light emitting diode array unit 1C is located at the position ④ after the above shifting operation, no further correction is necessary. Even if the end of the write range is located at the position ⑤ or ⑥, the light emission amount correction unit increases the amount of light emitted from the light emitting diodes corresponding to the end of the write range of the light emitting diode array unit 1C, so that the image density becomes uniform.

In Case III-3, the control unit also comprises both the write range shift unit and the light emission amount correction unit. In the current state in this case, the write range of the light emitting diode array unit 1C overlaps with the write range of the light emitting diode array unit 1B, or the actual gap is equal to or larger than twice the reference gap. More specifically, when the end of the write range of the light emitting diode array unit 1C is situated in a region including the positions ① and ②, or the end of the write range of the light emitting diode array unit 1B is situated in a region including the positions ⑥ and ⑦, the write range shift unit shifts the light emitting range of the light emitting diodes of the light emitting diode array unit 1C, with the region including the positions ③ through ⑤ being a target range, so that the write ranges are separated from each other in the horizontal direction, and that the actual gap becomes smaller than twice the reference gap.

If the end of the write range of the light emitting diode array unit 1C is located at the position ④ after the shifting operation by the write range shift unit, no further correction is necessary. If the end of the write range of the light emitting diode array unit 1B is located at the position ③, i.e., if the actual gap is smaller than the reference gap, the light emission amount correction unit reduces the amount of light emitted from the light emitting diode corresponding to the end of the write range of the light emitting diode array unit 1C, so that the image density becomes uniform. On the other hand, if the end of the write range of the light emitting diode array unit 1C is located at the position ⑤, i.e., if the actual gap is larger than the reference gap, the light emission amount correction unit increases the amount of light emitted from the light emitting diode corresponding to the end of the write range of the light emitting diode array unit 1C.

If the light emission amount correction unit only has a function to increase light amount in Case I-1, the write ranges should be separated from each other, and the actual gap should be larger than the reference gap, so as to perform desired correction, as shown in the "current state" column in the Table 1.

If the light emission amount correction unit only has a function to reduce light amount in Case I-2, the write ranges should be separated from each other, and the actual gap should be smaller than the reference gap, so as to perform desired correction, as shown in the "current state" column in Table 1. Furthermore, the correction by reducing the amount of emitted light is easier than the correction by increasing the amount of emitted light. In Case II-1 and Case II-2, the correction can be performed only by a shifting operation.

Since there is no need to employ a light emission amount correction unit, the entire structure is made simpler, and the correction can be more easily carried out.

In Case II, the optical write apparatus comprises both the light emission amount correction unit and the write range shift unit. After the manufacture, it is possible to perform flexible correction to correct various errors in the optical write apparatus in practical use.

If there is a shift from the actual gap in the write ranges of the light emitting diode array units connected at the seam portion, adjusting the light emitting state of the light emitting diodes located at the seam portion of the light emitting diode array units is performed so as to even the amount of exposure light on the photosensitive member in the horizontal direction at the seam portion of the light emitting diode array units. The write range of at least one of the light emitting diode array units is shifted by the light emitting diode to narrow the shift. If there is a remaining deviation after the shifting operation, the amount of light emitted from the light emitting diode located at the end of the write range of at least one of the light emitting diode array units connected at the seam portion is adjusted so that the unevenness of the amount of exposure light due to the remaining deviation can be eliminated. By this 2-step correction consisting of the shifting operation and the light emission adjusting operation, the amount of exposure light on the photosensitive member in the horizontal direction at the seam portion between the light emitting diode array units can be made uniform, thereby achieving high-precision correction.

In Case III-1 and Case III-2, the optical write apparatus comprises both the write range shift unit and the light emission amount correction unit. In Case III-1, even a large gap can be accurately corrected by the 2-step correction, because a remaining deviation is corrected by the light emission reducing function of the light emission amount correction unit. If the current state is that both write ranges overlap with each other and the actual gap is larger than the reference gap, a shifting operation is performed so that both write ranges are separated from each other and that the actual gap becomes equal to or smaller than the reference gap. If there is a remaining deviation after the shifting operation, the amount of light emitted from the light emitting diode located at the end of at least one of the adjacent light emitting diode array units is reduced by the light emission amount correction unit, so as to eliminate the unevenness of the amount of exposure light caused by the remaining deviation. In this manner, the target correction range can be shifted to a position in which the light emission reducing operation can be effectively performed. Thus, high-precision correction can be performed. Also, the light emission amount correction can be easily performed, because reducing the amount of light emitted from the light emitting diodes is easier than increasing it.

In Case III-2, if there is a remaining deviation after the shifting operation, the remaining deviation is corrected by the light emission increasing function of the light emitting amount correction unit. By this 2-step correction, even a large deviation can be corrected at high accuracy.

In Case III-3, the optical write apparatus comprises both the write range shift unit and the light emission amount correction unit, and the light emission amount correction unit has the light emission reducing and increasing functions. Even a large deviation can be turned into a correctable deviation within a target range, and the light emission amount correction is then performed at high accuracy.

In the above operation to shift the write ranges, the write range of at least one of the light emitting diode array units connected at the seam portion may be shifted, or the write ranges of both light emitting diode array units may be shifted. In practice, however, shifting the write range of one of the light emitting diode array units is sufficient to perform proper correction, and is easier than shifting the write ranges of both light emitting diode array units. Thus, the control system can be made simpler.

In Case I and Case III, the amount of light emitted from the light emitting diodes corresponding to the end of the write ranges on the side of the seam portion may be adjusted by increasing or decreasing the light emitting power of the light emitting diodes, or by prolonging or shortening the light emitting time.

However, to increase or decrease the light emitting power of the light emitting diodes, it is necessary to employ special light emitting diodes that are capable of varying their light emitting power. Still, a time loss can be avoided. On the other hand, prolonging or shortening the light emitting time causes a time loss. In that case, however, it is not necessary to employ special light emitting diodes that are capable of varying their light emitting power. Accordingly, normal light emitting diodes can be employed, but there is still a time loss due to the control of the light emitting time.

[5] Fifth Embodiment

Figure 34:
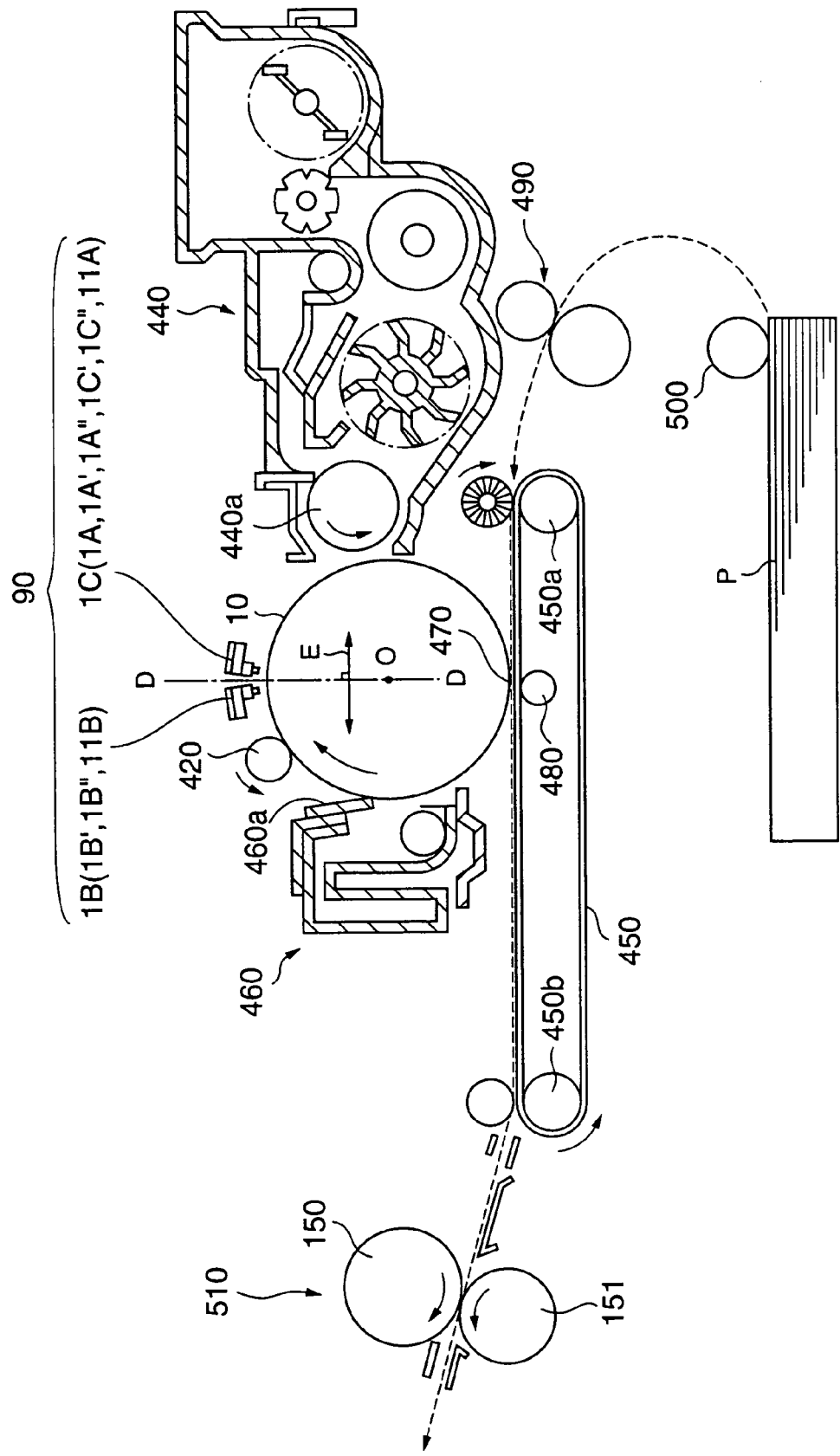
FIG. 34 is a schematic front view of an image forming apparatus equipped with an optical write apparatus of the present invention.

The optical write apparatus including the light emitting diode array units of any of the above embodiments can be applied to an optical write apparatus in a digital image forming apparatus shown in FIG. 34.

In FIG. 34, the photosensitive drum 10 having a photosensitive material around its surface is surrounded by the following (clockwise): a charging member 420 constituted by a charging roller; light emitting diode array units 1B (1B', 1B", 11B) and 1C (1A, 1A7, 1A", 1C', 1C", 11A) that constitute the optical write apparatus 90; a developing unit 440 provided with a developing roller 440a; a transportation belt 450 that holds and transports transfer paper as a recording medium P; and a cleaning unit 460 provided with a blade 460a that slidably moves on the surface of the photosensitive drum 10. On the photosensitive drum 10, the exposure light from the optical write apparatus 90 scans the region between the charging member 420 and the developing roller 440a.

The transportation belt 450 has no ends and is supported by two supporting rollers 450a and 450b. The lower surface of the photosensitive drum 10 is in contact with the transportation belt 450 supported by the supporting rollers 450a and 450b. The contact portion between the photosensitive drum 10 and the transportation belt 450 is a transfer point 470. A transfer roller 480 as a transfer unit for applying transfer bias is attached to the reverse surface of the transportation belt 450 at the transfer point 470.

The transportation belt 450 is driven to move counterclockwise, as indicated by an arrow in FIG. 34. A pair of resist rollers 490 are placed in an upstream position in the transfer medium transportation path. The recording medium P stored in a sheet feeder tray (not shown) is guided by a transportation guide (not shown) and is transported from a roller 500 toward the resist rollers 490. In a downstream position in the recording medium transportation path, a fixing unit 510 is placed.

A brush roller 2000 is employed as a suction member in contact with the transportation belt 450 and is placed above the supporting roller 450*a* supporting the transportation belt 450. The brush roller 2000 is rotatable clockwise.

As the brush roller 2000 rotates, the brush slides on the transportation belt 450. An electric potential is supplied to the brush roller 2000 by a bias application unit (not shown) so as to apply a polar bias current for attracting the recording medium P toward the transportation belt 450.

Image formation is performed in the image forming apparatus in the following manner.

As the photosensitive drum 10 starts rotating, the photosensitive material is uniformly charged by the charging member 420. The optical write apparatus then irradiates the photosensitive material so as to form a latent image corresponding to an image to be reproduced. As the photosensitive drum 10 further rotates, the latent image is transported to the developing unit 440, and is turned into a visible image by the addition of toner. Thus, a toner image is produced by the developing unit 440.

Meanwhile, the roller 500 starts feeding the recording medium P on the sheet feeder tray. After passing through the transportation path indicated by a broken line in FIG. 34, the recording medium P is temporarily stopped at the pair of resist rollers 490, so that it meets the toner image on the photosensitive drum 10 at the transfer point 470. When the timing is right, the recording medium P is transported from the resist rollers 490.

The recording medium P transported from the resist rollers 490 is then caught between the transportation belt 450 and the brush roller 2000, and sticks to the transportation belt 450 because of the static electricity caused by the bias and the elasticity of the transfer roller 480. As the transportation belt 450 moves, the recording medium P is transported to the transfer point 470.

The toner image on the photosensitive drum 10 and the recording medium P meet at the transfer point 470, where the toner image is transferred onto the recording medium P by virtue of an electric field created by the potential difference between the bias applied to the transportation belt 450 by the transfer roller 480 and the photosensitive material.

The recording medium P carrying the toner image is further transported by the transportation belt 450, and is removed from the transportation belt 450 at a downstream point in the transportation path. The removed recording medium P is then sent to the fixing unit 510. As the recording medium P passes through the fixing unit 510, the toner image on the recording medium P is fixed to the recording medium P, which is then discharged to a sheet discharging unit (not shown).

Meanwhile, as the photosensitive drum 10 further rotates, residual toner that has not been transferred at the transfer point 470 and remains on the photosensitive material reaches the cleaning unit 460. While passing through the cleaning unit 460, the surface of the photosensitive material is cleaned for next image formation.

In accordance with the present invention, an optical write apparatus comprising light emitting diode array units having a light source unit consisting of a plurality of short substrates can be applied to the above image forming apparatus. The optical write apparatus of the present invention is smaller than other optical write apparatuses, and is capable of forming wider images than other optical write apparatus. Accordingly, despite the smallness in size, the optical write apparatus of the present invention forms wider images.

It should be understood that the optical write apparatus of the present invention is not limited to the image forming apparatus having the above structure, but it can be also applied to copying machines, printers, facsimile machines, microfilm reader printers, and so on.

The effects of the present invention can be summarized as follows.

In the present invention, the substrates each having light emitting diodes aligned in one direction are fixed to each other directly or via connecting members. Thus, the small-length substrates can be integrated to function as one substrate.

According to the present invention, even if other components exist between the substrates, the substrates function properly as one substrate, and adverse influence from thermal expansion and thermal contraction can be avoided.

According to the present invention, the substrates are reinforced and connected by auxiliary members.

According to the present invention, even if the ambient temperature varies or the light emitting diodes generate heat, the substrates adjacent to one another can function properly as one substrate.

According to the present invention, even if the optical write apparatus is large in size comprising more than three light emitting diode array units arranged in the aligning direction of the light emitting diodes, the relative positions of the write dot switching points between the adjacent light emitting diode array units does not change in the aligning direction of the light emitting diodes. Thus, images having no black and white lines can be obtained.

According to the present invention, since the substrates are fixed even in the presence of the auxiliary members, the substrates are not bent due to the linear expansion coefficient difference between the substrates and the housings. Accordingly, excellent images can be obtained, and the substrates do not need to be reinforced to overcome the linear expansion coefficient difference between the substrates and the housings. Furthermore, since no connecting members are employed, the substrates can be more easily and steadily integrated.

According to the present invention, the relative positions of the write dot switching points on the substrates of the light emitting diode array units do not change in the aligning direction. Thus, excellent images having no black and white lines can be obtained.

According to the present invention, the relative positions of the write dot switching points of the adjacent light emitting diode array units can be adjusted as desired. Even if the optical write apparatus is large in size having a plurality of light emitting diode array units arranged in the aligning direction of the light emitting diodes, the optical write apparatus can maintain high accuracy.

According to the present invention, an array position adjusting unit can be easily constituted by adjusting screws. The relative positions of the respective write dot switching points of the adjacent light emitting diode array units can be finely adjusted by simply tightening or loosening the adjusting screws.

According to the present invention, one of substrates adjacent to each other in the aligning direction of the light emitting diodes is displaced from the other one of the adjacent substrates, thereby easily performing a focusing operation. Also, a focusing operation can be easily performed by simply adjusting a first external force unit. Furthermore, the adjustment sensitivity of the first external force unit can be increased.

According to the present invention, adjacent substrates can be adjusted in a focusing direction independently of each other, thereby simplifying the focusing operation.

According to the present invention, the write dot distance on the photosensitive member corresponding to the distance between substrates can be accurately adjusted in accordance with a predetermined delay time.

According to the present invention, a vertical direction adjustment unit utilizes leverage, and thus fine adjustment can be carried out.

According to the present invention, the write positions in the vertical direction of substrate adjacent to each other in the aligning direction of the light emitting diodes can be adjusted independently of each other, thereby simplifying the adjusting operation.

According to the present invention, the light emitting diode array units having substrates can be focused, and the write positions in the vertical direction can also be adjusted. Thus, the adjusting operation can be simplified.

According to the present invention, a focusing operation and a write position adjusting operation in the vertical direction can be performed for one of substrates adjacent to each other in the aligning direction of the light emitting diodes, thereby simplifying the adjusting operation. Also, with a screw structure utilizing leverage, the focusing operation and the write position adjusting operation in the vertical direction can be easily performed from one side, thereby further simplifying the entire adjusting operation.

According to the present invention, the focusing operation and the write position adjusting operation in the vertical direction can be performed separately for each of substrates adjacent to each other in the aligning direction of the light emitting diodes. Thus, a higher degree of freedom is allowed in adjustment, and the entire adjusting operation can be further simplified.

According to the present invention, a decrease in write accuracy due to thermal expansion or thermal contraction of the substrates, the auxiliary members, the focusing unit, and the vertical direction adjusting unit, can be prevented.

According to the present invention, the substrates, the auxiliary members, the focusing unit, and the vertical direction adjusting unit, can be steadily fixed to the common supporting member by the auxiliary supporting units, thereby steadying the write accuracy.

According to the present invention, the auxiliary supporting units movably support the substrates and the auxiliary members in the aligning direction of the light emitting diodes, so as to prevent a decrease in write accuracy due to deformation caused by thermal expansion or thermal contraction. Also, the write positions in the vertical direction can be adjusted by the vertical direction adjusting unit.

According to the present invention, the attachment units, which adjust both ends of the common supporting member in the focusing direction, simplify the focusing operation and the write position adjusting operation in the vertical direction for all the substrates adjacent to each other in the aligning direction of the light emitting diodes.

According to the present invention, the focusing operation and the vertical-direction write position adjusting operation involving fine adjustment can be carried out by a screw unit.

According to the present invention, black and white lines and line shift can be prevented by employing the light emission amount correction unit, without positioning the light emitting diode array unit in the horizontal direction of the photosensitive member at high accuracy, or without employing a costly mechanism for adjusting a dot pitch error of the light emitting diode at each seam portion between the light emitting diode array units.

According to the present invention, sufficient correction effects can be achieved by simply adjusting the amount of light emitted from the light emitting diodes of at least one of two light emitting diode array units connected at the seam portion, without adjusting the amount of light emitted from the other one of the connected light emitting diode array units.

According to the present invention, write lines in an image can be avoided by simply increasing the amount of light emitted from at least one of the two adjacent light emitting diode array units.

According to the present invention, black lines in an image can be eliminated by simply reducing the amount of light emitted from the light emitting diodes of at least one of the two adjacent light emitting diode array units.

According to the present invention, correction can be performed only by performing a shifting operation, without employing a light emission amount correction unit. Thus, the entire structure can be made simpler.

According to the present invention, even if two write ranges are separated from each other by a distance that cannot be corrected by light emission correction, the simple write range shift unit can correct the distance by a shifting operation.

According to the present invention, even if the two write ranges overlap with each other and the overlapping cannot be corrected by light emission correction, the write range shift unit can correct the overlapping by a simple shifting operation.

According to the present invention, the optical write apparatus comprises the light emission amount correction unit and the write range shift unit. When the optical write apparatus is actually used after the manufacture, correction can be flexibly performed in accordance with the condition of the apparatus.

According to the present invention, since the optical write apparatus comprises both the write range shift unit and the light emission amount correction unit, 2-step correction can be performed to correct a remaining deviation by the light emission reducing function of the light emission amount correction unit. Thus, even a large deviation can be accurately corrected.

According to the present invention, since the optical write apparatus comprises both the write range shift unit and the light emission amount correction unit, 2-step correction can be performed to correct a remaining deviation by the light emission increasing function of the light emission amount correction unit. Thus, even a large deviation can be accurately corrected.

According to the present invention, the optical write apparatus comprises both the write range shift unit and the light emission amount correction unit, and the light emission amount correction unit has the light emission reducing and increasing functions. Thus, even a large deviation can be turned into an allowable deviation, and high-precision correction can be performed by the following light emission amount correction.

According to the present invention, a time loss can be prevented, because the light emitting time is not increased or reduced in the present invention.

According to the present invention, the light emitting power of the light emitting diodes is not adjusted in the present invention. Thus, there is no need to employ high-performance light emitting diodes, and the correction can be easily performed with regular light emitting diodes.

According to the present invention, the optical write apparatus comprises light emitting diode array units having short substrates that substantially constitute one substrate as a light source unit. Thus, a wide image can be obtained with the compact apparatus.

According to the present invention, the optical write apparatus comprising light emitting diodes array unit provided with short substrates that substantially constitute one substrate as a light source unit is mounted to an image forming apparatus. The optical write apparatus can be positioned in the focusing direction.

According to the present invention, the write position adjustment both in the focusing direction and the vertical direction can be easily performed for all the substrates adjacent to one another in the aligning direction of the light emitting diodes.

According to the present invention, high-precision 2-step correction consisting of a shifting operation and a light emission amount changing operation can be performed so as to even the amount of exposure light in the horizontal direction of the photosensitive member at each seam portion between the light emitting diode array units.

According to the present invention, high-precision correction can be easily performed, because reducing the amount of light emitted from the light emitting diodes is easier than increasing.

What is claimed is:

1. An optical write apparatus comprising:
    a plurality of substrates each having a number of light emitting diodes aligned in one direction, the plurality of substrates being shifted from each other in the aligning direction of the light emitting diodes to overlap in a direction disposed at an angle to the aligning direction of the light emitting diodes,
    wherein two substrates adjacent to each other in the aligning direction of the light emitting diodes are directly fixed to each other.

2. The optical write apparatus as claimed in claim 1, wherein the plurality of substrates at least partly overlap in the direction about perpendicular to the aligning direction of the light emitting diodes.

3. An optical write apparatus comprising:
    a plurality of substrates each having a large number of light emitting diodes aligned in one direction, the plurality of substrates being shifted from each other in the aligning direction of the light emitting diodes; and
    auxiliary members interposed between the substrate adjacent in the aligning direction of the light emitting diodes,
    wherein fixed points between the auxiliary members and the substrates are aligned in a line that is perpendicular to the aligning direction of the light emitting diodes.

4. The optical write apparatus as claimed in claim 3, wherein the auxiliary members, together with the substrates, constitute a plurality of light emitting diode array units, and include holding members for holding the substrates and a connecting member for connecting the substrates.

5. The optical write apparatus as claimed in claim 4, wherein:
    the plurality of light emitting diode array units are shifted from each other in the aligning direction of the light emitting diodes, the adjacent light emitting diode array units being connected via the connecting member; and
    fixed points for fixing the substrate of one of the adjacent light emitting diode array units to the corresponding holding member and for fixing the holding member to the connecting member, and fixed points for fixing the substrate of the other one of the adjacent light emitting diode array units to the corresponding holding member and for fixing the holding member to the connecting member are aligned in a line that is perpendicular to the aligning direction of the light emitting diodes.

6. The optical write apparatus as claimed in claim 5, comprising three or more light emitting diode array units, wherein:
    both ends of a center light emitting diode array unit of any three adjacent light emitting diode array units are fixed to the two end light emitting diode array units in the aligning direction of the light emitting diodes;
    the fixed points for fixing the substrate to the holding member and for fixing the holding member to the connecting member in the center light emitting diode array unit and one of the two end light emitting diode array units are aligned in a line that is perpendicular to the aligning direction of the light emitting diodes; and
    the fixed points in the center light emitting diode array unit and the other one of the two end light emitting diode array units are also aligned in a line that is perpendicular to the aligning direction of the light emitting diodes.

7. The optical write apparatus as claimed in claim 4, wherein:
    a part of each of the substrates protrudes from each corresponding holding member;
    the protruding part of each of the substrates is fixed to the protruding part of the adjacent substrate; and
    the fixed points between the connecting member and the holding members are replaced by fixed points for fixing the protruding parts of the adjacent substrates to each other.

8. The optical write apparatus as claimed in claim 3, further comprising:
    a focusing unit that displaces one of the two substrates, which are adjacent to each other in the aligning direction of the light emitting diodes, in the thickness direction of the displaced one of the two adjacent substrates; and
    a vertical direction adjusting unit that moves the one of the two adjacent substrates so as to adjust light emitted from the moved substrate in a vertical direction in which the light emitted from the moved substrate moves toward and away from light emitted from the other one of the two adjacent substrates.

9. The optical write apparatus as claimed in claim 8, wherein:
    the focusing adjusting unit comprises a plate-like connecting member fixed to the two substrates adjacent to each other in the aligning direction of the light emitting diodes, an adjusting plate fixed to a fixed member and the connecting member at a fixed position on the side of the displaced and moved substrate, and a third external force unit that narrows and widens a gap between the connecting member and the adjusting plate on the side of the other one of the two adjacent substrates; and
    the vertical direction adjusting unit comprises a fourth external force unit that narrows and widens the gap between the connecting member and the adjusting plate by applying an external force to the end portion of the connecting member on the side of the other one of the two adjacent substrates, with a part of the third external force unit being a supporting point.

10. The optical write apparatus as claimed in claim 8, wherein the focusing unit and the vertical direction adjusting unit are disposed on each of left and right ends of a light emitting diode array unit, with a line passing through the center point between the two adjacent substrates being a symmetrical axis.

11. The optical write apparatus as claimed in claim 8, wherein:
    the auxiliary member is movably attached to the substrates;
    the focusing unit, the vertical direction adjusting unit, the substrates, and the auxiliary member constitute an integrated structure; and
    one of the components of the integrated structure is fixed as a third adjusting plate to common supporting member employed as the fixed member.

12. The optical write apparatus as claimed in claim 11, wherein the substrates and the auxiliary member are fixed to the, common supporting member by an auxiliary supporting unit at a given location on the alignment of the light emitting diodes.

13. The optical write apparatus as claimed in claim 12, wherein the auxiliary supporting unit supports the substrates and the auxiliary member, so that the substrates and the auxiliary member are movable in the aligning direction of the light emitting diodes, and that the positions of the substrates and the auxiliary member can be adjusted in the vertical direction and the focusing direction.

14. The optical write apparatus as claimed in claim 11, wherein the common supporting member includes attachment units that attach the common supporting member to an attaching member and adjusts the common supporting member in the focusing direction, the attachment units disposed on either end thereof in the aligning direction of the light emitting diodes.

15. An optical write apparatus comprising:
    a plurality of substrates each having a number of light emitting diodes aligned in one direction, the plurality of substrates being shifted from each other in the aligning direction of the light emitting diodes to overlap in a direction disposed at an angle to the aligning direction of the light emitting diodes,
    wherein two substrates adjacent to each other in the aligning direction of the light emitting diodes are fixed to each other, and
    wherein one or more fixed points between the substrates adjacent to each other in the aligning direction of the light emitting diodes correspond to write dot switching points on the substrates.

16. An optical write apparatus comprising:
    a plurality of substrates each having a large number of light emitting diodes aligned in one direction, the plurality of substrates being shifted from each other in the aligning direction of the light emitting diodes, wherein two substrates adjacent to each other in the aligning direction of the light emitting diodes are directly fixed to each other; and
    an array position adjusting unit that adjusts relative positions of the substrates adjacent to each other in the aligning direction of the light emitting diodes.

17. An optical write apparatus comprising:
    a plurality of substrates each having a large number of light emitting diodes aligned in one direction, the plurality of substrates being shifted from each other in the aligning direction of the light emitting diodes, wherein two substrates adjacent to each other in the aligning direction of the light emitting diodes are fixed to each other; and
    an array position adjusting unit that adjusts relative positions of the substrates adjacent to each other in the aligning direction of the light emitting diodes, wherein:
    the array position adjusting unit connects a pair of connecting members adjacent to each other in the aligning direction of the light emitting diodes via an adjusting screw;
    one of the pair of connecting members is fixed to one of the adjacent substrate and the adjacent light emitting diode array unit; and
    the other one of the pair of connecting members is fixed to the other one of the adjacent substrate and the adjacent light emitting diode array unit.

18. An optical write apparatus comprising:
    a plurality of substrates each having a large number of light emitting diodes aligned in one direction, the plurality of substrates being shifted from each other in the aligning direction of the light emitting diodes, wherein two substrates adjacent to each other in the aligning direction of the light emitting diodes are fixed to each other; and
    a focusing unit that displaces a first substrate of two adjacent substrates with respect to a second substrate of the two adjacent substrates in a focusing direction that is equivalent to a thickness direction of the second substrate.

19. The optical write apparatus as claimed in claim 18, wherein the focusing unit comprises:
    a plate-like connecting member respectively fixed to the two adjacent substrates;
    an adjusting plate that faces the connecting member, and is fixed to the connecting member on the side of the second substrate and to a fixed member; and
    a first external force unit that supplies an external force to the connecting member by varying a gap between the connecting member and the adjusting plate on the side of the first substrate, and
    the external force supplied by the first external force unit deforms and displaces with respect to a fixed point between the connecting member and the adjusting plate, so that the second substrate is moved with respect to the first substrate in the focusing direction to focus the light emitted from the light emitting diodes aligned on the second substrate.

20. The optical write apparatus as claimed in claim 19, wherein a point where the external force is supplied by the first external force unit on the connecting member is located at a position that faces the second substrate.

21. The optical write apparatus as claimed in claim 19, wherein the first external unit is constituted by a screw unit disposed between the connecting member and the adjusting plate.

22. The optical write apparatus as claimed in claim 18, wherein the focusing unit is disposed at each of left and right ends of a light emitting diode array unit, with a line passing through the center point between the first substrate and the second substrate being a symmetrical axis.

23. An optical write apparatus comprising:
    a plurality of substrates each having a large number of light emitting diodes aligned in one direction, the plurality of substrates being shifted from each other in the aligning direction of the light emitting diodes, wherein two substrates adjacent to each other in the aligning direction of the light emitting diodes are fixed to each other; and
    a vertical direction adjusting unit that moves one of the two substrates adjacent to each other in the aligning direction of the light emitting diodes with respect to the other one of the two adjacent substrates, so that light emitted from the light emitting diodes on the moved substrate is adjusted in a vertical direction in which the light emitted from the light emitting diodes on the moved substrate moves toward and away from light emitted from the light emitting diodes on the other substrate.

24. The optical write apparatus as claimed in claim 23, wherein the vertical direction adjusting unit comprises:
a plate-like connecting member fixed to the two substrates adjacent to each other in the aligning direction of the light emitting diodes;
an adjusting plate fixed to a fixed member and to the connecting member at a fixed position of the other one of the two adjacent substrates to the connecting member;
a second external force unit that narrows and widens a gap between the connecting member and the adjusting plate; and
a supporting member that is in contact with the connecting member and the adjusting plate at a mid point between the fixed position and the second external force unit.

25. The optical write apparatus as claimed in claim 23, wherein the vertical direction adjusting unit is disposed at each of left and right ends of the other one of the two adjacent substrates, with a line passing through the center point between the two adjacent substrates being a symmetrical axis.

26. An image forming apparatus comprising:
a photosensitive member that is uniformly charged; and
an optical write apparatus that irradiates the photosensitive member so as to form a latent image to be turned into a visible image,
wherein:
the optical write apparatus comprises a plurality of substrates each having a great number of light emitting diodes aligned in one direction, the plurality of substrates being shifted from one another in the aligning direction of the light emitting diodes, and, among the plurality of substrates, every two substrates adjacent to each other in the aligning direction of the light emitting diode being directly fixed to each other.

27. A method of positioning an optical write apparatus to be attached to an image forming apparatus, the optical write apparatus comprising a plurality of substrates each having a great number of light emitting diodes aligned in one direction, the substrates being shifted from one another in a horizontal direction, the method comprising the steps of:
displacing the optical write apparatus from an image forming apparatus, so that one of two substrates adjacent to each other in the horizontal direction is positioned in a focusing direction that corresponds to the thickness direction of the substrate; and
displacing the other one of the adjacent substrates from the optical write apparatus, so that the other one of the adjacent substrates is positioned in the focusing direction that corresponds to the thickness direction of the substrate.

28. The method as claimed in claim 27, further including the step of after positioning the other one of the adjacent substrates in the focusing direction, moving the other one of the adjacent substrates while steadying the one of the adjacent substrates, so that light emitted from the light emitting diodes on the other one of the adjacent substrates moves in a vertical direction toward or away from light emitted from the light emitting diodes on the one of the adjacent substrates.

29. An optical write apparatus comprising:
a plurality of substrates each having a number of light emitting diodes aligned in one direction, the plurality of substrates being shifted from each other in the aligning direction of the light emitting diodes to overlap in a direction disposed at an angle to the aligning direction of the light emitting diodes, and
an auxiliary member interposed between only two substrates,
wherein two substrates adjacent to each other in the aligning direction of the light emitting diodes are fixed to each other, and connected by the auxiliary member.

30. An optical write apparatus comprising:
a plurality of substrates each having a large number of light emitting diodes aligned in one direction, the plurality of substrates being shifted from each other in the aligning direction of the light emitting diodes;
an auxiliary member interposed between only two substrates, wherein the two substrates adjacent to each other in the aligning direction of the light emitting diodes are fixed to each other, and connected by the auxiliary member; and
an array position adjusting unit that adjusts relative positions of the substrates adjacent to each other in the aligning direction of the light emitting diodes.

31. An image forming apparatus comprising:
a photosensitive member that is uniformly charged; and
an optical write apparatus that irradiates the photosensitive member so as to form a latent image to be turned into a visible image,
wherein:
the optical write apparatus comprises a plurality of substrates each having a great number of light emitting diodes aligned in one direction, the plurality of substrates being shifted from one another in the aligning direction of the light emitting diodes, and, among the plurality of substrates, every two substrates adjacent to each other in the aligning direction of the light emitting diode being fixed to each other by an auxiliary member interposed between only two substrate, and the two substrates are connected by the auxiliary member.

* * * * *